US012601938B2

(12) United States Patent
Kharel et al.

(10) Patent No.: US 12,601,938 B2
(45) Date of Patent: Apr. 14, 2026

(54) ELECTRO-OPTIC DEVICES HAVING CLOSELY SPACED ENGINEERED ELECTRODES

(71) Applicant: HyperLight Corporation, Cambridge, MA (US)

(72) Inventors: Prashanta Kharel, Cambridge, MA (US); Mian Zhang, Cambridge, MA (US); Christian Reimer, Wellesley, MA (US); Kevin Luke, Cambridge, MA (US); Lingyan He, Brookline, MA (US); Jeffrey Cole Holzgrafe, Somerville, MA (US)

(73) Assignee: HyperLight Corporation, Cambridge, MA (US)

( * ) Notice: Subject to any disclaimer, the term of this patent is extended or adjusted under 35 U.S.C. 154(b) by 85 days.

(21) Appl. No.: 18/102,604

(22) Filed: Jan. 27, 2023

(65) Prior Publication Data

US 2023/0251511 A1     Aug. 10, 2023

Related U.S. Application Data

(63) Continuation-in-part of application No. 17/843,906, filed on Jun. 17, 2022, which is a continuation of
(Continued)

(51) Int. Cl.
*G02F 1/03* (2006.01)
*G02F 1/035* (2006.01)

(52) U.S. Cl.
CPC ...... *G02F 1/0356* (2013.01); *G02F 2201/063* (2013.01); *G02F 2201/122* (2013.01); *G02F 2202/20* (2013.01)

(58) Field of Classification Search
CPC ............. G02F 1/0356; G02F 2201/063; G02F 2201/122; G02F 2202/20
See application file for complete search history.

(56) References Cited

U.S. PATENT DOCUMENTS

| | | | |
|---|---|---|---|
| 3,877,782 A | 4/1975 | Kaminow | |
| 4,005,927 A | 2/1977 | Caton | |
| (Continued) | | | |

FOREIGN PATENT DOCUMENTS

| | | |
|---|---|---|
| CN | 1432846 | 7/2003 |
| CN | 101006382 | 7/2007 |
| (Continued) | | |

OTHER PUBLICATIONS

Krasnokutska et al., Ultra-low loss photonic circuits in lithium niobate on insulator, Opt. Express 26, 897-904 (2018) (Year: 2018).*
(Continued)

*Primary Examiner* — Peter Radkowski
(74) *Attorney, Agent, or Firm* — Van Pelt, Yi & James LLP

(57) ABSTRACT

An optical device is described. The optical device includes a waveguide, a first engineered electrode, and a second engineered electrode. The waveguide includes at optical material(s) having an electro-optic effect. The optical material(s) include lithium. A portion of the waveguide has a waveguide width. The first engineered electrode includes a first channel region and first extensions protruding from the first channel region. The first extensions are closer to the portion of the waveguide than the first channel region is. The second engineered electrode includes a second channel region and second extensions protruding from the second channel region. The second extensions are closer to the portion of the waveguide than the second channel region is. A first extension of the first extensions is a distance from a
(Continued)

second extension of the second \extensions. The distance is less than the waveguide width.

24 Claims, 27 Drawing Sheets

Related U.S. Application Data application No. 17/102,047, filed on Nov. 23, 2020, now Pat. No. 11,567,353.

(60) Provisional application No. 63/304,520, filed on Jan. 28, 2022, provisional application No. 63/112,867, filed on Nov. 12, 2020, provisional application No. 63/033,666, filed on Jun. 2, 2020, provisional application No. 62/941,139, filed on Nov. 27, 2019.

(56)     References Cited

U.S. PATENT DOCUMENTS

| | | | |
|---|---|---|---|
| 4,251,130 A | 2/1981 | Marcatili | |
| 4,372,643 A | 2/1983 | Liu | |
| 4,380,364 A | 4/1983 | Marcatili | |
| 4,448,479 A * | 5/1984 | Alferness | G02F 1/0356 |
| | | | 385/28 |
| 4,468,086 A | 8/1984 | Liu | |
| 4,553,810 A | 11/1985 | Alferness | |
| 5,263,102 A * | 11/1993 | Hakogi | G02F 1/225 |
| | | | 385/2 |
| 5,566,257 A | 10/1996 | Jaeger | |
| 5,619,607 A | 4/1997 | Djupsjobacka | |
| 5,671,302 A * | 9/1997 | Skeie | G02F 1/225 |
| | | | 385/40 |
| 5,675,673 A * | 10/1997 | Skeie | G02F 1/225 |
| | | | 385/40 |
| 5,696,855 A * | 12/1997 | Skeie | G02F 1/225 |
| | | | 385/40 |
| 5,757,985 A * | 5/1998 | Ishizaka | G02F 1/025 |
| | | | 385/39 |
| 6,129,864 A | 10/2000 | Imaeda | |
| 6,172,791 B1 * | 1/2001 | Gill | G02F 1/0356 |
| | | | 359/245 |
| 6,192,167 B1 | 2/2001 | Kissa | |
| 6,310,700 B1 * | 10/2001 | Betts | G02F 1/2255 |
| | | | 359/2 |
| 6,483,953 B1 | 11/2002 | McBrien | |
| 6,501,867 B2 * | 12/2002 | Gates, II | G02F 1/2255 |
| | | | 385/2 |
| 6,522,793 B1 | 2/2003 | Szilagyi | |
| 6,567,203 B1 | 5/2003 | Hill | |
| 6,580,840 B1 | 6/2003 | McBrien | |
| 6,647,158 B2 * | 11/2003 | Betts | G02F 1/2257 |
| | | | 385/2 |
| 6,678,430 B1 * | 1/2004 | Noe | G02F 1/0136 |
| | | | 398/189 |
| 6,760,493 B2 | 7/2004 | Pruneri | |
| 6,950,580 B2 | 9/2005 | Mitomi | |
| 6,958,852 B2 | 10/2005 | Aoki | |
| 7,027,668 B2 | 4/2006 | Tavlykaev | |
| 7,035,485 B2 | 4/2006 | Kondo | |
| 7,082,237 B2 * | 7/2006 | Walker | G02F 1/2257 |
| | | | 385/39 |
| 7,242,821 B2 * | 7/2007 | Bull | G02B 6/14 |
| | | | 385/11 |
| 7,382,943 B1 | 6/2008 | Heaton | |
| 7,400,787 B2 | 7/2008 | Burns | |
| 7,426,321 B2 | 9/2008 | Eriksson | |
| 7,426,326 B2 | 9/2008 | Moeller | |
| 7,433,111 B2 * | 10/2008 | Sasaki | G02F 1/0316 |
| | | | 359/254 |
| 7,447,389 B2 * | 11/2008 | Sugiyama | G02F 1/0316 |
| | | | 385/9 |
| 7,492,975 B2 * | 2/2009 | Toyoda | G02F 1/3551 |
| | | | 385/40 |
| 7,502,530 B2 | 3/2009 | Kondo | |
| 7,555,174 B2 * | 6/2009 | Kuver | G02F 1/2257 |
| | | | 385/132 |
| 7,657,130 B2 * | 2/2010 | Shastri | G02F 1/2255 |
| | | | 385/2 |
| 7,801,400 B2 | 9/2010 | Sugiyama | |
| 7,809,216 B2 | 10/2010 | Cox, III | |
| 7,869,669 B2 * | 1/2011 | Mitomi | G02F 1/0356 |
| | | | 385/3 |
| 7,899,277 B2 * | 3/2011 | Koh | G02F 1/0356 |
| | | | 385/2 |
| 8,094,359 B1 | 1/2012 | Matsko | |
| 8,175,422 B2 * | 5/2012 | Okazaki | G02F 1/292 |
| | | | 385/40 |
| 8,280,201 B2 * | 10/2012 | Prosyk | G02F 1/225 |
| | | | 359/239 |
| 8,300,992 B2 | 10/2012 | Murata | |
| 8,411,353 B2 | 4/2013 | Kashyap | |
| 8,417,073 B2 * | 4/2013 | Li | G02F 1/0121 |
| | | | 385/32 |
| 8,428,399 B2 * | 4/2013 | Takabayashi | B82Y 20/00 |
| | | | 385/40 |
| 8,530,821 B2 * | 9/2013 | Green | G02F 1/025 |
| | | | 250/227.12 |
| 8,549,740 B1 | 10/2013 | Hwu | |
| 8,582,928 B2 * | 11/2013 | Miyatake | G02B 6/13 |
| | | | 385/40 |
| 8,644,647 B2 * | 2/2014 | Ichikawa | G02F 1/2255 |
| | | | 385/2 |
| 8,644,648 B2 * | 2/2014 | Ho | G02F 1/0018 |
| | | | 385/2 |
| 8,737,773 B2 | 5/2014 | Motoya | |
| 8,805,127 B2 * | 8/2014 | Miyatake | G02F 1/035 |
| | | | 385/40 |
| 8,903,202 B1 * | 12/2014 | Prosyk | G02F 1/225 |
| | | | 385/2 |
| 8,917,958 B2 * | 12/2014 | Prosyk | G02F 1/225 |
| | | | 385/2 |
| 8,983,241 B2 * | 3/2015 | Li | G02B 6/35 |
| | | | 359/279 |
| 9,008,469 B2 * | 4/2015 | Prosyk | G02F 1/225 |
| | | | 385/2 |
| 9,042,684 B2 * | 5/2015 | Gill | G02F 1/0356 |
| | | | 385/2 |
| 9,070,815 B2 * | 6/2015 | Lee | G02F 1/025 |
| 9,158,175 B2 * | 10/2015 | Kung | G02F 1/0118 |
| 9,170,439 B2 * | 10/2015 | Gill | G02F 1/0356 |
| 9,310,663 B2 * | 4/2016 | Velthaus | G02F 1/0121 |
| 9,335,568 B1 * | 5/2016 | Yap | G02F 1/065 |
| 9,417,469 B2 * | 8/2016 | Abel | G02F 1/035 |
| 9,470,952 B2 | 10/2016 | Dagli | |
| 9,482,925 B2 * | 11/2016 | Prosyk | G02F 1/2255 |
| 9,523,871 B2 | 12/2016 | Kitamura | |
| 9,638,980 B2 * | 5/2017 | Yagi | G02F 1/025 |
| 9,664,931 B1 | 5/2017 | Yap | |
| 9,671,670 B2 * | 6/2017 | Hollis | G02B 6/14 |
| 9,703,127 B2 * | 7/2017 | Abel | G02F 1/025 |
| 9,733,543 B2 | 8/2017 | Dagli | |
| 9,741,645 B2 * | 8/2017 | Hu | H01L 21/76885 |
| 9,742,498 B1 | 8/2017 | Nagarajan | |
| 9,746,743 B1 | 8/2017 | Rabiei | |
| 9,804,475 B1 * | 10/2017 | Parker | H10F 39/806 |
| 9,939,709 B2 | 4/2018 | Iwatsuka | |
| 10,007,167 B1 * | 6/2018 | Parker | G02F 1/2255 |
| 10,018,888 B2 * | 7/2018 | Thaniyavarn | G02F 1/2255 |
| 10,027,032 B2 | 7/2018 | Kirino | |
| 10,088,734 B2 | 10/2018 | Kondou | |
| 10,133,142 B2 * | 11/2018 | Doerr | G02F 1/025 |
| 10,168,596 B2 | 1/2019 | Williams | |
| 10,197,884 B2 | 2/2019 | Dagli | |
| 10,241,379 B1 * | 3/2019 | Parker | H01P 3/026 |
| 10,247,998 B2 * | 4/2019 | Velthaus | G02F 1/2255 |
| 10,295,844 B2 * | 5/2019 | Kissa | G02F 1/0316 |
| 10,320,083 B2 | 6/2019 | Kirino | |
| 10,367,664 B2 | 7/2019 | Welch | |

(56) References Cited

U.S. PATENT DOCUMENTS

| | | | | |
|---|---|---|---|---|
| 10,409,093 B2 * | 9/2019 | Nejadmalayeri | ..... | G02F 1/0121 |
| 10,705,354 B2 * | 7/2020 | Menezo | ........ | G02F 1/025 |
| 10,888,875 B2 | 1/2021 | Oh | | |
| 10,890,787 B2 * | 1/2021 | Kawamura | ........ | G02F 1/2255 |
| 10,976,637 B2 * | 4/2021 | Parker | ........ | H10F 39/806 |
| 11,009,659 B2 | 5/2021 | Ward | | |
| 11,163,120 B2 | 11/2021 | Ardalan | | |
| 11,287,720 B2 | 3/2022 | Hayashi | | |
| 11,448,907 B2 | 9/2022 | Tai | | |
| 11,567,353 B2 * | 1/2023 | Kharel | ........ | G02F 1/0316 |
| 11,668,994 B2 * | 6/2023 | Parker | ........ | G02F 1/2255 |
| | | | | 385/3 |
| 2001/0008589 A1 | 7/2001 | Sasame | | |
| 2002/0048076 A1 | 4/2002 | Kondo | | |
| 2002/0071622 A1 * | 6/2002 | Betts | ........ | G02F 1/2257 |
| | | | | 385/2 |
| 2002/0154842 A1 | 10/2002 | Betts | | |
| 2002/0159666 A1 * | 10/2002 | Gates, II | ........ | G02F 1/2255 |
| | | | | 385/2 |
| 2003/0002766 A1 | 1/2003 | Pruneri | | |
| 2003/0228081 A1 | 12/2003 | Tavlykaev | | |
| 2005/0123242 A1 * | 6/2005 | Walker | ........ | G02F 1/2257 |
| | | | | 385/40 |
| 2006/0051019 A1 * | 3/2006 | Sasaki | ........ | G02F 1/0316 |
| | | | | 385/31 |
| 2006/0067634 A1 * | 3/2006 | Bull | ........ | G02B 6/14 |
| | | | | 385/27 |
| 2006/0228065 A1 | 10/2006 | Burns | | |
| 2006/0251425 A1 * | 11/2006 | Kupershmidt | ........ | G02B 6/022 |
| | | | | 398/147 |
| 2007/0009195 A1 | 1/2007 | Eriksson | | |
| 2007/0058896 A1 * | 3/2007 | Toyoda | ........ | G02B 6/12011 |
| | | | | 385/40 |
| 2007/0211984 A1 * | 9/2007 | Gopinath | ........ | G02F 1/3132 |
| | | | | 385/39 |
| 2007/0242915 A1 * | 10/2007 | Kuver | ........ | G02F 1/2257 |
| | | | | 385/14 |
| 2008/0031564 A1 * | 2/2008 | Sugiyama | ........ | G02F 1/0356 |
| | | | | 385/9 |
| 2008/0089633 A1 | 4/2008 | Moeller | | |
| 2008/0193076 A1 * | 8/2008 | Witzens | ........ | G02B 6/12007 |
| | | | | 385/14 |
| 2008/0227410 A1 | 9/2008 | Cox | | |
| 2009/0093982 A1 * | 4/2009 | Kissa | ........ | G02F 1/3558 |
| | | | | 702/97 |
| 2009/0103850 A1 * | 4/2009 | Shastri | ........ | G02F 1/0121 |
| | | | | 385/3 |
| 2009/0290830 A1 * | 11/2009 | Mitomi | ........ | G02F 1/0356 |
| | | | | 385/3 |
| 2009/0297088 A1 * | 12/2009 | Koh | ........ | G02F 1/0356 |
| | | | | 385/2 |
| 2009/0324165 A1 | 12/2009 | Sugiyama | | |
| 2010/0067840 A1 | 3/2010 | Sugiyama | | |
| 2010/0098424 A1 * | 4/2010 | Ho | ........ | G02F 1/065 |
| | | | | 398/116 |
| 2010/0158540 A1 * | 6/2010 | Takabayashi | ........ | G02F 1/0316 |
| | | | | 385/3 |
| 2010/0166356 A1 * | 7/2010 | Okazaki | ........ | G02F 1/292 |
| | | | | 385/10 |
| 2010/0195953 A1 * | 8/2010 | Miyatake | ........ | G02F 1/0316 |
| | | | | 385/14 |
| 2010/0232736 A1 * | 9/2010 | Ichikawa | ........ | G02F 1/0356 |
| | | | | 385/2 |
| 2011/0038034 A1 | 2/2011 | Kashyap | | |
| 2011/0069924 A1 | 3/2011 | Murata | | |
| 2011/0135242 A1 * | 6/2011 | Prosyk | ........ | G02F 1/225 |
| | | | | 385/3 |
| 2011/0158576 A1 | 6/2011 | Kissa | | |
| 2011/0262071 A1 | 10/2011 | Mitomi | | |
| 2011/0298561 A1 * | 12/2011 | Green | ........ | G02F 1/0121 |
| | | | | 333/236 |
| 2012/0045162 A1 * | 2/2012 | Li | ........ | G02F 1/0121 |
| | | | | 385/2 |

| | | | | |
|---|---|---|---|---|
| 2012/0230627 A1 | 9/2012 | Motoya | | |
| 2012/0301071 A1 * | 11/2012 | Kung | ........ | G02F 1/225 |
| | | | | 385/9 |
| 2013/0163913 A1 * | 6/2013 | Prosyk | ........ | G02F 1/035 |
| | | | | 385/3 |
| 2013/0266257 A1 * | 10/2013 | Li | ........ | G02B 6/35 |
| | | | | 385/16 |
| 2014/0034602 A1 * | 2/2014 | Miyatake | ........ | G02F 1/0316 |
| | | | | 216/18 |
| 2014/0035134 A1 * | 2/2014 | Hu | ........ | H01L 23/5389 |
| | | | | 257/737 |
| 2014/0055838 A1 * | 2/2014 | Lee | ........ | G02F 1/025 |
| | | | | 257/458 |
| 2014/0061450 A1 * | 3/2014 | Gill | ........ | G02F 1/0356 |
| | | | | 250/227.11 |
| 2014/0064653 A1 * | 3/2014 | Gill | ........ | G02F 1/0121 |
| | | | | 385/2 |
| 2014/0104666 A1 | 4/2014 | Minoia | | |
| 2014/0153860 A1 * | 6/2014 | Prosyk | ........ | G02F 1/225 |
| | | | | 385/3 |
| 2014/0199014 A1 * | 7/2014 | Velthaus | ........ | G02F 1/2255 |
| | | | | 438/31 |
| 2014/0205229 A1 * | 7/2014 | Thaniyavarn | ........ | G02F 1/225 |
| | | | | 385/3 |
| 2015/0036965 A1 * | 2/2015 | Prosyk | ........ | G02F 1/2255 |
| | | | | 385/3 |
| 2015/0043865 A1 * | 2/2015 | Velthaus | ........ | G02F 1/25 |
| | | | | 385/3 |
| 2015/0147038 A1 | 5/2015 | Asai | | |
| 2015/0309340 A1 * | 10/2015 | Abel | ........ | G02F 1/025 |
| | | | | 438/69 |
| 2016/0011439 A1 | 1/2016 | Kitamura | | |
| 2016/0026063 A1 * | 1/2016 | Yagi | ........ | G02F 1/2255 |
| | | | | 216/17 |
| 2016/0062155 A1 | 3/2016 | Ichikawa | | |
| 2016/0139485 A1 | 5/2016 | Winzer | | |
| 2016/0139486 A1 | 5/2016 | Dagli | | |
| 2016/0202592 A1 * | 7/2016 | Hollis | ........ | G02F 1/2255 |
| | | | | 385/2 |
| 2016/0291352 A1 * | 10/2016 | Kissa | ........ | G02F 1/0316 |
| 2016/0313579 A1 | 10/2016 | Yokoyama | | |
| 2016/0349546 A1 * | 12/2016 | Abel | ........ | G02F 1/0316 |
| 2017/0023842 A1 | 1/2017 | Dagli | | |
| 2017/0052424 A1 | 2/2017 | Iwatsuka | | |
| 2017/0082877 A1 | 3/2017 | Arimoto | | |
| 2017/0110802 A1 | 4/2017 | Kirino | | |
| 2017/0250758 A1 | 8/2017 | Kikuchi | | |
| 2017/0285437 A1 * | 10/2017 | Doerr | ........ | G02F 1/2257 |
| 2017/0307954 A1 | 10/2017 | Dagli | | |
| 2018/0120666 A1 | 5/2018 | Kondou | | |
| 2018/0173018 A1 | 6/2018 | Li | | |
| 2018/0301819 A1 | 10/2018 | Kirino | | |
| 2018/0309207 A1 | 10/2018 | Kirino | | |
| 2018/0329269 A1 | 11/2018 | Ward | | |
| 2018/0341164 A1 | 11/2018 | Williams | | |
| 2018/0361400 A1 | 12/2018 | Oh | | |
| 2019/0018262 A1 * | 1/2019 | Nejadmalayeri | ........ | G02F 1/01 |
| 2019/0025615 A1 * | 1/2019 | Kawamura | ........ | G02F 1/025 |
| 2019/0094649 A1 | 3/2019 | Kono | | |
| 2019/0171084 A1 * | 6/2019 | Parker | ........ | H01P 3/026 |
| 2019/0196099 A1 | 6/2019 | Watanuki | | |
| 2019/0227350 A1 | 7/2019 | Puckett | | |
| 2019/0243167 A1 * | 8/2019 | Menezo | ........ | G02F 1/025 |
| 2019/0293972 A1 | 9/2019 | Sasaki | | |
| 2019/0296443 A1 | 9/2019 | Kirino | | |
| 2019/0346625 A1 | 11/2019 | Cheng | | |
| 2019/0391415 A1 | 12/2019 | Lipson | | |
| 2021/0080796 A1 | 3/2021 | Kissa | | |
| 2021/0157177 A1 * | 5/2021 | Kharel | ........ | G02F 1/0316 |
| 2021/0215992 A1 * | 7/2021 | Parker | ........ | H01P 3/026 |
| 2021/0364696 A1 | 11/2021 | Reano | | |
| 2021/0373364 A1 | 12/2021 | Zhang | | |
| 2022/0146901 A1 | 5/2022 | Miyazaki | | |

(56)            References Cited

U.S. PATENT DOCUMENTS

2022/0197104 A1    6/2022  Miyazaki
2023/0273467 A1    8/2023  Ozaki

FOREIGN PATENT DOCUMENTS

| CN | 102445771 | 5/2012 |
|---|---|---|
| CN | 106662765 | 5/2017 |
| CN | 107478861 | 12/2017 |
| CN | 109844621 | 6/2019 |
| CN | 110609399 | 12/2019 |
| CN | 111812867 | 10/2020 |
| CN | 111061071 | 9/2021 |
| EP | 0152996 | 8/1985 |
| JP | H09211402 | 8/1997 |
| JP | 2000066561 | 3/2000 |
| JP | 2001066561 | 3/2001 |
| JP | 2004341147 | 12/2004 |
| JP | 2005506554 | 3/2005 |
| JP | 2006065044 | 3/2006 |
| JP | 2007171452 | 7/2007 |
| JP | 2007304424 | 11/2007 |
| JP | 2009048021 | 3/2009 |
| JP | 2015118371 | 6/2015 |
| JP | 2019174749 | 10/2019 |
| KR | 20040017535 | 2/2004 |
| WO | 2008108154 | 9/2008 |
| WO | 2018031916 | 2/2018 |
| WO | 2019180922 | 9/2019 |
| WO | 2019213140 | 11/2019 |
| WO | 2023045610 | 3/2023 |

OTHER PUBLICATIONS

Rao et al., High-performance and linear thin-film lithium niobate Mach-Zehnder modulators on silicon up to 50 GHz, Opt. Lett. 41, 5700-5703 (2016) (Year: 2016).*
Patel et al., Design, analysis, and transmission system performance of a 41 GHz silicon photonic modulator, Opt. Express 23, 14263-14287 (2015) (Year: 2015).*
Tu et al., 50-GB/s silicon optical modulator with traveling-wave electrodes, Opt. Express 21, 12776-12782 (2013) (Year: 2013).*
Yang et al., Characteristics of coplanar waveguide on lithium niobate crystals as a microwave substrate. J. Appl. Phys. Jan. 1, 2007; 101 (1): 014101. https://doi.org/10.1063/1.2402978 (Year: 2007).*
Rueda et al., Efficient microwave to optical photon conversion: an electro-optical realization, Optica 3, 597-604 (2016) (Year: 2016).*
Hu et al., Preparation and microwave dielectric properties of SiO2 ceramics by aqueous Sol-Gel technique, Journal of Alloys and Compounds, vol. 559, 2013, pp. 129-133, ISSN 0925-8388, https://doi.org/10.1016/j.jallcom.2012.11.168. (Year: 2013).*
Kuypers et al., Green's function analysis of Lamb wave resonators. 2008 IEEE Ultrasonics Symposium (2008): 1548-1551. (Year: 2008).*
Wang et al., Design and Fabrication of S0 Lamb-Wave Thin-Film Lithium Niobate Micromechanical Resonators, in Journal of Microelectromechanical Systems, vol. 24, No. 2, pp. 300-308, Apr. 2015, doi: 10.1109/JMEMS.2014.2384916. (Year: 2015).*
Tadesse, S., Li, M. Sub-optical wavelength acoustic wave modulation of integrated photonic resonators at microwave frequencies. Nat Commun 5, 5402 (2014). https://doi.org/10.1038/ncomms6402 (Year: 2014).*
Wang et al., Integrated lithium niobate electro-optic modulators operating at CMOS-compatible voltages. Nature 562, 101-104 (2018). https://doi.org/10.1038/s41586-018-0551-y (Year: 2018).*
Siew et al., Ultra-low loss ridge waveguides on lithium niobate via argon ion milling and gas clustered ion beam smoothening, Opt. Express 26, 4421-4430 (2018) (Year: 2018).*
Ali-Abadi et al., Design of Dual-band Impedance Matching Circuit Using T-shape Shunt Stub. Signal Processing and Renewable Energy (SPRE), (2019), 3(2), 1-8. https://oiccpress.com/spre/article/view/7792 (Year: 2019).*

Li et al., Analysis of segmented traveling-wave optical modulators, in Journal of Lightwave Technology, vol. 22, No. 7, pp. 1789-1796, Jul. 2004, doi: 10.1109/JLT.2004.831179 (Year: 2004).*
Luo et al., Nonlinear integrated quantum electro-optic circuits. Sci. Adv.5, eaat1451(2019).DOI:10.1126/sciadv.aat145 (Year: 2019).*
Koeber et al., Femtojoule electro-optic modulation using a silicon-organic hybrid device. Light Sci Appl 4, e255 (2015). https://doi.org/10.1038/lsa.2015.28 (Year: 2015).*
Honardoost et al., Towards subterahertz bandwidth ultracompact lithium niobate electrooptic modulators, Opt. Express 27, 6495-6501 (2019) (Year: 2019).*
Boes et al., Status and Potential of Lithium Niobate on Insulator (LNOI) for Photonic Integrated Circuits, Laser & Photonics Reviews 2018, 12, 1700256. https://doi.org/10.1002/lpor.201700256 (Year: 2018).*
Alam et al., Microwave characterization of lithium niobate electrooptic modulators with traveling wave electrodes, 2008 International Conference on Computer and Communication Engineering, Kuala Lumpur, Malaysia, 2008, pp. 118-122, doi: 10.1109/ICCCE.2008.4580580. (Year: 2008).*
Shin et al., Novel T-rail electrodes for substrate removed low-voltage high-speed GaAs/AlGaAs electrooptic modulators, in IEEE Transactions on Microwave Theory and Techniques, vol. 53, No. 2, pp. 636-643, Feb. 2005, doi: 10.1109/TMTT.2004.840735 (Year: 2005).*
Shu et al., Significantly High Modulation Efficiency of Compact Graphene Modulator Based on Silicon Waveguide. Sci Rep 8, 991 (2018). https://doi.org/10.1038/s41598-018-19171-x (Year: 2018).*
Ramaswami et al., Chapter 3—Components, Optical Networks, 3rd Edition, Morgan Kaufmann, 2010, pp. 113-243, ISBN 9780123740922, https://doi.org/10.1016/B978-0-12-374092-2.50011-4. (Year: 2010).*
Izutsu et al., Band Operation of Guided-Wave Light Modulators with Filter-Type Coplanar Electrodes, IEICE Trans. Electron., vol. E78-C, No. I Jan. 1995 (Year: 1995).*
Abe et al., Analysis of a x-cut Ti:LiNbO/sub 3/ electrooptic modulator with a ridge structure, 1999 SBMO/IEEE MTT-S International Microwave and Optoelectronics Conference, Rio de Janeiro, Brazil, 1999, pp. 144-148 vol. 1, doi: 10.1109/IMOC.1999.867076. (Year: 1999).*
Xu et al., Dual-Polarization Thin-Film Lithium Niobate In-Phase Quadrature Modulators for Terabit-per-Second Transmission, vol. 9, No. 1, Jan. 2022, pp. 61-62.
Akiyama et al., "High-speed and efficient silicon modulator based on forward-biased pin diodes", Frontiers in Physics, V. 2, DOI 10.3389/fphy.2014.00065m 2014 (Year: 2014).
Shao et al., Microwave-to-Optical Conversion using Lithium Niobate Thin-Film Acoustic Resonators, Optica 6, 1498-1505 (2019), available Jul. 11, 2019 at https://arxiv.org/pdf/1907.08593.pdf (Year: 2019).
Stepanenko et al., "Optimization of RF electrodes for electro-optic modulator based on quantum-confined Stark effect", 2019 J. Phys.: Conf. Ser. 1145 012028 (Year: 2019).
Tadesse et al., Sub-Optical Wavelength Acoustic Wave Modulation of Integrated Photonic Resonators at Microwave Frequencies. Nat Commun 5, 5402 (2014). https://doi.org/10.1038/ncomms6402 (Year: 2014).
Wang et al., "Measurement Method of Electro-Optic Coefficients using Photoelastic Modulation," Appl. Opt. 58, 4271-4276 (2019) (Year: 2019).
Yudistira et al., Surface Acoustic Wave Generation in ZX-cut LinbO3 Superlattices Using Coplanar Electrodes, Appl. Phys. Lett. 95, 052901, (2009) https://doi.org/10.1063/1.3190518 (Year: 2009).
Kim et al., "Effects of parasitic modes in high-speed LiNb03 optical modulators," Opt. Express 12, 2568-2573 (2004) (Year: 2004).
Yang et al., Surface acoustic waves in acoustic superlattice lithium niobate coated with a waveguide layer. AIP Advances Apr. 1, 2017; 7 (4): 045206. https://doi.Org/10.1063/1.4980057 (Year: 2017).
Zhang et al., Sound transmission properties assisted by the phase resonances of composite acoustic gratings. J. Appl. Phys. Feb. 28, 2016; 119 (8): 084902. https://doi.Org/10.1063/1.4942444 (Year: 2016).

(56)                    References Cited

OTHER PUBLICATIONS

Bacon et al., Acoustic waves generated by pulsed microwaves in viscoelastic rods: Modeling and experimental verification. J. Acoust. Soc. Am. Sep. 1, 2001; 110 (3): 1398-1407. https://doi.Org/10.1121/1.1391241 (Year: 2001).

Dong et al., Characterization of the Brillouin grating spectra in a polarization-maintaining fiber, Opt. Express 18, 18960-18967 (2010) (Year: 2010).

Annoymous "UV 210 Positive DUV Photoresist" Rohm and Haas Electronic Materials Microelectronic Technologies, Apr. 2004.

Boes et al., Improved second harmonic performance in periodically poled LNOI waveguides through engineering of lateral leakage, Opt. Express 27, 23919-23928 (2019) (Year: 2019).

Boes et al., Status and Potential of Lithium Niobate on Insulator (LNOI) for Photonic Integrated Circuits, Laser Photonics Rev. 2018, 1700256 (Year: 2018).

Burrows et al., "Slot-vee antenna-coupled electro-optic modulator," Proc. SPIE 3463, Photonics and Radio Frequency II, (Nov. 3, 1998); doi: 10.1117/12.330399 (Year: 1998).

Caspar et al., High-Aspect-Ratio LiNbO3 Ridge Waveguide With Vertical Buffer Layer and Enhanced Electro-Optical Efficiency, Journal of Lightwave Technology, vol. 36, No. 13, Jul. 1, 2018 (Year: 2018).

Costanzo et al., Benzocyclobutene as Substrate Material for Planar Millimeter-Wave Structures: Dielectric Characterization and Application, J Infrared Milli Terahz Waves (2010) 31 :66-77 (Year: 2010).

Costanzo et al., Millimeter-Waves Structures on Benzocyclobutene Dielectric Substrate, Radioengineering, vol. 20, No. 4, Dec. 2011 (Year: 2011).

Ding et al., High-Speed Silicon Modulator With Slow-Wave Electrodes and Fully Independent Differential Drive, Journal of Lightwave Technology, vol. 32, No. 12, Jun. 15, 2014 (Year: 2014).

Dogru et al., Traveling Wave Electrodes for Substrate Removed Electro-Optic Modulators With Buried Doped Semiconductor Electrodes, IEEE Journal of Quantum Electronics, vol. 49, No. 7, Jul. 2013 (Year: 2013).

Dris et al., A programmable, multi-format phoitonic transceiver platform enabling flexible networks, We. D5.2, ICTON 2015. (Year:2015).

Dummer et al., Periodic Loading and Selective Undercut Etching for High-Impedance Traveling-Wave Electroabsorption Modulators, OThC6.pdf, OFC/NFOEC 2008 (Year: 2008).

Eospace, 40+ GB/S Modulators, 2019.

Fang et al. "Monolithic integration of a lithium niobate microresonator with a free-standing waveguide using femtosecond laser assisted ion beam writing", Nature, Scientific Reports; 7:45610, pp. 1-6 (Year: 2017).

He et al., High-Performance Hybrid Silicon and Lithium Niobate Mach-Zehnder Modulators for 100 Gbit/s and Beyond, Nature Photonics 2019, 13(5): 359-364, arXiv: 1807.10362v2 [physics. app-ph] 2018 (Year: 2018).

Hinakura et al., Electro-optic phase matching in a Si photonic crystal slow light modulator using meander-line electrodes, Optics Express, V. 28, N. 9, 2018 (Year: 2018).

Honardoost et al. "High-Speed Modeling of Ultracompact Electrooptic Modulators", Journal of Lightwave Technology, vol. 36, No. 24, pp. 5893-5902 (Year: 2018).

Honardoost et al., Towards Subterahertz Bandwidth Ultracompact Lithium Niobate Electooptic Modulators, Optics Express, vol. 27, No. 5, Mar. 4, 2019, pp. 6495-6501.

Jeremy Witzens, High-Speed Silicon Photonics Modulators, Proceedings of the IEEE, vol. 106, No. 12, Dec. 2018 (Year: 2018).

Kharel et al., "Breaking voltage-bandwidth limits in integrated lithium niobate modulators using micro-structured electrodes," Optica 8, 357-363 (2021).

Lewen et al., Ultra high-speed segmented traveling-wave electroabsorption modulators, OSA/OFC 2003, PD38-1 (Year: 2003).

Li et al., Analysis of Segmented Traveling-Wave Optical Modulators, Journal of Lightwave Technology, vol. 22, No. 7, Jul. 2004, pp. 1789-1796.

Li et al., Silicon intensity Mach-Zehnder modulator for single lane 100 GB/s applications, Photonics Research, V. 6, N. 2, 2018 (Year: 2018).

Mercante et al., Thin film lithium niobate electro-optic modulator with terahertz operating bandwidth, Optics Express, V. 28, N. 11, 2018 (Year: 2018).

Patel et al., Design, analysis, and transmission system performance of a 41 GHz silicon photonic modulator, Optics Express, V. 23, N. 11, 2015. (Year: 2015).

Rao et al., Heterogeneous Microring and Mach-Zehnder Modulators Based on Lithium Niobate and Chalcogenide Glasses on Silicon, Opt. Express 23, 22746-22752 (2015) (Year: 2015).

Robert G. Walker, High-Speed III-V Semiconductor Intensity Modulators, IEEE Journal of Quantum Electronics, vol. 27, No. 3, Mar. 1991.

Shin et al., Conductor Loss of Capacitively Loaded Slow Wave Electrodes for High-Speed Photonic Devices, Journal of Lightwave Technology, vol. 29, No. 1, Jan. 1, 2011 (Year: 2011).

Shin et al., Bulk Undoped GaAs—AlGaAs Substrate-Removed Electrooptic Modulators With 3.7-V-cm Drive Voltage at 1.55 micron, IEEE Photonics Technology Letters, vol. 18, No. 21, Nov. 1, 2006 (Year: 2006).

Shin et al., Ultralow Drive Voltage Substrate Removed GaAs/AlGaAs Electro-Optic Modulators at 1550 nm, IEEE Journal of Selected Topics in Quantum Electronics, vol. 19, No. 6, Nov./Dec. 2013 (Year: 2013).

Soltani et al., Efficient quantum microwave-to-optical conversion using electro-optic nanophotonic coupled resonators, Phys. Rev. A 96, 043808—Published Oct. 5, 2017 (Year: 2017).

Stenger et al., "Low Loss and Low Vpi Thin Film Lithium Niobate on Quartz Electro-optic Modulators," 2017 European Conference on Optical Communication (ECOC), Gothenburg, 2017, pp. 1-3, doi: 10.1109/ECOC.2017.8346144. (Year: 2017).

Thorlabs, Lithium Niobate Electro-Optic Modulators, Fiber-Coupled, Nov. 12, 2020, pp. 1-4.

Wang et al., "Integrated High Quality Factor Lithium Niobate Microdisk Resonators" Optical Sciences of America, vol. 22 No. 25, Dec. 4, 2014.

Wang et al., "Nanophotonic lithium niobate electro-optic modulators," Opt. Express 26, 1547-1555, (2018); arXiv:1701.06470v1 [physics.optics] Jan. 23, 2017 (Year: 2017).

Wang et al., Design of Ultra-Thin Dielectric Waveguide Meander Line for 850 GHz Traveling Wave Tube, 2018 IEEE International Vacuum Electronics Conference (IVEC), Monterey, CA, 2018, pp. 395-396, doi: 10.1109/IVEC.2018.8391578 (Year: 2018).

Wang et al., Integrated Lithium Niobate Electro-optic Modulators Operating at CMOS-Compatible Voltages, Springer Nature Limited, Oct. 4, 2018, vol. 562, pp. 101-112.

Wang et al., Lithium Niobate Nonlinear Nanophotonics, Dissertation, SEAS, Harvard University, 2017 (Year: 2017).

Wang et al., Ultrahigh-efficiency wavelength conversion in nanophotonic periodically poled lithium niobate waveguides, Optica, V. 5, N. 11, 2018 (Year: 2018).

Xu et al., High-Performance Coherent Optical Modulators Based on Thin-Film Lithium Niobate Platform, Aug. 6, 2020, pp. 1-7.

Zhou et al., Silicon Photonics Carrier Depletion Modulators Capable of 85Gbaud 16QAM and 64Gbaud 64QAM, 2019.

Aliev et al., Porous silicon bulk acoustic wave resonator with integrated transducer, Nanoscale Res Lett, Jul. 9, 2012, pp. 1-6.

Cai et al., Acousto-optical modulation of thin film lithium niobate waveguide devices, Photonics Research, vol. 7, No. 9, Sep. 2019, pp. 1003-1013 (2019).

Chang et al., Thin film wavelength converters for photonic integrated circuits, Optica vol. 3, No. 5, May 2016, pp. 531-535.

Fu et al., Advances in piezoelectric thin films for acoustic biosensors, acoustofluidics and lab-on-chip applications, Progress In Materials Science 89, 2017, pp. 31-91.

Ghadimi et al., Elastic strain engineering for ultralow mechanical dissipation, Science 360, May 18, 2018, pp. 764-768.

Safavi-Naeini et al. Two-Dimensional Phononic-Photonic Band Gap Optomechanical Crystal Cavity, Phys. Rev. Lett. 112, Apr. 18, 2014, pp. 153603-1-153603-5.

(56) References Cited

OTHER PUBLICATIONS

Safavi-Naeini et al., Design of optomechanical cavities and waveguides on a simultaneous bandgap phononic-photonic crystal slab, Opt. Express vol. 18, No. 14, Jul. 5, 2010, pp. 14926-14943.

Santos et al., Hybrid confinement of optical and mechanical modes in a bullseye optomechanical resonator, Opt. Express vol. 25, No. 2, Jan. 23, 2017, pp. 508-529.

Van Laer et al., Unifying Brillouin scattering and cavity optomechanics in silicon photonic wires, CLEO: 2015, OSA Technical Digest (online) (Optica Publishing Group, 2015), paper STh4I.4 (Year: 2015).

Van Laer et al., Unifying Brillouin scattering and cavity optomechanics, Physical Review A 93, 2016, pp. 053828-1-053828-15.

Weigel et al., Bonded thin film lithium niobate modulator on a silicon photonics platform exceeding 100 GHz 3-dB electrical modulation bandwidth, Optics Express, vol. 26, No. 18, Sep. 3, 2018 (Year: 2018), pp. 23728-23739.

Ali-Abadi et al., Design of Dual-band Impedance Matching Circuit Using T-shape Shunt Stub, Signal Processing and Renewable Energy (SPRE), Jun. 2019, pp. 1-8.

Burla et al., 500 GHz plasmonic Mach-Zehnder modulator enabling sub-THz microwave photonics, APL Photonics 4(5): 056106, May 30, 2019, 12 pages.

Izutsu et al., Band Operation of Guided-Wave Light Modulators with Filter-Type Coplanar Electrodes, IEICE Trans. Electron., vol. E78-C, No. 1, Jan. 1995, pp. 55-60.

Koeber et al., Femtojoule electro-optic modulation using a silicon-organic hybrid device, Light: Science & Applications, 4(2), 2015, 8 pages.

Luo et al., Nonlinear integrated quantum electro-optic circuits, Science Advances, Research Article, 5: eaat1451, Jan. 2, 2019, 7 pages.

Ramaswami et al., Chapter 3—Components, Optical Networks, 3rd Edition, Morgan Kaufmann, ISBN 9780123740922, 2010, pp. 113-243.

Shin et al., Novel T-rail electrodes for substrate removed low-voltage high-speed GaAs/AlGaAs electrooptic modulators, IEEE Transactions on Microwave Theory and Techniques, vol. 53, No. 2, Feb. 2005, pp. 636-643.

Shu et al., Significantly High Modulation Efficiency of Compact Graphene Modulator Based on Silicon Waveguide, Scientific Reports, 8:991, Jan. 17, 2018, 8 pages.

Siew et al., Ultra-Low Loss Ridge Waveguides on Lithium Niobate via Argon Ion Milling and Gas Clustered Ion Beam Smoothening, Optics Express 4421, vol. 26, No. 4, Feb. 19, 2018, 10 pages.

Alam et al., Microwave characterization of lithium niobate electrooptic modulators with traveling wave electrodes, International Conference on Computer and Communication Engineering, 2008, pp. 118-122.

Haffner et al., Nano-opto-electro-mechanical switches operated at CMOS-level voltages, Science, vol. 366, Nov. 15, 2019, pp. 860-864.

Krasnokutska et al., Ultra-low Loss Photonic Circuits in Lithium Niobate on Insulator, Optics Express, vol. 26, No. 2, pp. 897-904 (2018).

Tu et al., 50-GB/s silicon optical modulator with traveling-wave electrodes, Opt. Express 21, 2013, pp. 12776-12782.

He et al., High-Performance Hybrid Silicon and Lithium Niobate Mach-Zehnder Modulators for 100 Gbit/s and Beyond, arXiv 1807.10362v2, Nov. 2, 2018, 20 Pages.

* cited by examiner

100

Input Voltage (Electrode Signal) or Ground

Input Optical Signal

Modulated Optical Signal

Input Voltage (Electrode Signal) or Ground

100'

100''''

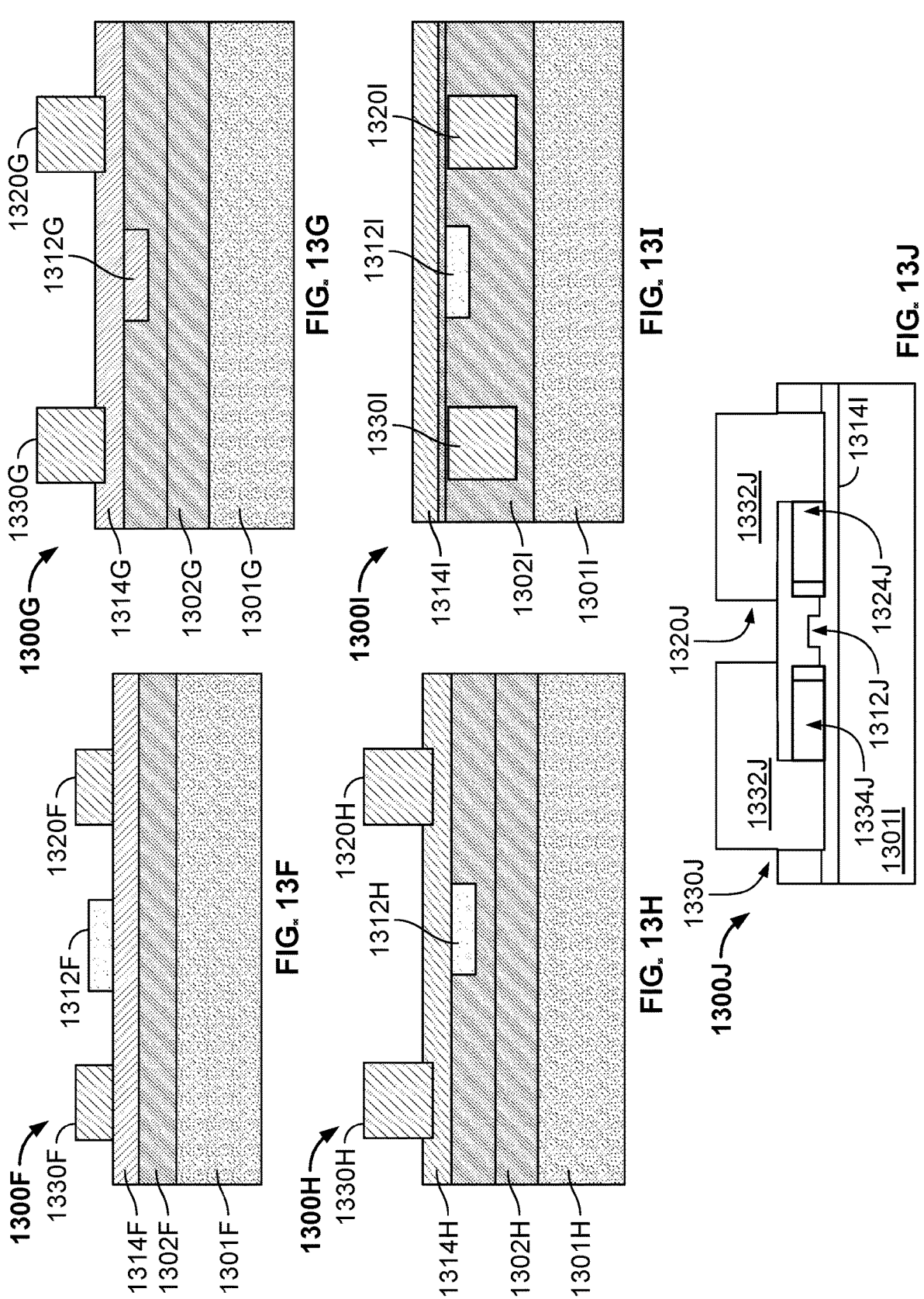

1400A
1412A
1420A
1414A
1402A
1430A
1401A
FIG. 14A
1400B
1412B     1420B
1440B               1430B
1414B
1402B
1401B
FIG. 14B
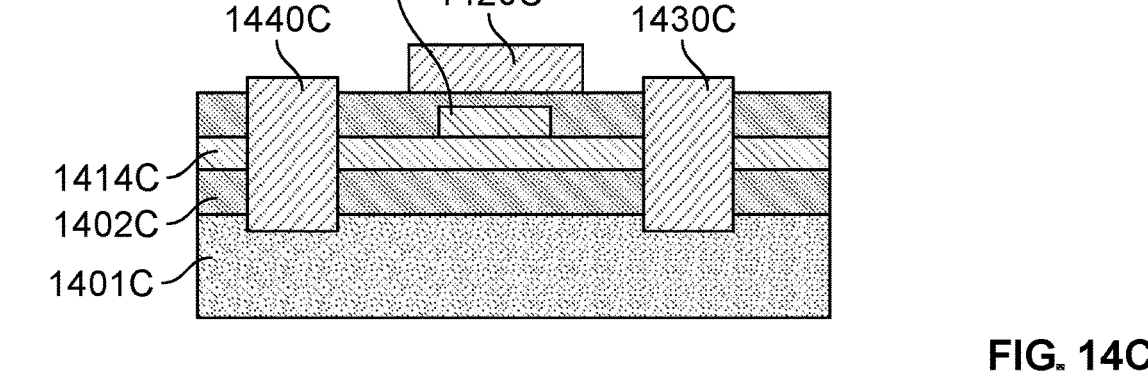
1400C
1412C     1420C
1440C               1430C
1414C
1402C
1401C
FIG. 14C
1400D
1402D
1414D
1402D
1430D
1401D
1412D
FIG. 14D
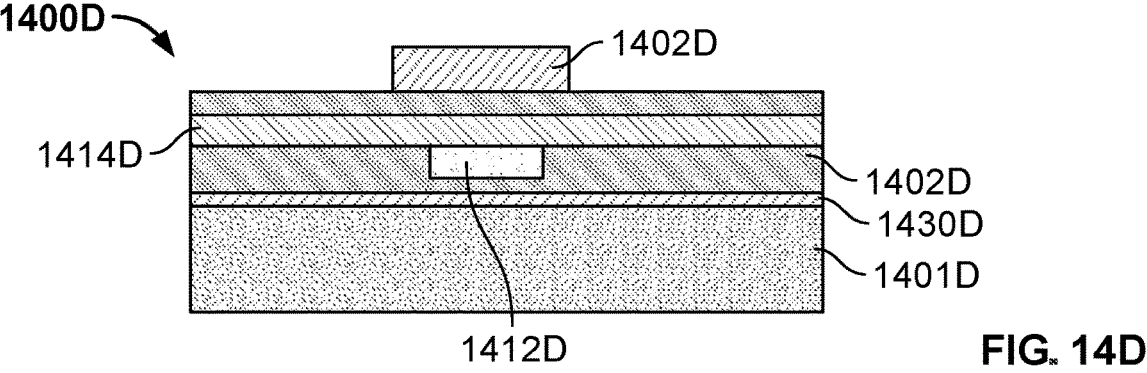

1400J

1400K

1500A

1500B

1800

1900

2000

2005

2020/
2024

2030/
2034

2006

2010       2012       2014

2100

2101

2110/2112

2160

2101

2102

2164       2162

3400

3400

ELECTRO-OPTIC DEVICES HAVING CLOSELY SPACED ENGINEERED ELECTRODES

CROSS REFERENCE TO OTHER APPLICATIONS

This application claims priority to U.S. Provisional Patent Application No. 63/304,520 entitled ELECTRO-OPTIC DEVICES HAVING CLOSELY SPACED ENGINEERED ELECTRODES filed Jan. 28, 2022 which is incorporated herein by reference for all purposes.

This application is a continuation in part of U.S. patent application Ser. No. 17/843,906 entitled ELECTRO-OPTIC DEVICES HAVING ENGINEERED ELECTRODES filed Jun. 17, 2022, which is a continuation of U.S. patent application Ser. No. 17/102,047 entitled ELECTRO-OPTIC DEVICES HAVING ENGINEERED ELECTRODES filed Nov. 23, 2020, which claims priority to U.S. Provisional Patent Application No. 63/033,666 entitled HIGH PERFORMANCE OPTICAL MODULATOR filed Jun. 2, 2020; U.S. Provisional Patent Application No. 62/941,139 entitled THIN-FILM ELECTRO-OPTIC MODULATORS filed Nov. 27, 2019; and U.S. Provisional Patent Application No. 63/112,867 entitled BREAKING VOLTAGE-BAND-WIDTH LIMIT IN INTEGRATED LITHIUM NIOBATE MODULATORS USING MICRO-STRUCTURED ELEC-TRODES filed Nov. 12, 2020; all of which are incorporated herein by reference for all purposes.

BACKGROUND OF THE INVENTION

Optical modulators and other electro-optic devices are generally desired to meet certain performance benchmarks. For example, an optical modulator is desired to be capable of providing a sufficient optical modulation at lower electrode driving voltages. A large optical modulation may correspond to the waveguide having a large length in the direction of transmission of the optical signal. However, the optical modulator is also desired to consume a small total area. The optical modulator is also desired to have low electrode (e.g. microwave) signal losses for the electrical signal through the electrodes and low optical losses for the optical signal traversing the waveguide. Further, the optical modulators are desired to be capable of providing the low loss transmission and large modulation at low voltages over a wide bandwidth of frequencies. Therefore, an electro-optic device that may have low electrode losses, low optical losses, consume a controlled amount of area, and/or provide the desired optical modulation at low voltages is desired.

BRIEF DESCRIPTION OF THE DRAWINGS

Various embodiments of the invention are disclosed in the following detailed description and the accompanying draw-ings.

FIGS. 13A-13J depict portions of embodiments of optical devices capable of having improved performance indicating various electrode configurations.

FIGS. 14A-14K depict portions of embodiments of an optical device capable of having improved performance indicating various electrode configurations.

DETAILED DESCRIPTION

Figure 1A:
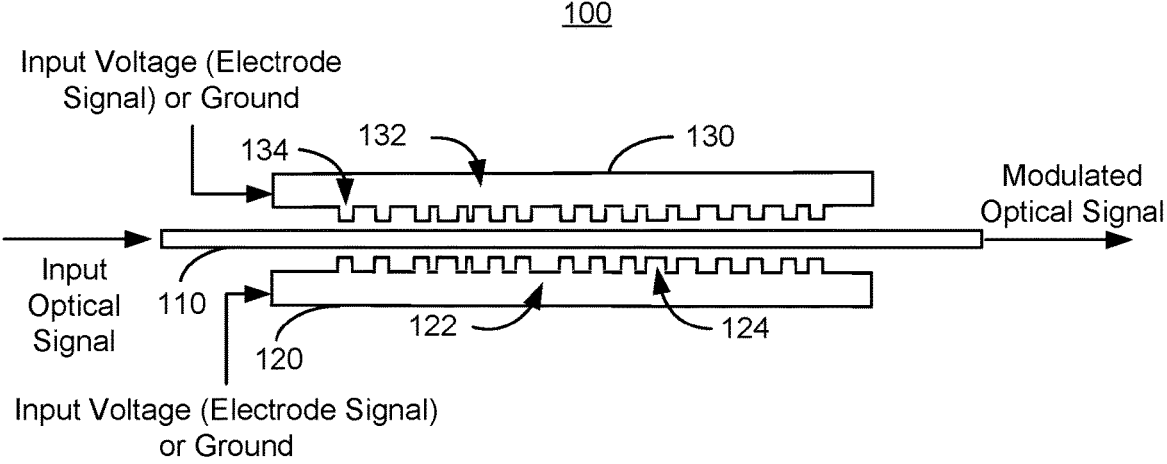
FIGS. 1A-1E depict embodiments of optical devices having engineered electrodes.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The basic elements of electro-optic devices (also termed optical devices), such as electro-optic modulators, include waveguides and electrodes around the waveguides. The waveguide carries an optical signal. The electrodes are used to generate an electric field, or voltage difference, at or near the waveguide. This electric field causes a change in the index of refraction of the waveguide, which results in the optical signal being modulated. For example, an electrode signal (e.g. a microwave signal) may be applied to the electrodes. Thus, the electrodes act as transmission lines. The electrode signal travels in the same direction as the optical signal propagating through the waveguide. The electrode signal generates a corresponding electric field at the waveguide, modulating the index of refraction of the waveguide. Therefore, the optical signal is modulated as the optical signal travels through the waveguide. Thus, the desired modulation of the optical signal may be achieved by driving the appropriate electrode signal through electrodes.

Although electro-optic devices function, their performance may be limited by a number of factors. For example, the electrodes are desired to be in proximity to the waveguide to increase the strength of the electric field at the waveguide. The higher electric field enhances the change in the waveguide's index of refraction and increases modulation of the optical signal. However, electrodes may suffer from electrode (e.g. microwave) signal losses as the microwave signal traverses the electrode. Such losses may be increased by proximity to the waveguide. These losses may adversely affect the ability of the electrode to provide the desired electric field at the waveguide. Absorption of the microwave signal by surrounding structures as well as resistive losses in the electrode exacerbate these losses. Furthermore, the requisite driving voltage for the electrodes increases with increasing frequency of the modulation. For example, an optical signal may be readily modulated at a frequency of 1 GHz using an electrode voltage of less than two volts. However, for higher frequencies, for example in the 100 GHz range or higher, the requisite electrode voltage may be significantly higher (e.g. five volts or more). A larger voltage is applied to the electrodes in order to obtain the desired change in index of refraction. Thus, optical modulators may require larger input voltages to the electrodes and consume more power than is desirable. Consequently, electro-optic devices having improved performance are still desired.

Many technologies have been proposed to improve optical modulators. These technologies include waveguides utilizing semiconductors (e.g. silicon and/or indium phosphide), bulk lithium niobate (LN), barium titanate (BTO), and/or plasmonics. However, these and other technologies suffer significant drawbacks in one or more of the characteristics mentioned above. For example, some modulators may be unable to provide the desired modulation in a given area, may be so large that only a weak electric field (and thus smaller electro-optic response) is provided, and/or suffer from unacceptable electrode or optical signal losses. A single limiting factor in performance of an optical modulator may prevent the optical modulator from functioning as desired. For example, unacceptable electrode (microwave) losses may render the modulator unusable for particular applications even if the electrodes can be driven at low voltages. Consequently, a mechanism for providing an optical modulator having low optical signal losses, low electrode signal losses, consuming a controlled amount of area, and/or providing the desired optical modulation at lower voltages is still desired.

An optical device and subassembly are described. The subassembly may include the optical device. The optical device includes a waveguide, a first engineered electrode, and a second engineered electrode. The waveguide includes at least one optical material having an electro-optic effect. The optical material(s) include lithium. A portion of the waveguide has a waveguide width. The first engineered electrode includes a first channel region and a first plurality of extensions protruding from the first channel region. The first plurality of extensions is closer to the portion of the waveguide than the first channel region is. The second engineered electrode includes a second channel region and a second plurality of extensions protruding from the second channel region. The second plurality of extensions is closer to the portion of the waveguide than the second channel region is. A first extension of the first plurality of extensions is a distance from a second extension of the second plurality of extensions. The distance is less than the waveguide width. The waveguide carries an optical signal. Thus, the portion of the waveguide may confine an optical mode of the optical signal such that the optical mode is attenuated by at least 20 dB at a distance from the portion of the waveguide. The first engineered electrode and the second engineered electrode may be not closer to the portion of the waveguide than the distance. In some embodiments, the distance corresponds to the optical mode being attenuated by at least 30 dB.

In some embodiments, extensions share a layer with the channel region. In some embodiments, the extensions are further from the substrate than the channel region. In some embodiments, an additional plurality of extensions extends from the channel region to closer to the portion of the waveguide. The additional plurality of extensions may be closer to the substrate than the channel region. The waveguide may be a ridge waveguide (i.e. having a ridge and a thin film portion) or a channel waveguide (e.g. having a ridge only). In some embodiments, the waveguide has a thickness not exceeding four hundred nanometers. In some embodiments, the waveguide has a thickness not exceeding six hundred nanometers or not exceeding eight hundred nanometers.

The waveguide and electrode may reside on a substrate structure. The substrate structure may be selected from a first substrate having a low substrate microwave dielectric constant less than eleven, the first substrate in combination with an underlayer between the first substrate and the waveguide, and a second substrate having a high microwave dielectric constant greater than eleven in combination with the underlayer having a low underlayer microwave dielectric constant of less than eleven. Thus, the substrate structure may have a low microwave dielectric constant of less than eleven.

FIGS. 1A-1E depict embodiments of optical devices 100, 100', 100", 100''', and 100'''' having engineered electrodes. FIG. 1A depicts a plan view of optical device (i.e. electro-optic device) 100 including waveguide 110 and electrodes 120 and 130. FIGS. 1B, 1C, 1D and 1E depict perspective views of optical devices 100', 100", 100''', and 100'''' which are analogous to optical device 100.

Optical devices 100, 100', 100''' and 100'''' may be part of an optical modulator with an electro-optic response (e.g. in picometers per volt) in the thin film plane (e.g. x-cut or y-cut lithium niobate) or perpendicular to the thin film plane. Optical device 100" may be part of an optical modulator with an electro-optic response (e.g. in picometers per volt) out of plane of the thin film plane (e.g. z-cut lithium niobate). As used herein, an x-cut or y-cut modulator is one which has an electro-optic effect in the thin film plane (e.g. even if materials such as lithium niobate are not used). Similarly, as used herein, a z-cut optical modulator has an electro-optic effect out of (e.g. perpendicular to) the thin film plane (e.g. even if materials such as lithium niobate are not used). FIGS. 1A-1E are not to scale. Other configurations are possible. For example, optical devices having a different number of waveguides, other and/or additional waveguide components such as splitters and branches, and/or a different number of electrodes are possible. Referring to FIG. 1A, an optical signal is input to optical device 100. For example, the optical signal may be provided by one or more lasers. An electrode signal having a voltage is also input to optical device 100. In some embodiments, the frequency of the electrode signal is in the microwave range. Consequently, the terms microwave signal and electrode signal are used synonymously herein. Optical device 100 utilizes the electrode signal to modulate the optical signal and outputs a modulated optical signal.

Referring to FIG. 1A, optical device 100 includes waveguide 110 and electrodes 120 and 130. Waveguide 110 is used to transmit an optical signal. More specifically, waveguide 110 receives an input optical signal and outputs a modulated optical signal. Electrode(s) 120 and/or 130 carry an electrode signal that applies a time varying electric field to waveguide 110. This electric field alters the index of refraction of waveguide 110. In some embodiments, electrode 120 carries an electrode signal, such as a microwave signal, while electrode 130 is a ground. In some embodiments, electrode 130 carries an electrode (e.g. microwave) signal, while electrode 120 is ground. In some embodiments, both electrodes 120 and 130 carry electrode signals. Other configurations are also possible. Thus, electrodes 120 and 130 combine with waveguide 110 to provide a modulated optical signal. Electrode 120 and 130 are drawn around waveguide 110 to indicate that waveguide 110 experiences an applied electric field between 120 and 130, but does not indicate the physical locations of electrode 120 and 130. For example, it is possible to have electrode 120 directly on top or below the waveguide while 130 is on one side.

Waveguide 110 is depicted as a having a rectangular footprint and extending only between electrodes 120 and 130. Waveguide 110 may have other configurations. For example, waveguide 110 may include a thin film portion that may extend under electrode(s) 120 and/or 130 and a ridge 112 between electrodes 120 and 130. Waveguide 110 includes at least one optical material possessing an electro-optic effect. In some embodiments, the optical material(s) are nonlinear. As used herein, a nonlinear optical material exhibits the electro-optic effect and has an effect that is at least (e.g. greater than or equal to) 5 picometer/volt. In some embodiments, the nonlinear optical material has an effect that is at least 10 picometer/volt. In some such embodiments nonlinear optical material has an effect of at least 20 picometer/volt. The nonlinear optical material experiences a change in index of refraction in response to an applied electric field. In some embodiments, the nonlinear optical material is ferroelectric. In some embodiments, the electro-optic material effect includes a change in index of refraction in an applied electric field due to the Pockels effect. Thus, in some embodiments, optical materials possessing the electro-optic effect in one or more the ranges described herein are considered nonlinear optical materials regardless of whether the effect is linearly or nonlinearly dependent on the applied electric field. The nonlinear optical material may be a non-centrosymmetric material. Therefore, the nonlinear optical material may be piezoelectric.

In some embodiments, waveguide 110 is a low optical loss waveguide. For example, waveguide 110 may have a total optical loss of not more than 10 dB through the portion of waveguide 110 (e.g. when biased at maximum transmission and as a maximum loss) in proximity to electrodes 120 and 130. The total optical loss is the optical loss in a waveguide through a single continuous electrode region (e.g. as opposed to multiple devices cascaded together), such as is shown in FIG. 1A. In some embodiments, waveguide 110 has a total optical loss of not more than 8 dB. In some embodiments, the total optical loss is not more than 4 dB. In some embodiments, the total optical loss is less than 3 dB. In some embodiments, the total optical loss is less than 2 dB. In some embodiments, waveguide 110 has an optical loss of not more than 3 dB/cm (e.g. on average). In some embodiments, the nonlinear material in waveguide 110 has an optical loss of not more than 2.0 dB/cm. In some such embodiments, waveguide 110 has an optical loss of not more than 1.0 dB/cm. In some embodiments, waveguide 110 has an optical loss of not more than 0.5 dB/cm. In some embodiments, the nonlinear optical material in waveguide 110 includes lithium niobate (LN) and/or lithium tantalate (LT). In some embodiments, the nonlinear optical material for waveguide 110 consists of LN. In some embodiments, the nonlinear optical material for waveguide 110 consists of LT. Such nonlinear optical materials may have inert chemical etching reactions for conventional etching using chemicals such as fluorine, chlorine or bromine compounds. In some embodiments, the nonlinear optical material(s) include one or more of LN, LT, potassium niobate, gallium arsenide, potassium titanyl phosphate, lead zirconate titanate, and barium titanate. In other embodiments, other nonlinear optical materials having analogous optical characteristics may be used.

Various other optical components may be incorporated into waveguide 110 to provide the desired phase modulation, polarization modulation, intensity modulation, IQ modulation, other modulation and/or other functionality. For example, waveguide 110 may have wider portion(s) (not shown in FIG. 1A) for accommodating multiple modes. In some embodiments (not shown in FIG. 1A), waveguide 110 may include splitters to divide the optical signal into multiple branches for modulation and recombine the modulated optical signals for output. Thus, waveguide 110, as well as electrodes 120 and 130, may be configured to provide the desired functionality.

A portion of waveguide 110 is proximate to electrodes 120 and 130 along the direction of transmission of the optical signal (e.g. from the input of the optical signal through waveguide 110 to the modulated optical signal output). This portion of the waveguide may have a variety of lengths. In some embodiments, the portion of waveguide 110 close to electrodes 120 and 130 is at least two millimeters in length. In some embodiments, this portion of waveguide 110 is at least five millimeters and not more than ten millimeters long. Other embodiments may have this portion of the waveguide 110 longer. The portion of waveguide 110 proximate to electrodes 120 and 130 may have a length greater than two centimeters. In some embodiments, the length of the portion of waveguide 110 proximate to electrodes 120 and 130 is at least 2.5 cm. In some embodiments, the length of this portion of waveguide 110 is at least three centimeters. Such lengths are possible at least in part because of the low optical losses per unit length for waveguide 110 described above. Because waveguide 110 can be made longer, the total optical modulation may be provided through the electric field generated by electrodes 120 and 130 may be larger. Further, because of the low optical losses and low microwave losses (described below), the desired optical modulation (e.g. change in index of refraction) may be achieved with a signal input to the electrode(s) 120 and/or 130 having a lower voltage. For example, V$\pi$ is the half wave voltage, or the amplitude of the input electrode signal required to shift the phase of the optical signal by $\pi$. In some embodiments, V$\pi$ is not more than six volts for signals in the 50-100 GHz range. In some embodiments, V$\pi$ is not more than three volts for signals in the 50-100 GHz range. In some embodiments, V$\pi$ is on the order of voltages provided via CMOS circuitry, for example in the range of 0.5 volts through 1.5 volts for signals in the 50-100 GHz range. For example, V$\pi$ may be not more than 1.5 volts at ten GHz. Thus, V$\pi$ is not more than 1.5 volts in some embodiments. In some such embodiments, V$\pi$ is not more than 1 volt for signals in the 50-100 GHz range. Other voltages for other frequency ranges are possible. Thus, performance of optical modulator 110 may be improved.

Further, the portion of waveguide 110 proximate to electrodes 120 and 130 may have an optical mode cross-sectional area that is small. In some embodiments, the optical mode cross-sectional area is less than 3 multiplied by the square of the wavelength of the optical signal in the nonlinear optical material(s) (e.g. $\lambda^2$). In some embodiments, the optical mode cross-sectional area is less than 2 multiplied by the square of the wavelength of the optical signal in the nonlinear optical material(s). In some embodiments, the optical mode cross-sectional area is less than 1.5 multiplied by the square of the wavelength of the optical signal in the nonlinear optical material(s). In some embodiments, the optical mode cross-sectional area is less than 4 $\mu m^2$. In some such embodiments, the optical mode cross-sectional area is not more than 3 $\mu m^2$. In some embodiments, such a small optical mode cross-sectional area may be provided using thin films and fabrication technologies described herein. The optical mode cross-sectional area may also allow for the low optical losses described herein.

Electrodes 120 and 130 apply electric fields to waveguide 110. Electrode 120 includes a channel region 122 and extensions 124 (of which only one is labeled in FIG. 1A). Electrode 130 includes a channel region 132 and extensions 134 (of which only one is labeled in FIG. 1A). In some embodiments, extensions 124 or 134 may be omitted from electrode 120 or electrode 130, respectively. Extensions 124 and 134 protrude from channel regions 122 and 132, respectively. Thus, extensions 124 and 134 are closer to waveguide 110 than channel region 122 and 132, respectively, are. Extensions 124 and 134 shown in FIG. 1A are simple rectangular protrusions. In some embodiments, extensions 124 and 134 may have a different shape. For example, extension(s) 124 and/or 134 may have an L-shaped footprint, a T-shaped footprint and/or another shaped footprint. For example, extensions 124 and 134 may have rounded sidewall(s). Thus, a T-shaped footprint may include either a straight horizontal portion of the "T" or a curved horizontal portion of the "T". Similarly, an L-shaped footprint may include either a straight horizontal portion of the "L" or a rounded horizontal portion of the "L". Regardless of the shape, at least part of each of the extensions 124 and 134 is closer to waveguide 110 than channel regions 122 and 132, respectively. The distribution (e.g. pitch) and width of extensions 124 and 134 are also irregular. In some embodiments, the distribution and/or width of extensions 124 and/or 134 may be regular. The distance between waveguide 110 and extensions 124 and 134 is shown as constant. In some embodiments, this distance may vary. Similarly, the distance between waveguide 110 and channel 122 and 132 is shown as constant. In some embodiments, this distance may vary. Electrodes 120 and 130 are shown as symmetric. In some embodiments, electrodes 120 and 130 are asymmetric. For example, extensions 134 may be omitted, while extensions 124 are present.

Extensions 124 and 134 protrude from channel regions 122 and 132, respectively, and reside between channel regions 122 and 132, respectively, and waveguide 110. As a result, extensions 124 and 134 are sufficiently close to waveguide 110 to provide an enhanced electric field at waveguide 110. Consequently, the change in index of refraction induced by the electric field is increased. In contrast, channel regions 122 and 132 are spaced further from waveguide 110 than the extensions 124 and 134. Thus, channel region 122 is less affected by the electric field generated by electrode 130/extensions 134. Electrical charges have a reduced tendency to cluster at the edge of channel region 122 closest to electrode 130. Consequently, current is more readily driven through central portions channel region 122 and the electrode losses in channel region 122 (and electrode 120) may be reduced. Similarly, channel region 132 is further from electrode 120. Channel region 132 is less affected by the electric field generated by electrode 120/extensions 124. Electrical charges have a reduced tendency to cluster at the edge of channel region 132 closest to electrode 120. Consequently, current is more readily driven through channel region 132 and the electrode losses in channel region 132 (and electrode 130) may be reduced. Because microwave signal losses through electrodes 120 and 130 may be reduced, a smaller driving voltage may be utilized for electrode(s) 120 and/or 130 and less power may be consumed by optical device 100. In addition, the ability to match the impedance of electrode 120 with an input voltage device (not shown in FIG. 1A) may be improved. Such an impedance matching may further reduce electrode signal losses for optical device 100. Moreover, extensions 124 and 134 may affect the speed of the electrode signal through electrodes 120 and 130. Thus, extensions 124 and 134 may be configured to adjust the velocity of the electrode signal to match the velocity of the optical signal in waveguide 110. Consequently, performance of optical device 100 may be improved.

Electrode(s) 120 and/or 130 may be fabricated using deposition techniques, such as evaporation and/or electroplating, and photolithography to shape extensions 124 and/or 134 of electrode 120 and/or 130. The resulting electrode 120 and/or 130 may have a lower frequency dependent electrode loss. In some embodiments, the frequency dependent electrode power loss for a particular frequency window (e.g. at least 10 GHz) in a frequency range between DC and five hundred GHz can be as low as 0.8 dB per square root of the electrode signal frequency per centimeter, where the electrode signal frequency is measured in GHz. The frequency dependent electrode loss is less than 0.5 dB per square root of an electrode signal frequency per centimeter in other embodiments. The electrode signal frequency is measured in GHz and the frequency window may be at least 10 GHz. The frequency dependent electrode loss is less than 0.3 dB per square root of an electrode signal frequency per centimeter in other embodiments. The electrode signal frequency is measured in GHz and the frequency window may be at least 10 GHz. In some embodiments, the electrode has an absorption electrode loss for a frequency window in an electrode signal frequency from DC to not more than five hundred GHz. The absorption electrode loss is less than 0.005 dB per GHz per centimeter and the frequency window is at least 10 GHz in some embodiments. In some embodiments, the frequency dependent electrode power loss for the same frequency window and frequency range can be as low as 0.75 dB per square root of the electrode signal frequency per centimeter for the particular frequency window (e.g. 10 GHz or more). In some embodiments, the electrode has an absorption electrode loss. In some embodiments, the absorption electrode loss a particular frequency window (e.g. 10 GHz or more) in a frequency range between DC and five hundred GHz is less than 0.02 dB per GHz per centimeter. In some embodiments, the absorption electrode loss for the same frequency window and frequency range is less than 0.005 dB per GHz per centimeter for the frequency window in the frequency range of DC and five hundred GHz. In some embodiments, optical device 100 may include an additional electrode, such as a DC electrode (not shown in FIG. 1A). Such an additional electrode may be used to optimize optical device 100 for low-frequency response. This electrode may include one or more of an electro-optic, a thermal phase shifter and or MEMS shifter.

In operation, an optical signal that is desired to be modulated is input to waveguide 110. An electrode signal, e.g. a microwave signal, is also applied to electrode(s) 120 and/or 130. For the purposes of explanation, it is assumed that the microwave signal is applied to electrode 120, while electrode 130 is ground. The time varying microwave signal through electrode 120 causes charges of a particular sign rapidly accumulate in an extension 124, drop back to zero in the extension 124, and charges of the opposite sign rapidly accumulate in the extension 124. A lack of negative charges in a particular extension 124 is considered the same as positive charges accumulating in the extension 124, and vice versa. This cycle is repeated at or around the frequency of the microwave signal. As a result of the accumulation of charges in extension 124, opposite charges accumulate in the corresponding extensions 134 nearby. A relatively large time varying electric field is generated between extensions 124 and 134. Because the electro-optic material in waveguide 110 is exposed to a larger time varying electric field, the index of refraction for waveguide 110 undergoes larger changes near extensions 124 and 134. The optical signal is exposed to larger variations in index of refraction as the optical signal traverses waveguide 110 and passes extensions 124 and 134. Thus, a larger modulation in the optical signal may be achieved for a microwave signal of a given voltage amplitude applied to electrode 120. For example, optical device 100 may provide sufficient optical modulation at frequencies of up to 100-300 GHz or higher with a voltage amplitude of not more than one volt provided to electrode 120. Further, as discussed above, the presence of extensions 124 reduces the tendency of current to cluster near the edge of channel region 122 closer to waveguide 110 and mitigates losses in electrode 120. Current may be more readily driven through channel region 122 at a lower voltage and microwave losses reduced. Thus, performance of optical device 100 may be improved.

In addition, as discussed above, optical device 100 may not only reduce optical losses through waveguide 110, but also increase modulation of the optical signal through the use of a longer waveguide 110. Use of electrodes 120 and 130 having extensions 124 and 134, respectively, may reduce microwave losses, allow for a large electric field at waveguide 110/ridge 112 and improve the propagation of the microwave signal through electrodes 120 and 130, respectively. Electrodes 120 and 130 may also improve performance via velocity and phase matching. Consequently, performance of optical device 100 may be significantly enhanced.

Figure 1B:
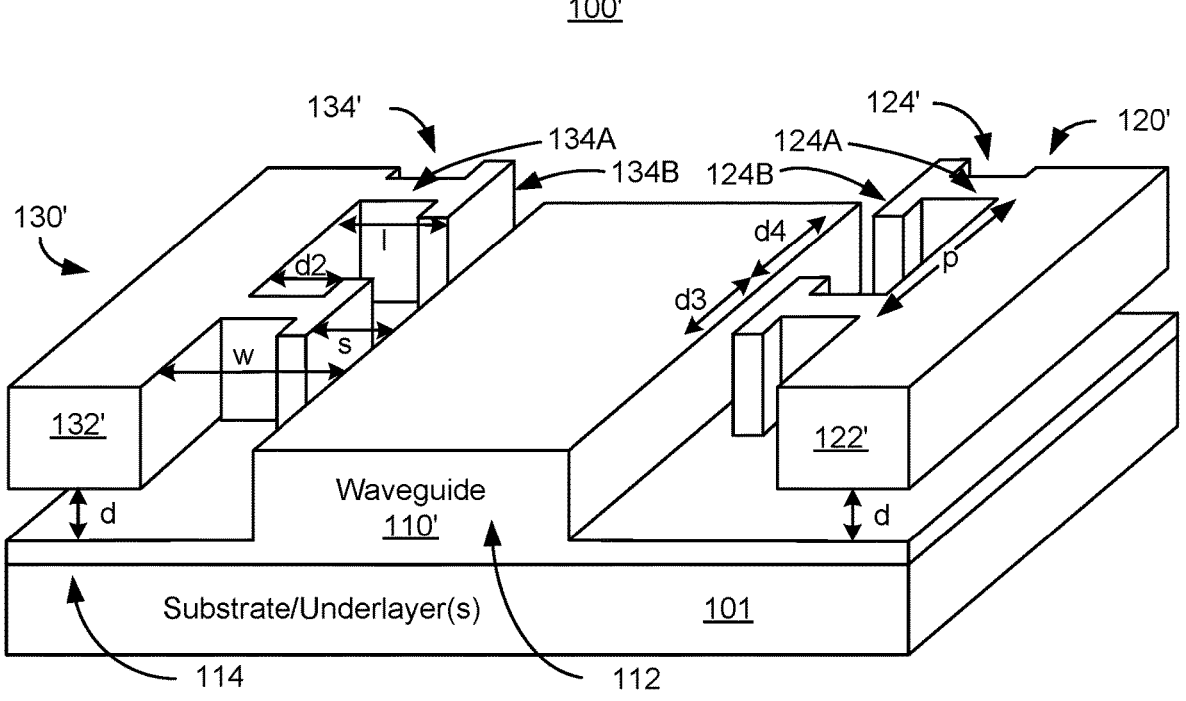

FIG. 1B is a perspective view of optical device 100'. Optical device 100' is analogous to optical device 100. Consequently, analogous portions of optical device 100' are labeled similarly. Optical device 100' includes waveguide 110', electrode 120' and electrode 130' that are analogous to waveguide 110, electrode 120 and electrode 130, respectively. Also shown is substrate/underlying layers 101. In some embodiments, substrate 101 includes a silicon substrate and a silicon dioxide layer between the silicon substrate and waveguide 110. Other substrates may be used in other embodiments. In some embodiments, substrate 101 is a dielectric having a low microwave dielectric constant, for example a microwave dielectric constant of less than eleven. In some embodiments, the substrate has a microwave dielectric constant of less than eight. In some such embodiments, the substrate has a microwave dielectric constant of less than five. For example, substrate 101 may include sapphire, quartz and/or fused silica. In some embodiments, underlayer(s) with a low microwave dielectric constant such as silicon dioxide, may be used on top of the low microwave dielectric constant substrate 101. Other and/or additional underlayer(s) may be used in other embodiments. Further, low microwave dielectric constant underlayer(s) may be used in conjunction with other substrates with larger microwave dielectric constant. For example, a low microwave dielectric constant underlayer layer of silicon dioxide may be provided on a substrate 101 that has a microwave dielectric constant greater than eleven, such as silicon or LN. In some embodiments, the underlayer provided is desired to be thick. For example, the underlayer may be at least three micrometers thick and not more than one hundred micrometers thick. Further, other geometric configurations of substrate and/or underlayers may be used in some embodiments.

Waveguide 110' is used to transmit an optical signal. Waveguide 110' includes a ridge 112 and a thin film portion 114. In the embodiment shown in FIG. 1B, thin film portion 114 and ridge portion are formed from the same material (e.g. from the same thin film). Waveguide 110' may be formed of analogous materials as waveguide 110 and may have analogous performance.

Waveguide 110' may have a different configuration in some embodiments. For example, waveguide 110' may omit thin film portion 114 or reduce the size of thin film portion 114. Ridge 112 may have another configuration. For example, ridge 112 may be trapezoidal, semicircular, stacked rectangular and/or have another geometry that guides the optical signal in a manner analogous to that which is described herein. Other and/or additional materials may be used. In some embodiments, different portions of waveguide 110' are formed from different materials. For example, thin film portion 114 and ridge 112 may be formed of different materials. Thin film 114 may include a nonlinear optical material such as LN and/or LT, while ridge 112 may be formed of a passive material such as silicon and/or silicon nitride. In some embodiments, ridge 112 may be located below thin film portion 114 (e.g. ridge 112 may be between thin film portion 114 and an underlying substrate 101). Similarly, various other optical components may be incorporated into waveguide 110' to provide the desired phase modulation, polarization modulation, intensity modulation, IQ modulation, other modulation and/or other functionality. In some embodiments (not shown in FIGS. 1B-1C), waveguide 110 may include splitters to divide the optical signal into multiple branches for modulation and recombine the modulated optical signals for output. Thus, waveguide 110, as well as electrodes 120 and 130, may be configured to provide the desired functionality.

In some embodiments, the nonlinear optical material for waveguide 110' is formed as a thin film. For example, the thin film may have a thickness (e.g. of thin film portion 114 and ridge portion 112) of not more than three multiplied by the optical wavelengths for the optical signal carried in waveguide 110' before processing. In some embodiments, the thin film has a thickness (e.g. of thin film portion 114 and ridge portion 112) of not more than two multiplied by the optical wavelengths. In some embodiments, the nonlinear optical material has a thickness of not more than one multiplied by the optical wavelength. In some embodiments, the nonlinear optical material has a thickness of not more than 0.5 multiplied by the optical wavelengths. For example, the thin film may have a total thickness of not more than three micrometers as-deposited. In some embodiment, the thin film has a total thickness of not more than two micrometers. The thin film nonlinear optical material may be fabricated into waveguide 110' utilizing photolithography. For example, ultraviolet (UV) and/or deep ultraviolet (DUV) photolithography may be used to pattern masks for the nonlinear optical material. For DUV photolithography, the wavelength of light used is typically less than two hundred and fifty nanometers. To fabricate the waveguide, the thin film nonlinear optical material may undergo a physical etch, for example using dry etching, reactive ion etching (ME), inductively coupled plasma RIE. In some embodiments, a chemical etch and/or electron beam etch may be used. Waveguide 110' may thus have improved surface roughness. For example, the sidewall(s) of ridge 112 may have reduced surface roughness. For example, the short range root mean square surface roughness of a sidewall of the ridge 112 is less than ten nanometers. In some embodiments, this root mean square surface roughness is not more than five nanometers. In some cases, the short range root mean square surface roughness does not exceed two nanometers. Thus, waveguide 110' may have the optical losses in the range described above. In some embodiments, the height of ridge 112 is selected to provide a confinement of the optical mode such that there is a 10 dB reduction in intensity from the intensity at the center of ridge 112 at ten micrometers from the center of ridge 112. For example, the height of ridge 112 is on the order of a few hundred nanometers in some cases. However, other heights are possible in other embodiments.

A portion of waveguide 110' is proximate to electrodes 120' and 130' along the direction of transmission of the optical signal (e.g. from the input of the optical signal through waveguide 110' to the modulated optical signal output). The portion of waveguide 110' proximate to electrodes 120' and 130' may the lengths described above, for example a length greater than two millimeters in some embodiments, and greater than two or more centimeters in some such embodiments. Such lengths are possible at least in part because of the low optical losses per unit length for waveguide 110 described above. Further, the portion of waveguide 110' proximate to electrodes 120' and 130' has an optical mode cross-sectional area that is small, as described above for waveguide 110.

Electrodes 120' and 130' apply electric fields to waveguide 110. Electrode(s) 120' and/or 130' may be fabricated using deposition techniques, such as electroplating, and photolithography to shape the electrode 120' and/or 130'. The resulting electrode 120' and/or 130' may have a lower frequency dependent electrode loss, in the ranges described above with respect to electrodes 120 and 130. Electrode 120' includes a channel region 122' and extensions 124' (of which only one is labeled in FIG. 1B). Electrode 130' includes a channel region 132' and extensions 134' (of which only one is labeled in FIG. 1B). In some embodiments, extensions 124' or 134' may be omitted from electrode 120' or electrode 130', respectively. Extensions 124' and 134' are closer to waveguide 110' than channel region 122' and 132', respectively, are. For example, the distance s from extensions 124' and 134' to waveguide ridge 112 is less than the distance w from channels 122' and 132' to waveguide ridge 112. In the embodiment shown in FIG. 1B, extensions 124' and 134' are at substantially the same level as channel regions 122' and 132', respectively. In some embodiments, the extensions may protrude above and/or below the channel regions in addition to or in lieu of being at the same level.

Extensions 124' and 134' are in proximity to waveguide 110'. For example, extensions 124' and 134' are a vertical distance, d from waveguide 110'. The vertical distance to waveguide 110' may depend upon the cladding (not shown in FIG. 1B) used. The distance d is highly customizable in some cases. For example, d may range from zero (or less if electrodes 120' and 130' contact or are embedded in thin film portion 114) to greater than the height of ridge 112. However, d is generally still desired to be sufficiently small that electrodes 120' and 130' can apply the desired electric field to waveguide 110'. Extensions 124' and 134' are also a distance, s, from ridge 112. Extensions 124' and 134' are desired to be sufficiently close to waveguide 110' (e.g. close to ridge 112) that the desired electric field and index of refraction change can be achieved. However, extensions 124' and 134' are desired to be sufficiently far from waveguide 110' (e.g. from ridge 112) that their presence does not result in undue optical losses. Although the distance s is generally agnostic to specific geometry or thickness of waveguide 110', s may be selected to allow for both transverse electric and transverse optical modes that are confined differently in waveguide 110'. However, the optical field intensity at extensions 124' and 134' (and more at particularly sections 124B and 134B) is desired to be reduced to limit optical losses due to absorption of the optical field by the conductors in extensions 124' and 134'. Thus, s is sufficiently large that the total optical loss for waveguide 110', including losses due to absorption at extensions 124' and 134', is not more than the ranges described above (e.g. 10 dB or less in some embodiments, 8 dB or less in some embodiments, 4 dB or less in some embodiments). In some embodiments, s is selected so that optical field intensity at extensions 124' and 134' is less than −10 dB of the maximum optical field intensity in waveguide 110. In some embodiments, s is chosen such that the optical field intensity at extensions 124' and 134' is less than −40 dB of its maximum value in the waveguide. For example, extensions 124' and/or 134' may be at least two micrometers and not more than 2.5 micrometers from ridge 112 in some embodiments.

In the embodiment shown in FIG. 1B, extensions 124 have a connecting portion 124A and a retrograde portion 124B. Retrograde portion 124B is so named because a part of retrograde portion may be antiparallel to the direction of signal transmission through electrode 120. Similarly, extensions 134 have a connecting portion 134A and a retrograde portion 134B. Thus, extensions 124 and 134 have a "T"-shape. In some embodiments, other shapes are possible. For example, extensions 124 and/or 134 may have an "L"-shape, may omit the retrograde portion, may be rectangular, trapezoidal, parallelogram-shaped, may partially or fully wrap around a portion of waveguide 110, may have a curved retrograde portion 124B and/or 134B, and/or have another shape. Similarly, channel regions 122' and/or 132', which are shown as having a rectangular cross-section, may have another shape. Further, extensions 124' and/or 134' may be different sizes, as indicated by FIG. 1A. Although all extensions 124' and 134' are shown as the same distance from ridge 112, some of extensions 124' and/or some of extensions 134' may be different distances from ridge 112. Channel regions 122' and/or 132' may also have a varying size. In some embodiments, extensions 124' and 134', respectively, are desired to have a length, l (e.g. l=w−s), that corresponds to a frequency less than the Bragg frequency of the signal for electrodes 120' and 130', respectively. Thus, the length of extensions 124' and 134' may be desired to be not more than the microwave wavelength of the electrode signal divided by π at the highest frequency of operation for electrodes 120' and 130'. In some embodiments, the length of extensions 124' and 134' is desired to be less than the microwave wavelength divided by twelve. For example, if the maximum operation frequency is 300 GHz, which corresponds to a microwave wavelength of 440 micrometers in the substrate, extensions 124' and 134' are desired to be smaller than approximately 37 micrometers. Individual extensions 124' and/or 134' may be irregularly spaced or may be periodic. Periodic extensions have a constant pitch. In some embodiments, the pitch, p, is desired to be a distance corresponding to a frequency that is less than the Bragg frequency, as discussed above with respect to the length of extensions 124' and 134'. Thus, the pitch for extensions 124' and 134' may be desired to be not more than the microwave wavelength of the electrode signal divided by π at the highest frequency of operation for electrodes 120' and 130'. In some embodiments, the pitch is desired to be less than the microwave wavelength divided by twelve. In some embodiments, the pitch is desired to be less than the microwave wavelength divided by seventy two, allowing for a low ripple in group velocity.

Extensions 124' and 134' are closer to ridge 112 than channels 122' and 132', respectively, are (e.g. s<w). In some embodiments, a dielectric cladding (not explicitly shown in FIG. 1B) resides between electrodes 120' and 130' and waveguide 110'. As discussed above, extensions 124' and 134' are desired to have a length (w−s) that corresponds to a frequency less than the Bragg frequency of the signal for electrodes 120' and 130', respectively. Extensions 124' and 134' are also desired to be spaced apart from ridge 112 as indicated above (e.g. such that the absorption loss in waveguide 110' can be maintained at the desired level, such as 10 dB or less). The length of the extensions 124' and 134' and desired separation from ridge 112 (e.g. s) are considered in determining w. Although described in the context of a horizontal distance for FIGS. 1A-1C, the distance between electrode structures and the waveguide also applies for vertical configurations. Other distances between waveguide 110/ridge 112 and channel regions 122 and/or 132 are possible.

The geometries of electrodes 120' and 130' are analogous to that described with respect to electrodes 120 and 130. The sizes of particular portions of extensions 124' and 134' may be varied. For example, the length, d2, of connecting portion 124A and/or 134A may be selected so that the impedance of the electrode 120' and 130' respectively, is matched to that of a driver (not shown), e.g. 50Ω. In some embodiments, the gap between extensions 134' and 124' (in which waveguide ride 112 resides) may be configured to increase the electric field at waveguide ridge 112. In some embodiments, the gap between extensions 124' and 134' is at least one and not more than ten multiplied by the optical wavelength of the optical signal carried by waveguide 110'. However, too small a gap may cause current crowding and microwave loss in the electrode(s) 120' and/or 130'. In some embodiments, the width of a channel region 122' and/or 132' is selected to reduce microwave losses while attempting to match the microwave (electrode signal) velocity the optical signal velocity in waveguide 110. For example, electrode channel region 122' and/or 132' may have a width of at least two micrometers and not more than five hundred micrometers. The width of the retrograde portions 124B and/or 134B segments may be fine-tuned to allow low microwave losses while maintaining velocity matching and high frequency response range. For example, retrograde portions 124B and/or 134B may have a width (l−d2) of at least ten nanometers and not more than ten micrometers. The length, d3, of each retrograde portions 124B and/or 134B and the gap between adjacent retrograde portions 124B and/or 134 are chosen to allow efficient modulation and low microwave loss. For example, a duty cycle d3/(d3+d4) of at least 0.5 and not more than 0.9999 may be chosen in some embodiments. Other dimensions, including but not limited to those described herein, may be selected in some embodiments.

Optical device 100' operates in an analogous manner to optical device 100. Thus, optical device 100' may share the benefits of optical device 100. Use of nonlinear optical materials in waveguide 110' and the configuration of waveguide 110' (e.g. smoother sidewalls of ridge 112) may not only increase the electro-optic effect (e.g. provide for larger modulations in index of refraction), but also reduce optical losses. Consequently, a longer waveguide 110, larger total change in index of refraction and thus an enhanced modulation of the optical signal may be achieved. Use of electrodes 120' and 130' having extensions 124' and 134', respectively, may reduce microwave losses, allow for a large electric field at waveguide 110'/ridge 112 and improve the propagation of the microwave signal through electrodes 120' and 130', respectively. Consequently, performance of optical device 100' may be significantly enhanced.

This improvement in performance may be achieved for optical devices (e.g. 100 and/or 100') in which waveguide 110 and/or 110' includes or consists of electro-optic materials that have a microwave dielectric constant significantly exceeding the optical dielectric constant, when used at the design microwave and optical frequencies. Here for nonmagnetic materials, optical index is equal to or about the square root of the optical dielectric constant. For electro-optic materials in which the microwave dielectric constant significantly exceeds the optical dielectric constant (e.g. LN and LT), the microwave dielectric constant is at least 1.5 multiplied by the optical dielectric constant. In some cases, the microwave dielectric constant is at least 2 multiplied by the optical dielectric constant. In some instances, the microwave dielectric constant is at least 5 multiplied by the optical dielectric constant. In some such materials, the microwave dielectric constant is at least 10 multiplied by the optical dielectric constant. In some embodiments, therefore, the waveguide 110' including (or consisting of) such materials has a microwave dielectric constant that exceeds the optical dielectric constant (e.g. by a factor of at least 1.5, 2, 5, 10 or more). The optical dielectric constant and microwave dielectric constant affect the speed of transmission of the optical and microwave signals, respectively. The higher the optical dielectric constant, the lower the speed of transmission of the optical signal. Similarly, the higher the microwave dielectric constant, the lower the speed of transmission of the microwave signal.

Although the optical mode is generally well confined to the waveguide, the microwave mode may extend significantly outside of the electrodes. For example the microwave mode may extend into the waveguide. For bulk and other optical devices including waveguides formed of materials having a microwave dielectric constant that is large in comparison to the optical dielectric constant (e.g. LN and/or LT), the speed of transmission of the microwave signal in the waveguide material is reduced to a greater degree than the speed of the optical signal. Features in the electrodes, such as extensions, may also slow the transmission of the electrode signal in the electrodes. Thus, the velocity mismatch between the optical signal and the electrode signal is expected to be exacerbated by electrodes having features such as extension. In general, use of features such as extensions is disfavored in situations in which the waveguide material has a significantly larger microwave dielectric constant than optical dielectric constant (e.g. as for bulk LN and/or LT waveguides). Stated differently, the use of features on the electrodes is generally limited to cases in which the microwave dielectric constant of the waveguide material(s) is not significantly greater (e.g. by less than a factor of 1.5), about the same as, or less than the optical dielectric constant of the waveguide material(s) (e.g. III-V compounds materials such as indium phosphide and gallium arsenide).

In contrast, for optical device 100' (and 100), thin film waveguide 110' is used. In general, the optical mode is well confined to waveguide 110' (e.g. to ridge portion 112). This may be seen by the size of the optical mode depicted in FIG. 2. Referring back to FIG. 1B, the optical dielectric constant of waveguide 110' thus determines the velocity of the optical signal in waveguide 110'. However, the microwave mode for the microwave signal in electrodes 120' and/or 130' may extend over many structures. This may be seen by the size and location of the microwave mode depicted in FIG. 2. Referring back to FIG. 1B, the velocity of the microwave signal through electrodes 120' and 130' may thus be found using the microwave dielectric constant of multiple structures such as electrodes 120' and 130', waveguide 110', cladding (not shown in FIG. 1B) between substrate/underlayer(s) 101 and electrodes 120' and 130', substrate/underlayers 101, and air or any structures (not shown) above electrodes 120' and 130'. Thus, the contribution of the (large) microwave dielectric constant of waveguide 110' materials (e.g. LT and LN) may be mitigated by the (lower) microwave dielectric constant of surrounding structures. As such, the velocity mismatch between the optical signal in waveguide 110' and the electrode signal for electrode(s) 120' and/or 130' may still be mitigated while achieving the other benefits of extensions 124' and/or 134'.

Figure 1C:
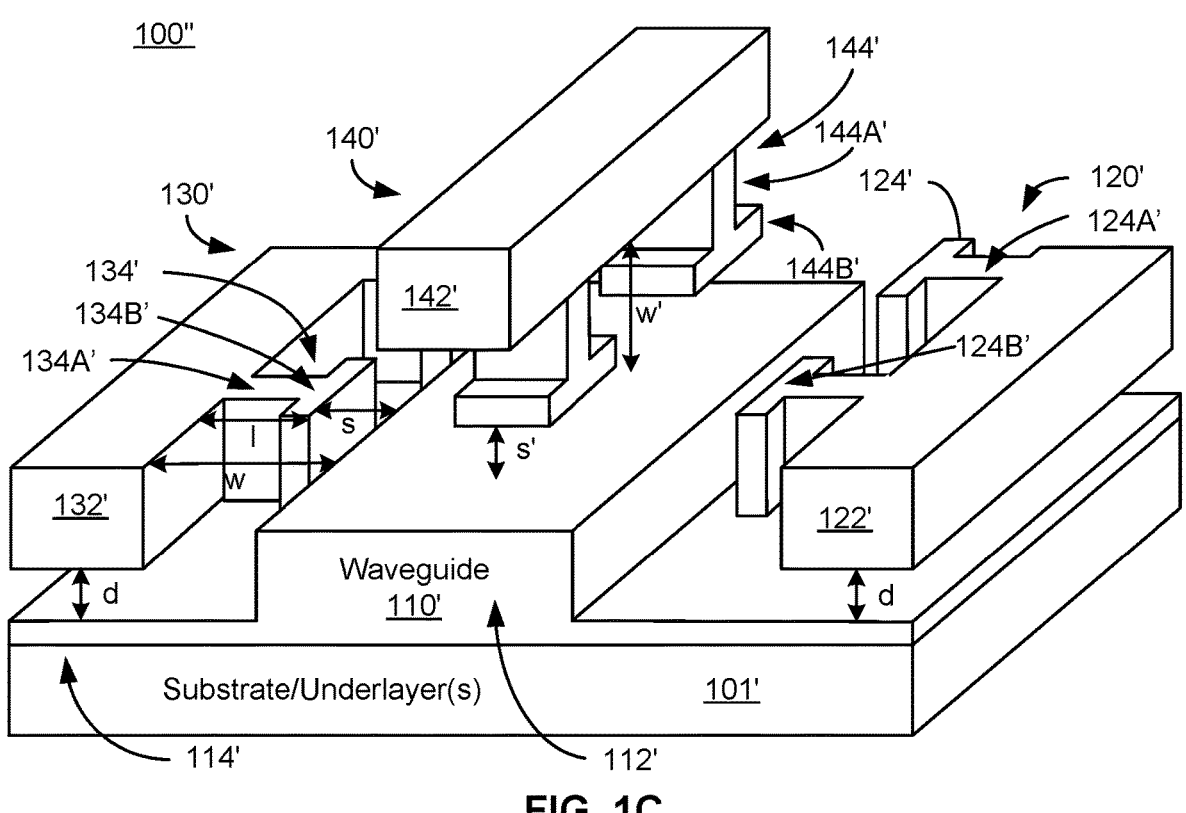

FIG. 1C depicts another embodiment of optical device 100". Optical device 100" is analogous to optical device(s) 100 and/or 100'. Consequently, similar structures have analogous labels. Thus, optical device 100" includes waveguide 110' and electrodes 120' and 130' that are analogous to waveguide 110 and electrodes 120 and 130, respectively. Similarly, electrodes 120' and 130' include channel regions 122' and 132', respectively, that are analogous to channel regions 122 and 132 for electrodes 120 and 130, respectively. Electrodes 120' and 130' include extensions 124' and 134', respectively, that are analogous to extensions 124 and 134 for electrodes 120 and 130, respectively. Extensions 124' and 134' include connecting portions 124A' and 134A' and retrograde portions 124B' and 134B' that are analogous to connecting portions 124A and 134A and retrograde portions 124B and 134B.

In some embodiments, optical devices 100 and 100' have electro-optic effects in the plane of thin film region 114 (e.g. is an x-cut or y-cut modulator). Optical device 100" has an electro-optic effect out of the plane of thin film region 114" (e.g. is a z-cut optical modulator). Consequently, a vertical electrical field is desired to be applied to waveguide 110". Thus, optical device 100" includes electrode 140' including extensions 144' having connecting portion 144A' and retrograde portion 144B'. Extensions 144' are analogous to extensions 124, 134, 124' and 134'. Thus, the discussion herein with respect to extensions 124 and 134 also applies to extensions 144'. For example, distances s' and w' correspond to distance s and w, respectively. Thus, optical devices having an electro-optic effect out-of-plane and having improved performance may also be provided.

Figure 1D:
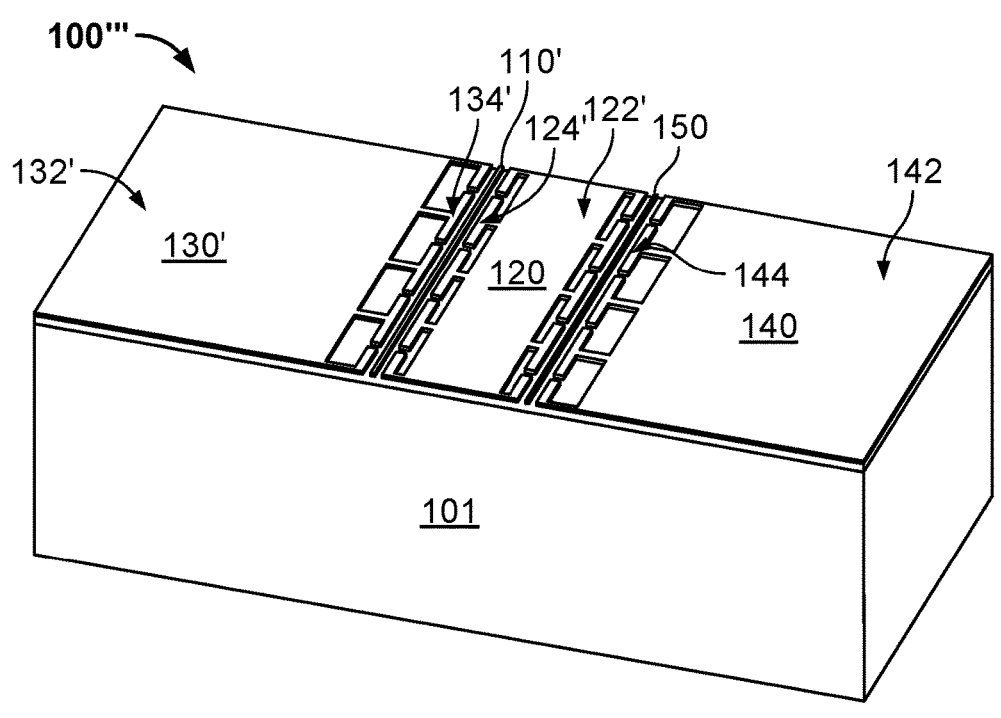

FIG. 1D depicts an embodiment of optical device 100'''. Optical device 100''' is analogous to optical device(s) 100, 100' and/or 100". Consequently, similar structures have analogous labels. Thus, optical device 100''' includes waveguide 110' and electrodes 120' and 130' that are analogous to waveguide 110/110' and electrodes 120/120' and 130/130', respectively. Similarly, electrodes 120' and 130' include channel regions 122' and 132', respectively, that are analogous to channel regions 122/122' and 132/132' for electrodes 120/120' and 130/130', respectively, of optical devices 100/100', respectively. Electrodes 120' and 130' include extensions 124' and 134', respectively, that are analogous to extensions 124/124' and 134/134' for electrodes 120/120' and 130/130', respectively, of optical devices 100/100', respectively. Extensions 124' and 134' include connecting portions 124A' and 134A' and retrograde portions 124B' and 134B' that are analogous to connecting portions 124A/124A' and 134A/134A' and retrograde portions 124B/124' and 134B/134B', respectively, of optical devices 100/100', respectively.

Optical device 100''' also includes an additional waveguide 150 and an additional electrode 140 having channel region 142 and extensions 144. Electrode 150 and extensions 154 are analogous to electrodes 120, 120', 130' and 130' and extensions 124, 124', 134 and 134', respectively. Similarly, waveguide 150 is analogous to waveguides 110 and 110'. In some embodiments, optical device 100''' may be part of an optical device such as a modulator or interferometer. For example, waveguides 110' and 150 may be split from a single waveguide upstream from the portion of optical device 100''' shown and may converge downstream from the portion of optical device 100''' shown.

Optical device 100''' operates in an analogous manner to optical devices 100, 100' and/or 100". Thus, optical device 100''' may share the benefits of optical device(s) 100, 100' and/or 100". Use of nonlinear optical materials in waveguide(s) 110' and/or 150 as well as the configuration of waveguide(s) 110' and/or 150 (e.g. smoother sidewalls of ridge 112) may not only increase the electro-optic effect, but also reduce optical losses. Consequently, longer waveguides 110' and 150, a larger total change in index of refraction and thus an enhanced modulation of the optical signals may be achieved. Use of electrodes 120', 130' and 140 having extensions 124', 134', and 144, respectively, may reduce microwave losses, allow for a large electric field at waveguides 110' and 140. This may improve the propagation of the microwave signal through electrodes 120', 130', and 140. Consequently, performance of optical device 100''' may be significantly enhanced.

Figure 1E:
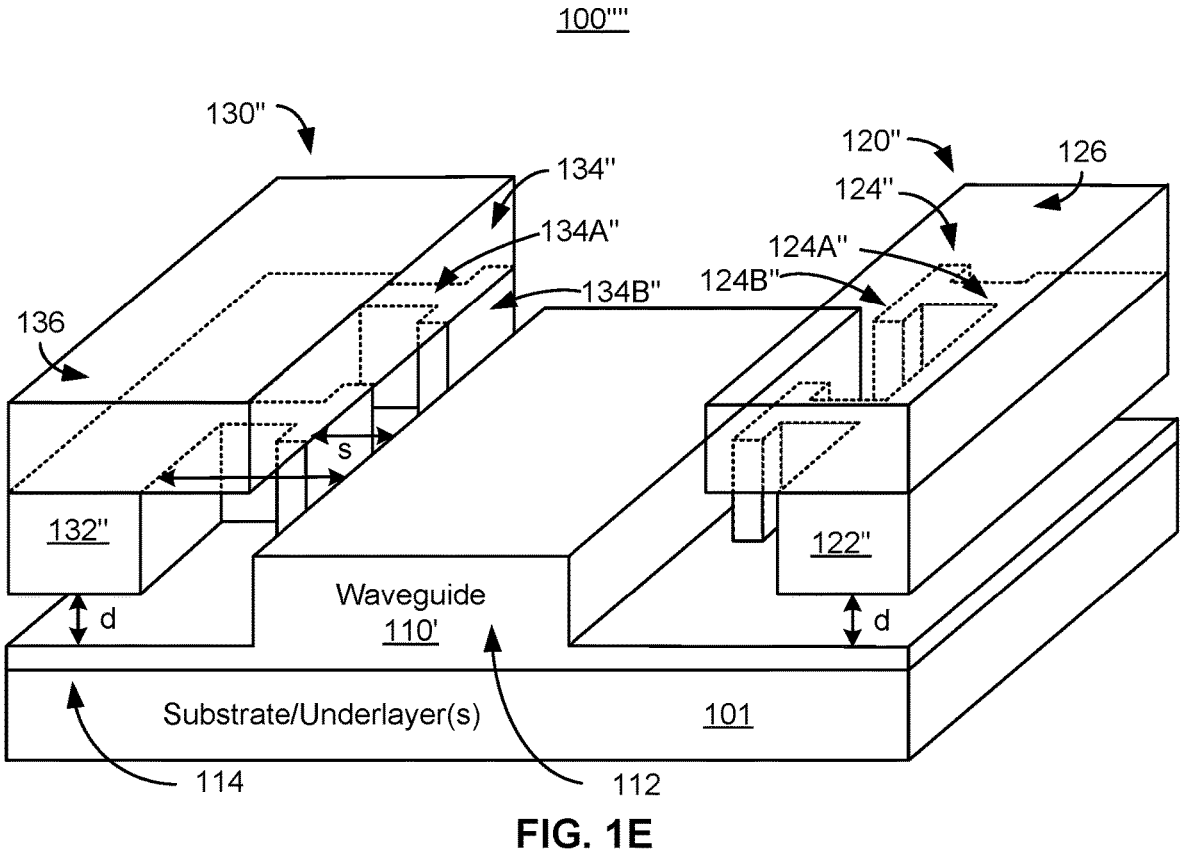

FIG. 1E depicts an embodiment of optical device 100''''. Optical device 100'''' is analogous to optical device(s) 100, 100', 100" and/or 100'''. Consequently, similar structures have analogous labels. Thus, optical device 100'''' includes waveguide 110' and electrodes 120" and 130" that are analogous to waveguide 110/110' and electrodes 120/120' and 130/130', respectively. Similarly, electrodes 120" and 130" include channel regions 122" and 132", respectively, that are analogous to channel regions 122/122' and 132/132' for electrodes 120/120' and 130/130', respectively, of optical devices 100/100', respectively. Electrodes 120" and 130" include extensions 124" and 134", respectively, that are analogous to extensions 124/124' and 134/134' for electrodes 120/120' and 130/130', respectively, of optical devices 100/100', respectively. Extensions 124" and 134" include connecting portions 124A" and 134A" and retrograde portions 124B" and 134B" that are analogous to connecting portions 124A/124A' and 134A/134A' and retrograde portions 124B/124' and 134B/134B', respectively, of optical devices 100/100', respectively.

Electrodes 120" and 130" each include an additional conductive layer 126 and 136, respectively. Thus, electrodes 120" and 130" may be capable of carrying additional current in conductive layers 126 and 136.

Optical device 100'''' operates in an analogous manner to optical devices 100, 100', 100" and/or 100'''. Thus, optical device 100'''' may share the benefits of optical device(s) 100, 100', 100" and/or 100'''. Use of nonlinear optical materials in waveguide 110' as well as the configuration of waveguide

110' (e.g. smoother sidewalls of ridge 112) may not only increase the electro-optic effect, but also reduce optical losses. Consequently, longer waveguides 110', a larger total change in index of refraction and thus an enhanced modulation of the optical signals may be achieved. Use of electrodes 120" and 130" having extensions 124" and 134", respectively, may reduce microwave losses, allow for a large electric field at waveguide 110'. This may improve the propagation of the microwave signal through electrodes 120" and 130". Consequently, performance of optical device 100" may be significantly enhanced.

Figures 2, 3, 4, 5:
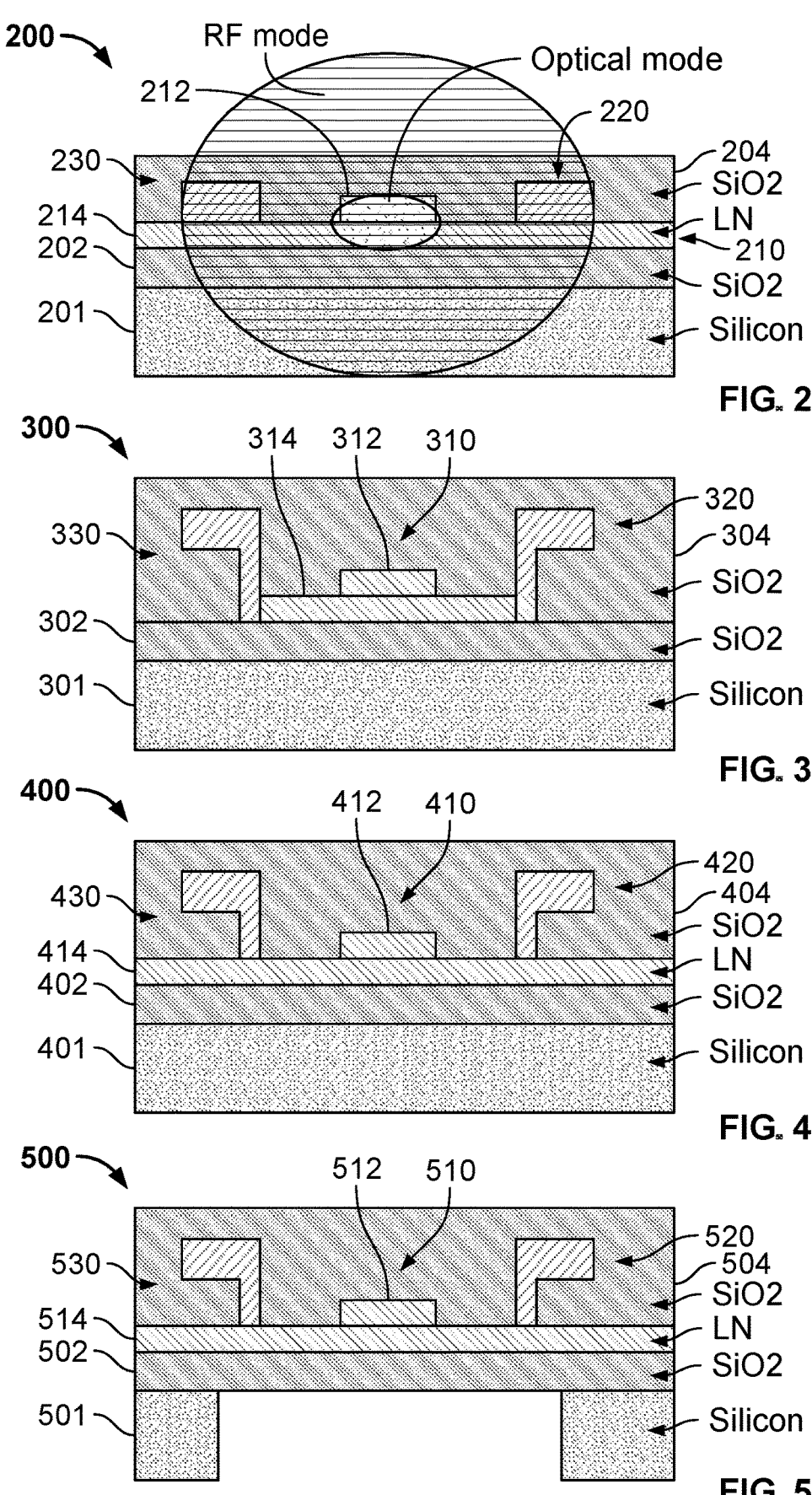
FIG. 2 depicts a cross-section of a portion of an embodi-ment of an optical device capable of having improved performance.
FIG. 3 depicts a cross-section of a portion of an embodi-ment of an optical device capable of having improved performance.
FIG. 4 depicts a cross-section of a portion of an embodi-ment of an optical device capable of having improved performance.
FIG. 5 depicts a cross-section of a portion of an embodi-ment of an optical device capable of having improved performance.

FIG. 2 depicts a cross-section of a portion of an embodiment of optical device 200 capable of having improved performance. Optical device 200 includes waveguide 210 and electrodes 220 and 230 that reside on substrate 201. Also shown is interlayer 202 and cladding 204. In the embodiment shown, substrate 201 is silicon, interlayer 202 is silicon dioxide and cladding 204 is silicon dioxide. In some embodiments other and/or additional materials may be used for substrate 201 and/or interlayer 202. The portion of waveguide 210 shown includes LN. However, other and/or additional electro-optic materials such as LT may be used. Waveguide 210 includes ridge 212 and thin film portion 214. Channel regions and extensions for electrodes 220 and 230 are not shown. Optical device 200 is analogous to optical device(s) 100, 100', 100", 100''' and/or 100''''. Thus, waveguide 210 and electrodes 220 and 230 are analogous to waveguide 110 and/or 110' and electrodes 120, 120', and/or 120" and 130, 130', and/or 130", respectively.

FIG. 2 indicates the relative sizes of the optical mode for the optical signal and the radio frequency (RF) mode (or microwave mode) for microwaves. FIG. 2 is not to scale and only a portion of optical device 200 is shown. As indicated in FIG. 2, the optical mode may be confined primarily to waveguide 210, interlayer 202 and cladding 204. In contrast, the microwave mode extends through multiple stacks 201, 202, 210, 220, 230 and 204. The microwave mode is thus subject to absorption losses from multiple stacks 201, 202, 204, 210, 220 and 230. Absorption from silicon substrate 201 may be particularly high. The use of a silicon substrate 201 may also affect the speed of the microwave signal through electrodes 220 and 230. Because of the small size of thin film waveguide 210, it is possible to engineer other portions of optical device 200 to reduce microwave absorption losses. For example, a portion of silicon substrate 201 may be removed or replaced, electrodes 220 and/or 230 may be moved, waveguide 210 may be reduced in size, other substrate(s) may be used, and/or other changes are possible. For example, interlayer 202 may be thick, such as at least three micrometers thick in some embodiments.

For example, FIGS. 3-5 depict embodiments of optical devices 300, 400 and 500 that may have further reduced microwave absorption losses. FIG. 3 depicts a cross-section of a portion of an embodiment of optical device 300 capable of having improved performance. FIG. 3 is not to scale and only a portion of optical device 300 is shown. Optical device 300 includes waveguide 310 and electrodes 320 and 330 that reside on substrate 301. Also shown is interlayer 302 and cladding 304. In the embodiment shown, substrate 301 is silicon, interlayer 302 is silicon dioxide and cladding 304 is silicon dioxide. In some embodiments other and/or additional materials may be used. The portion of waveguide 310 shown includes LN. However, other and/or additional materials such as LT may be used. Waveguide 310 includes ridge 312 and thin film portion 314. Channel regions and extensions for electrodes 320 and 330 are not shown. Optical device 300 is analogous to optical device 200. Thus, waveguide 310 and electrodes 320 and 330 are analogous to waveguide 210 and electrodes 220 and 230, respectively. Substrate 301, interlayer 302 and cladding 304 are also analogous to substrate 201, interlayer 202, and cladding 204, respectively. However, for optical device 300, electrodes 320 and 330 have been moved further from underlying silicon substrate 301. In some embodiments, electrodes 320 and 330 may be moved further form silicon substrate 301 by increasing the thickness of interlayer 302. For example, interlayer 302 may be at least three micrometers thick in some embodiments. This may be done in addition to or in lieu of moving electrodes further from thin film portion 314. In addition, thin film portion 314 of waveguide 310 has been reduced in size. Thus, absorption due to silicon substrate 301 and waveguide 310 may be reduced. In addition, changes in velocity of the microwave signal may also be reduced.

FIG. 4 depicts a cross-section of a portion of an embodiment of optical device 400 capable of having improved performance. FIG. 4 is not to scale and only a portion of optical device 400 is shown. Optical device 400 includes waveguide 410 and electrodes 420 and 430 that reside on substrate 401. Also shown is interlayer 402 and cladding 404. In the embodiment shown, substrate 401 is silicon, interlayer 402 is silicon dioxide and cladding 404 is silicon dioxide. In some embodiments other and/or additional materials may be used. The portion of waveguide 410 shown includes LN. However, other and/or additional materials such as LT may be used. Waveguide 410 includes ridge 412 and thin film portion 414. Channel regions and extensions for electrodes 420 and 430 are not shown. Optical device 400 is analogous to optical device 200. Thus, waveguide 410 and electrodes 420 and 430 are analogous to waveguide 210 and electrodes 220 and 230, respectively. Substrate 401, interlayer 402 and cladding 404 are also analogous to substrate 201, interlayer 202, and cladding 204, respectively. However, for optical device 400, electrodes 420 and 430 have been moved further from underlying silicon substrate 401. In some embodiments, electrodes 420 and 430 may be moved further form silicon substrate 401 by increasing the thickness of interlayer 402. This may be done in addition to or in lieu of moving electrodes further from thin film portion 414. Thus, absorption due to silicon substrate 401 may be reduced. In addition, changes in velocity of the microwave signal may also be reduced.

FIG. 5 depicts a cross-section of a portion of an embodiment of optical device 500 capable of having improved performance. FIG. 5 is not to scale and only a portion of optical device 500 is shown. Optical device 500 includes waveguide 510 and electrodes 520 and 530 that reside on substrate 501. Also shown is interlayer 502 and cladding 504. In the embodiment shown, substrate 501 is silicon, interlayer 502 is silicon dioxide and cladding 504 is silicon dioxide. In some embodiments other and/or additional materials may be used. The portion of waveguide 510 shown includes LN. However, other and/or additional materials such as LT may be used. Waveguide 510 includes ridge 512 and thin film portion 514. Channel regions and extensions for electrodes 520 and 530 are not shown. Optical device 500 is analogous to optical device 200. Thus, waveguide 510 and electrodes 520 and 530 are analogous to waveguide 210 and electrodes 220 and 230, respectively. Substrate 501, interlayer 502, and cladding 504 are analogous to substrate 201, interlayer 202 and cladding 204, respectively. However, for optical device 500, electrodes 520 and 530 have been moved further from underlying silicon substrate 301. In addition, part of silicon substrate 501 below ridge 512 has been removed. Thus, absorption due to silicon substrate 501 may be reduced. In addition, changes in velocity of the microwave signal may also be reduced. In some embodiments, another substrate may be selected in addition to or in lieu of removing a portion of the substrate.

Thus, microwave losses may be further mitigated. Consequently, in addition to the benefits of optical device(s) 100, 100', 100", 100'" and/or 100"", optical devices 300, 400 and 500 may have further reduced microwave absorption losses. Performance of optical devices 300, 400 and 500 may, therefore, be improved.

FIGS. 6, 7, 8, 9, 10 and 11 depict optical devices 600, 700, 800, 900, 1000 and 1100, respectively, capable of having improved performance. FIGS. 6-11 depict various electrode configurations. FIGS. 6-11 are not to scale and only portions of optical devices 600, 700, 800, 900, 1000 and 1100 are shown. Optical devices 600, 700, 800, 900, 1000 and 1100 are analogous to optical device(s) 100, 100', 100", 100'" and/or 100"". Analogous components have similar labels.

Figures 6, 7, 8:
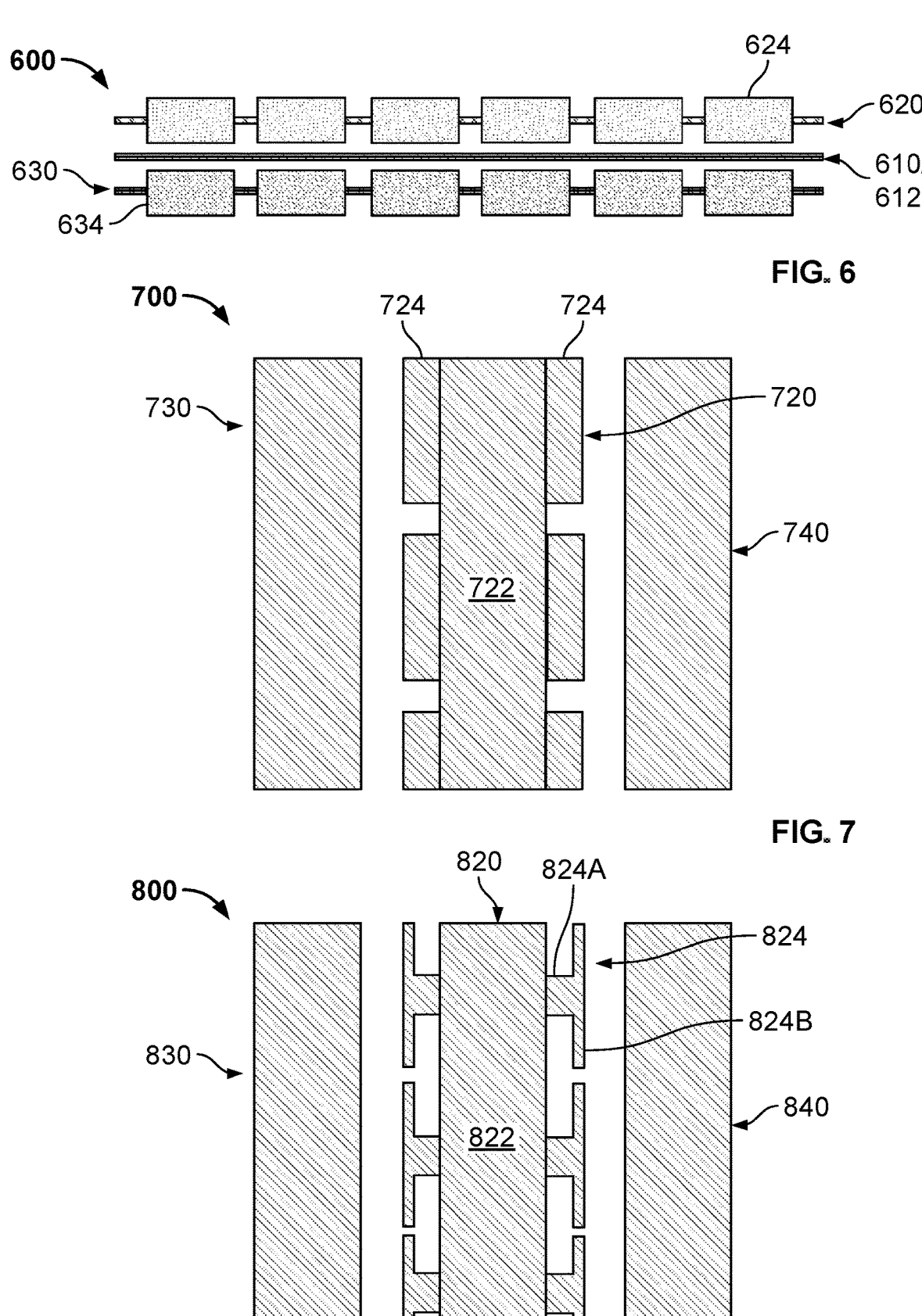
FIG. 6 depicts a portion of an embodiment of an optical device capable of having improved performance indicating an electrode configuration.
FIG. 7 depicts a portion of an embodiment of an optical device capable of having improved performance indicating an electrode configuration.
FIG. 8 depicts a portion of an embodiment of an optical device capable of having improved performance indicating an electrode configuration.

Referring to FIG. 6, electrodes 620 and 630 as well as waveguide 610 having ridge 612 are shown. Also indicated in FIG. 6 are extensions 624 and 634 (only one of each is labeled). As discussed above, extensions 624 and 634 for electrodes 620 and 630 may improve performance. In the embodiment shown in FIG. 6, extensions 624 and 634 are regularly spaced. Thus, extensions 624 and 634 are periodic and have a constant pitch. Extensions 624 and 634 are also all the same size. However, other configurations are possible. For example, extensions 624 and 634 may have different sizes and different pitches. Thus, optical device 600 may share the benefits of optical device(s) 100, 100', 100", 100'" and/or 100"".

FIG. 7 depicts optical device 700. For clarity, only electrodes 720, 730 and 740 are shown. In general, a waveguide/ridge resides between electrode 720 and electrode 730. Another waveguide/ridge (or waveguide/ridge branch) resides between electrode 720 and electrode 740. In some embodiments, electrode 720 carries a microwave signal, while electrodes 730 and 740 are ground. However, other configurations are possible. In the embodiment shown, only electrode 720 has channel region 722 and extensions 724. Extensions 724 are rectangular in shape. However, electrodes 730 and 740 are free of extensions. Because of the presence of extensions 724, current may be more readily driven through channel region 722. Thus, optical device 700 may share the benefits of optical device(s) 100, 100', 100", 100'" and/or 100"".

FIG. 8 depicts optical device 800. For clarity, only electrodes 820, 830 and 840 are shown. In general, a waveguide/ridge resides between electrode 820 and electrode 830. Another waveguide/ridge (or waveguide/ridge branch) resides between electrode 820 and electrode 840. In some embodiments, electrode 820 carries a microwave signal, while electrodes 830 and 840 are ground. However, other configurations are possible. In the embodiment shown, only electrode 820 has channel region 822 and extensions 824. Extensions 824 are "T"-shaped. Thus, extensions 824 include a connecting portion 824A and a retrograde portion 824B. Electrodes 830 and 840 are free of extensions. Because of the presence of extensions 824, current may be more readily driven through channel region 822. Thus, optical device 800 may share the benefits of optical device (s) 100, 100', 100", 100'" and/or 100"".

Figures 9, 10, 11:
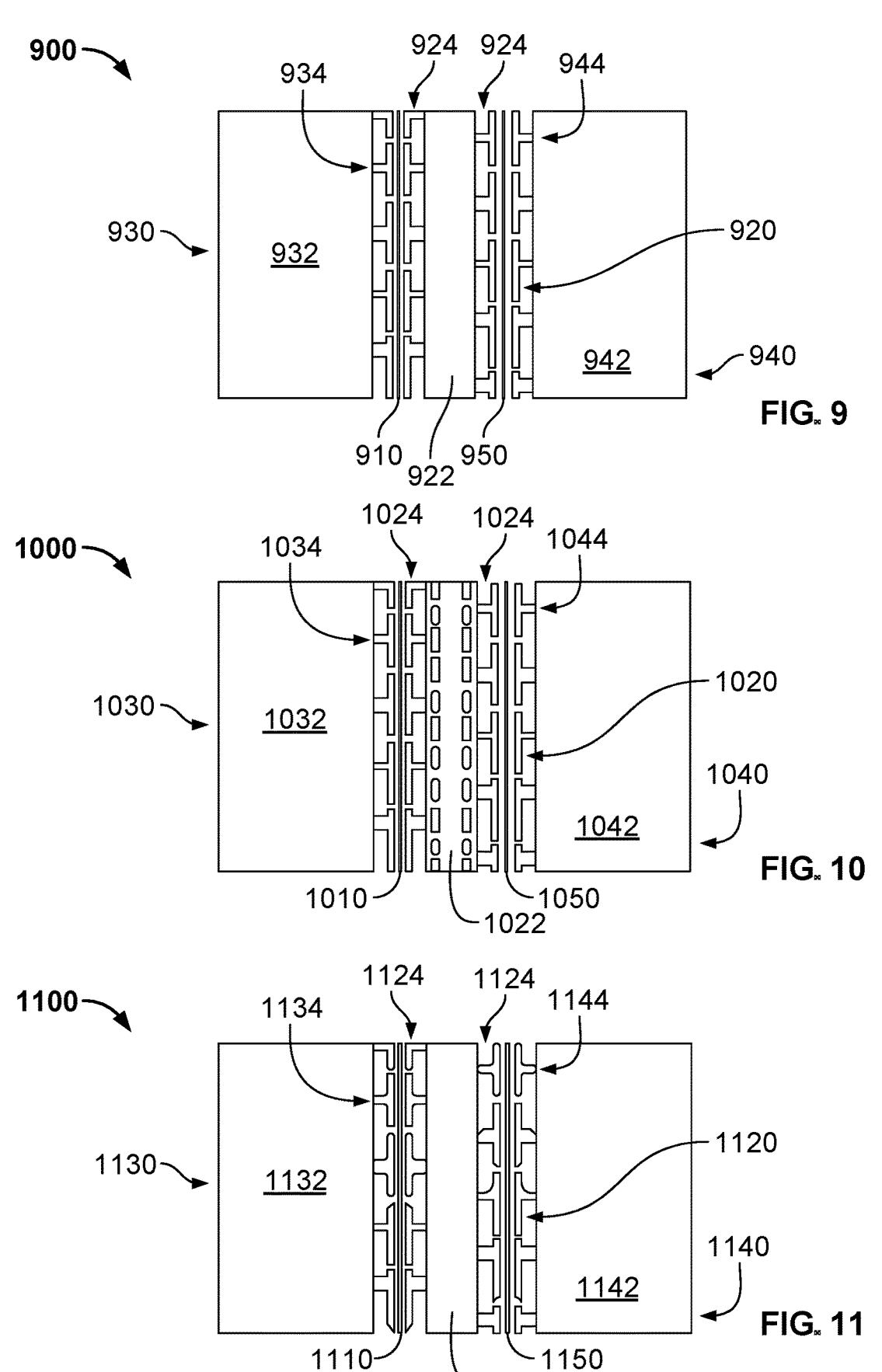
FIG. 9 depicts a portion of an embodiment of an optical device capable of having improved performance indicating an electrode configuration.
FIG. 10 depicts a portion of an embodiment of an optical device capable of having improved performance indicating an electrode configuration.
FIG. 11 depicts a portion of an embodiment of an optical device capable of having improved performance indicating an electrode configuration.

FIG. 9 depicts optical device 900. Electrodes 920, 930 and 940 are shown. Waveguide/ridge 910 resides between electrode 920 and electrode 930. Another waveguide/ridge (or waveguide/ridge branch) 950 resides between electrode 920 and electrode 940. In some embodiments, electrode 920 carries a microwave signal, while electrodes 930 and 940 are ground. However, other configurations are possible. In the embodiment shown, electrode 920 has channel region 922 and extensions 924. Similarly, electrode 930 has channel region 932 and extensions 934. Electrode 940 has channel region 942 and extensions 944. Extensions 924, 934 and 944 are generally "T"-shaped, but have different lengths and are not periodic (e.g. are irregularly spaced and have a varying pitch). Because of the presence of extensions 924, 934 and 944, current may be more readily driven through channel regions 922, 932 and 942. Thus, optical device 900 may share the benefits of optical device(s) 100, 100', 100", 100''' and/or 100''''.

FIG. 10 depicts optical device 1000. Electrodes 1020, 1030 and 1040 are shown. Waveguide/ridge 1010 resides between electrode 1020 and electrode 1030. Another waveguide/ridge (or waveguide/ridge branch) 1050 resides between electrode 1020 and electrode 1040. In some embodiments, electrode 1020 carries a microwave signal, while electrodes 1030 and 1040 are ground. However, other configurations are possible. In the embodiment shown, electrode 1020 has channel region 1022 and extensions 1024. Electrode 1030 has channel region 1032 and extensions 1034. Electrode 1040 has channel region 1042 and extensions 1044. Extensions 1024, 1034 and 1044 have various shapes and are irregularly spaced. In addition, channel 1022 has cutouts. However, channel 1022 still has a straight central region that can carry current. Because of the presence of extensions 1024, 1034 and 1044 current may still be more readily driven through channel regions 1022, 1032 and 1042, respectively. Thus, optical device 1000 may share the benefits of optical device(s) 100, 100', 100", 100''' and/or 100''''.

FIG. 11 depicts optical device 1100. Electrodes 1120, 1130 and 1140 are shown. Waveguide/ridge 1110 resides between electrode 1120 and electrode 1130. Another waveguide/ridge (or waveguide/ridge branch) 1150 resides between electrode 1120 and electrode 1140. In some embodiments, electrode 1120 carries a microwave signal, while electrodes 1130 and 1140 are ground. However, other configurations are possible. In the embodiment shown, electrode 1120 has channel region 1122 and extensions 1124. Electrode 1130 has channel region 1132 and extensions 1134. Electrode 1140 has channel region 1142 and extensions 1144. Extensions 1124, 1134 and 1144 have various shapes and are irregularly spaced. Because of the presence of extensions 1124, 1134 and 1144, current may still be more readily driven through channel regions 1122, 1132 and 1142, respectively. Thus, optical device 1100 may share the benefits of optical device 100(*s*), 100', 100", 100''' and/or 100''''. Thus, as indicated by optical devices 600, 700, 800, 900, 1000 and 1100, various configurations of extensions may be used for electrodes.

Figures 12A, 12B, 12C, 12D:
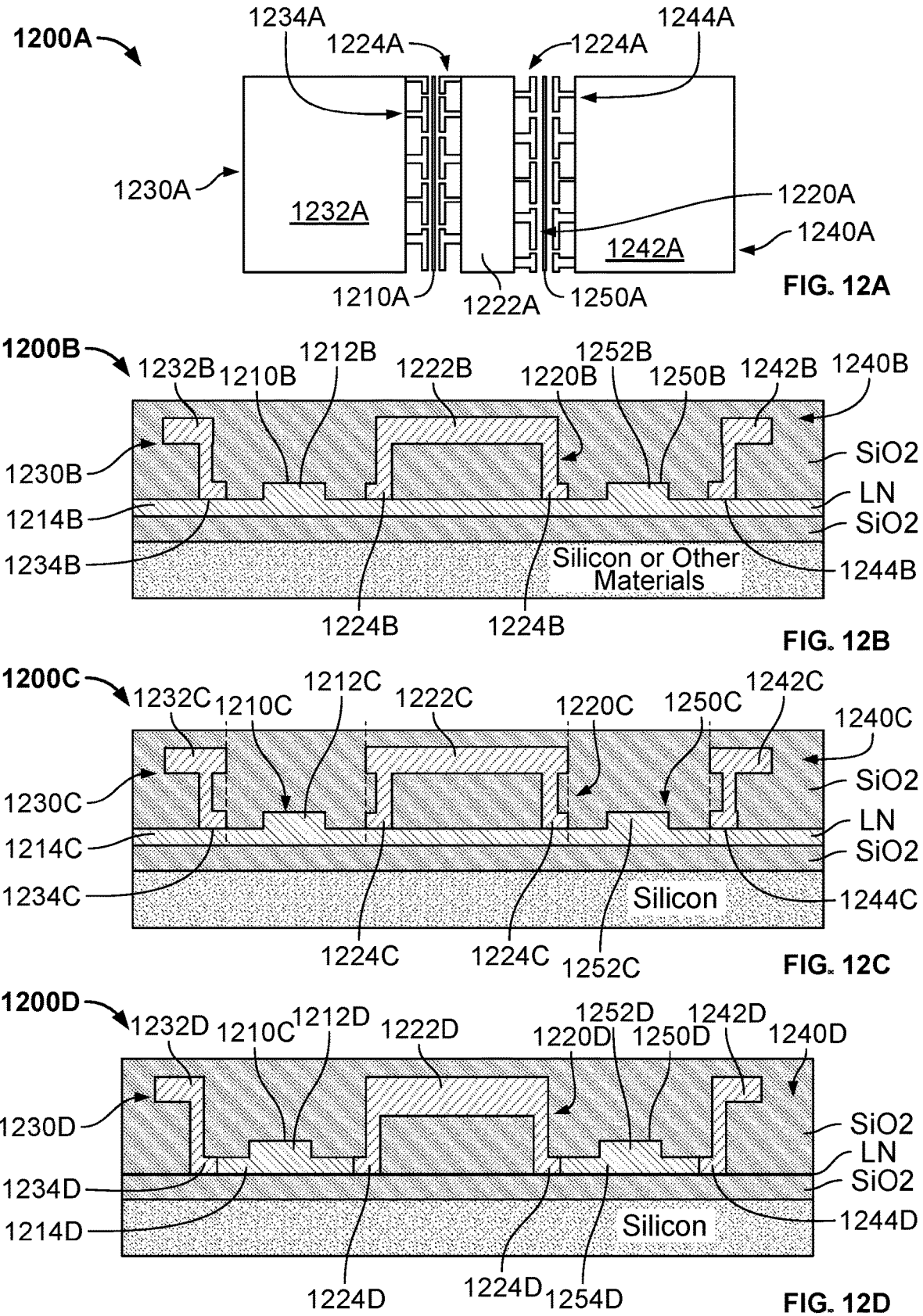
FIGS. 12A-12D depict portions of embodiments of opti-cal devices capable of having improved performance indi-cating various electrode configurations.

FIGS. 12A-12D depict portions of embodiments of optical devices 1200A, 1200B, 1200C and 1200D capable of having improved performance indicating various electrode configurations. FIGS. 12A-12D are not to scale and only portions of optical devices 1200A, 1200B, 1200C and 1200D are shown. Optical devices 1200A, 1200B, 1200C and 1200D are analogous to optical device(s) 100, 100', 100", 100' and/or 100''''. Thus, analogous components have similar labels (e.g. waveguide 1210 is analogous to waveguide 110'). FIG. 12A depicts a plan view of optical device 1200A. FIGS. 12B-12D depict cross-sectional views of portions of optical devices 1200B, 1200C and 1200D. FIGS. 12A-12D demonstrate that although the cross-sectional views of some optical devices differ, they may share the same plan view. Conversely, although the cross-sectional views may be similar, some optical devices may have different plan views.

Referring to FIG. 12A, electrodes 1220A, 1230A and 1240A as well as waveguides 1210A and 1250A are shown. The portion of waveguides 1210A and 1250A shown in FIG. 12A correspond to a ridge in some embodiments. Electrodes 1220A, 1230A and 1240A have channel regions 1222A, 1232A and 1242A, respectively. Electrodes 1220A, 1230A and 1240A also include extensions 1224A, 1234A and 1244A. As discussed above, extensions 1224A, 1234A and 1244A for electrodes 1220A, 1230A and 1240A may improve performance. In some embodiments, channels 1222A, 1232A and 1242A are at the same level as extensions 1224A, 1234A and 1244A, respectively.

FIG. 12B depicts optical device 1200B sharing the plan view of optical device 1200A. Thus, optical device 1200B includes electrodes 1220B, 1230B and 1240B as well as waveguides 1210B and 1250B. Waveguides 1210B and 1250B include ridges 1222B and 1252B, respectively. Waveguides 1210B and 1250B share a common thin film portion 1214C. Electrodes 1220B, 1230B and 1240B have channel regions 1222B, 1232B and 1242B, respectively. Electrodes 1220B, 1230B and 1240B also include extensions 1224B, 1234B and 1244B. As discussed above, extensions 1224B, 1234B and 1244B for electrodes 1220B, 1230B and 1240B may improve performance. Although sharing the same plan view as optical device 1200A, channel regions 1222B, 1232B and 1242B have been raised to a higher level (further from the substrate) than extensions 1224B, 1234B and 1244B. Optical device 1200B functions in an analogous manner as optical device 1200A and, therefore, may share the benefits of optical device 100.

FIG. 12C depicts optical device 1200C that has a cross-sectional view very similar to optical device 1200B. Optical device 1200C includes electrodes 1220C, 1230C and 1240C as well as waveguides 1210C and 1250C. Waveguides 1210C and 1250C include ridges 1222C and 1252C, respectively. Waveguides 1210B and 1250B share a common thin film portion 1214C. Electrodes 1220C, 1230C and 1240C have channel regions 1222C, 1232C and 1242C, respectively. Electrodes 1220C, 1230C and 1240C also include extensions 1224C, 1234C and 1244C. As discussed above, extensions 1224C, 1234C and 1244C for electrodes 1220C, 1230C and 1240C may improve performance. Although sharing similar cross-sectional views, optical device 1200C has a different plan view than optical devices 1200A and 1200B. As can be seen by dotted lines in FIGS. 12C, the outer edges of extensions 1224C, 1234C and 1244C align with the outer edges of channel regions 1222C, 1232C and 142C, respectively. Thus, electrodes 1220C, 1230C and 1240C would appear rectangular from above. Stated differently, extensions 1224C, 1234C and 1244C would not be apparent from a plan view. However, extensions 1224C, 1234C and 1244C are still closer to waveguide 1210C/ridge 1212C and waveguide 1250C/ridge 1252C than the corresponding channel regions 1222C, 1232C and 1242C. Optical device 1200C functions in an analogous manner as optical devices 1200A and 1200B. Thus, despite having a different plan view, optical device 1200C may share the benefits of optical devices 100, 1200A and/or 1200B.

FIG. 12D depicts optical device 1200D sharing the plan view of optical device 1200A. Thus, optical device 1200D includes electrodes 1220D, 1230D and 1240B as well as waveguides 1210D and 1250D. Waveguides 1210D and 1250D include ridges 1222D and 1252D, respectively. Waveguides 1210D and 1250D each includes a thin film portion 1214D and 1254D, respectively. Electrodes 1220D, 1230D and 1240D have channel regions 1222D, 1232D and 1242D, respectively. Electrodes 1220D, 1230D and 1240D also include extensions 1224D, 1234D and 1244D. As discussed above, extensions 1224D, 1234D and 1244D for electrodes 1220D, 1230D and 1240D may improve performance. Although sharing the same plan view as optical device 1200A, thin film portions 1214D and 1254D of waveguides 1210D and 1250D, respectively, have been reduced in size. Optical device 1200D functions in an analogous manner as optical devices 1200A, 1200B and 1200C. Thus, optical device 1200D may share the benefits of optical devices 100, 1200A, 1200B and/or 1200C.

FIGS. 13A-13J depict portions of embodiments of optical devices 1300A, 1300B, 1300C, 1300D, 1300E, 1300F, 1300G, 1300H, 1300I and 1300J capable of having improved performance and indicating various electrode configurations. FIGS. 13A-13J are not to scale and only portions of optical devices 1300A, 1300B, 1300C, 1300D, 1300E, 1300F, 1300G, 1300H, 1300I and 1300J are shown. FIGS. 13A-13J demonstrate various configurations of electrodes that may be used for an x-cut or y-cut waveguide structure. Optical devices 1300A, 1300B, 1300C, 1300D, 1300E, 1300F, 1300G, 1300H, 1300I and 1300J are analogous to optical device(s) 100, 100', 100", 100''' and/or 100''''. Thus, analogous components have similar labels (e.g. waveguide ridge 1312A is analogous to waveguide ridge 112). For clarity, electrodes are generally depicted as a rectangle in FIGS. 13A-13I. However, such electrodes may include channel regions, extensions, and/or other features described herein. Thus, electrodes shown in FIGS. 13A-13I primarily depict locations of the electrodes.

Figures 13A, 13B, 13C, 13D, 13E:
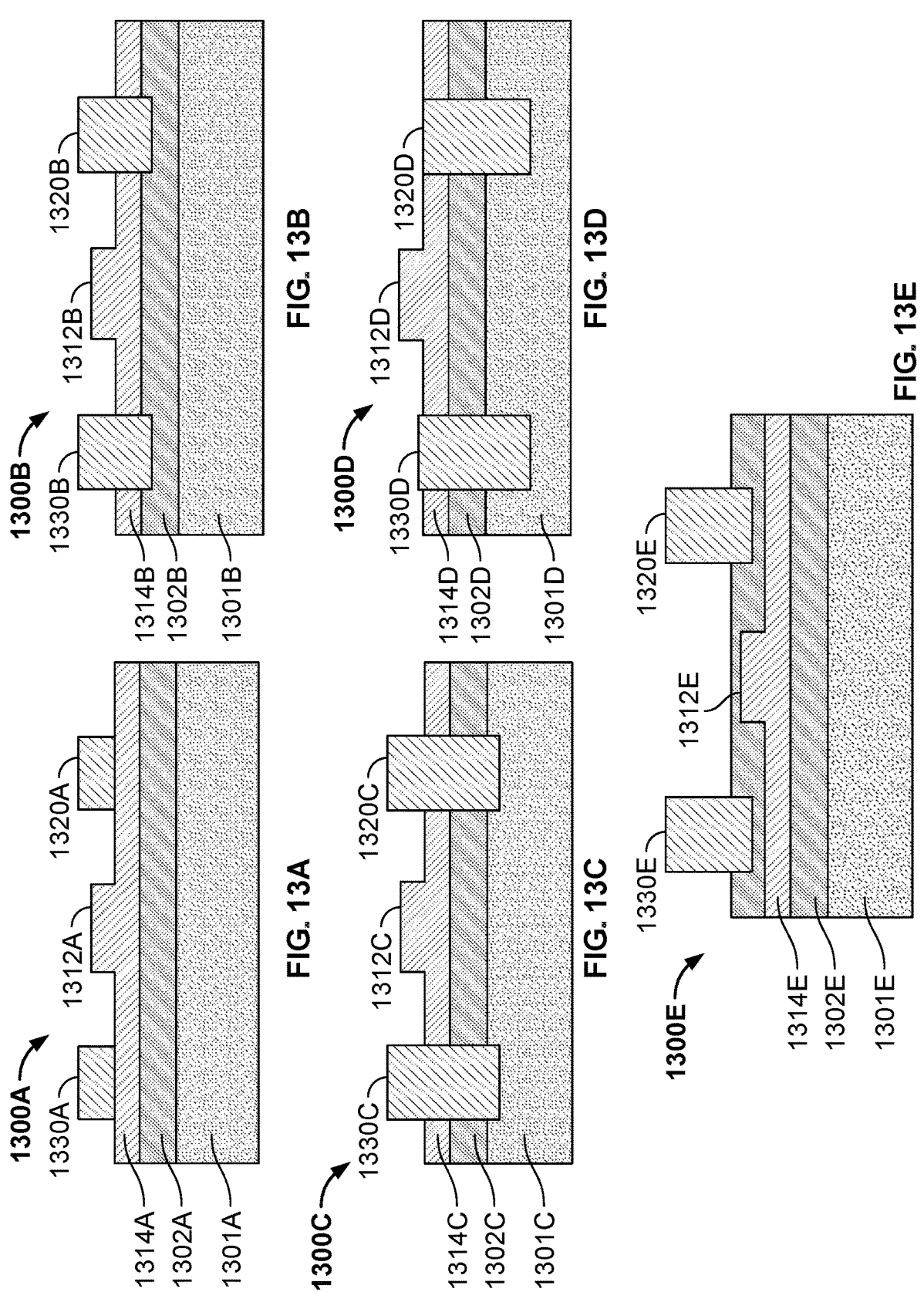

FIG. 13A depicts optical device 1300A including a waveguide having ridge 1312A and thin film portion 1314A and electrodes 1320A and 1330A. Also shown are substrate 1301A and interlayer 1302A. Extensions for electrodes are desired to be proximate to the corresponding waveguide. In some embodiments, a portion of the extensions for the electrodes are desired to be between the top of the ridge and the top of the thin film portion of the waveguide. Thus, electrodes 1320A and 1330A share an interface with thin film portion 1314A of the waveguide. More specifically, electrodes 1320A and 1330A contact the top surface of thin film portion 1314A.

FIG. 13B depicts optical device 1300B including a waveguide having ridge 1312B and thin film portion 1314B and electrodes 1320B and 1330B. Also shown are substrate 1301B and interlayer 1302B. Extensions for electrodes are desired to be proximate to the corresponding waveguide. Electrodes 1320B and 1330B extend from above the top of waveguide ridge 1312B through thin film portion 1314B of the waveguide into interlayer 1302B.

FIG. 13C depicts optical device 1300C including a waveguide having ridge 1312C and thin film portion 1314C and electrodes 1320C and 1330C. Also shown are substrate 1301C and interlayer 1302C. Extensions for electrodes are desired to be proximate to the corresponding waveguide. Electrodes 1320C and 1330C extend from above the top of waveguide ridge 1312C through thin film portion 1314C of the waveguide into substrate 1301C.

FIG. 13D depicts optical device 1300D including a waveguide having ridge 1312D and thin film portion 1314D and electrodes 1320D and 1330D. Also shown are substrate 1301D and interlayer 1302D. Extensions for electrodes are desired to be proximate to the corresponding waveguide. Electrodes extensions 1320D and 1330D extend from between the top of waveguide ridge 1312D and the top of waveguide thin film portion 1314D, through thin film portion 1314D and into substrate 1301D.

FIG. 13E depicts optical device 1300E including a waveguide having ridge 1312E and thin film portion 1314E and electrodes 1320E and 1330E. Also shown are substrate 1301E and interlayer 1302E. Extensions for electrodes are desired to be proximate to the corresponding waveguide. Electrodes 1320E and 1330E extend from above the top of waveguide ridge 1312E to between the top of waveguide ridge 1312E and the top of waveguide thin film portion 1314E.

FIG. 13F depicts optical device 1300F including a waveguide having structure 1312F and thin film portion 1314F and electrodes 1320F and 1330F. Also shown are substrate 1301F and interlayer 1302F. Extensions for electrodes are desired to be proximate to the corresponding waveguide. Electrodes 1320F and 1330F extend from above the top of structure 1312F to between the top of waveguide structure 1312F and the top of waveguide thin film portion 1314F. Further, structure 1312F corresponds to a waveguide ridge. However, in the embodiment shown, structure 1312 may be another component, such as a heater.

FIG. 13G depicts optical device 1300G including a waveguide having ridge 1312G and thin film portion 1314G and electrodes 1320G and 1330G. Also shown are substrate 1301G and interlayer 1302G. Extensions for electrodes are desired to be proximate to the corresponding waveguide. Electrodes 1320G and 1330G extend from above the thin film portion 1314G to within waveguide thin film portion 1314G. Further, waveguide ridge 1312G is below waveguide thin film portion 1314G.

FIG. 13H depicts optical device 1300H including a waveguide having structure 1312H and thin film portion 1314H and electrodes 1320H and 1330H. Also shown are substrate 1301H and interlayer 1302H. Extensions for electrodes are desired to be proximate to the corresponding waveguide. Electrodes 1320H and 1330H extend from above the top of thin film portion 1314H to within waveguide thin film portion 1314H. Structure 1312H may be a heater or analogous component corresponding to a waveguide ridge. Moreover, structure 1312H resides below waveguide thin film portion 1314H.

FIG. 13I depicts optical device 1300I including a waveguide having structure 1312I and thin film portion 1314I and electrodes 1320I and 1330I. Also shown are substrate 1301I and interlayer 1302I. Extensions for electrodes are desired to be proximate to the corresponding waveguide. Electrodes 1320I and 1330I extend from below the bottom of structure 1312I to the bottom surface of waveguide thin film portion 1314I. Structure 1312i may be a heater or analogous component corresponding to a waveguide ridge and resides below waveguide thin film portion 1314I.

FIG. 13J depicts optical device 1300J including a waveguide having ridge 1312J and thin film portion 1314J and electrodes 1320J and 1330IJ. Also shown are substrate 1301I and interlayer 1302I. Electrode 1320J includes channel region 1322J and extensions 1324J. Electrode 1330J includes channel region 1332J and extensions 1334J. As can be seen in optical device 1330J, channel regions 1322J and/or 1332J need not have a rectangular cross-section.

Thus, despite varying electrode and waveguide configurations, optical devices 1300A, 1300B, 1300C, 1300D, 1300E, 1300F, 1300G, 1300H, 1300I and 1300J are analogous to optical device 100. Consequently, optical devices 1300A, 1300B, 1300C, 1300D, 1300E, 1300F, 1300G, 1300H, 1300I and 1300J may share the benefits of optical device(s) 100, 100', 100", 100''' and/or 100''''.

FIGS. 14A-14K depict portions of embodiments of optical devices 1400A, 1400B, 1400C, 1400D, 1400E, 1400F, 1400G, 1400H, 1400I, 1400J, and 1400K capable of having improved performance and indicating various electrode configurations. FIGS. 14A-14K are not to scale and only portions of optical devices 1400A, 1400B, 1400C, 1400D, 1400E, 1400F, 1400G, 1400H, 1400I, 1400J, and 1400K are shown. Optical devices 1400A, 1400B, 1400C, 1400D, 1400E, 1400F, 1400G, 1400H, 1400I, 1400J, and 1400K are analogous to optical device(s) 100, 100', 100", 100''' and/or 100''''. Thus, analogous components have similar labels (e.g. waveguide ridge 1412A is analogous to waveguide ridge 112). Although present, channel regions and extensions are not separately depicted in FIGS. 14A-14D. FIGS. 14A-14K demonstrate various configurations of electrodes that may be used for waveguide structures in which the electro-optic effect is out of the thin film plane (e.g. z-cut waveguides). For clarity, electrodes are generally depicted as a rectangle in FIGS. 14A-14D. However, such electrodes may include channel regions, extensions, and/or other features described herein. Thus, the electrodes depicted in FIGS. 14A-14D primarily indicate the position of the electrode. Extensions and other features of some embodiments are more clearly shown in FIGS. 14E-14K.

FIG. 14A depicts optical device 1400A including a waveguide having ridge 1412A and thin film portion 1414A as well as electrodes 1420A and 1430A. Also shown are substrate 1401A and interlayer 1402A. Electrodes are desired to be proximate to the corresponding waveguide and to provide a vertical field in the region of ridge 1412A. Thus, electrode 1420A is above ridge 1412A, while electrode 1430A is a film below ridge 1412A and extending horizontally.

FIG. 14A depicts optical device 1400A including a waveguide having ridge 1412A and thin film portion 1414A as well as electrodes 1420A and 1430A. Also shown are substrate 1401A and interlayer 1402A. Electrodes are desired to be proximate to the corresponding waveguide and to provide a vertical field in the region of ridge 1412A. Thus, electrode 1420A is above ridge 1412A, while electrode 1430A is a film below ridge 1412A and extending horizontally.

FIG. 14B depicts optical device 1400B including a waveguide having ridge 1412B and thin film portion 1414B as well as electrodes 1420B, 1430B and 1440B. Also shown are substrate 1401B and interlayer 1402B. Electrodes are desired to be proximate to the corresponding waveguide and to provide a vertical field in the region of ridge 1412B. Thus, electrode 1420B is above ridge 1412B, while electrodes 1430B and 1440B are on the sides of and extend below ridge 1412C. Electrodes 1430B and 1440B terminate close to or in thin film portion 1414B. Thus, the electric field in the region of ridge 1412B is substantially vertical (in the z-direction).

FIG. 14C depicts optical device 1400C including a waveguide having ridge 1412C and thin film portion 1414C as well as electrodes 1420C, 1430C and 1440C. Also shown are substrate 1401C and interlayer 1402C. Electrodes are desired to be proximate to the corresponding waveguide and to provide a vertical field in the region of ridge 1412C. Thus, electrode 1420C is above ridge 1412C, while electrodes 1430C and 1440C are on the sides of and extend below ridge 1412C. Electrodes 1430C and 1440C extend through waveguide thin film portion 1414C. Thus, the electric field in the region of ridge 1412C is substantially vertical (in the z-direction).

FIG. 14D depicts optical device 1400D including a waveguide having structure 1412D and thin film portion 1414D as well as electrodes 1420D and 1430D. Also shown are substrate 1401D and interlayer 1402D. Electrodes are desired to be proximate to the corresponding waveguide and to provide a vertical field in the region of structure 1412D. Thus, electrode 1420D is above structure 1412D, while electrode 1430D is a film below structure 1412D and extending horizontally. Structure 1412D is below waveguide thin film portion 1414D and may be a heater or analogous component.

Figures 14E, 14F, 14G:
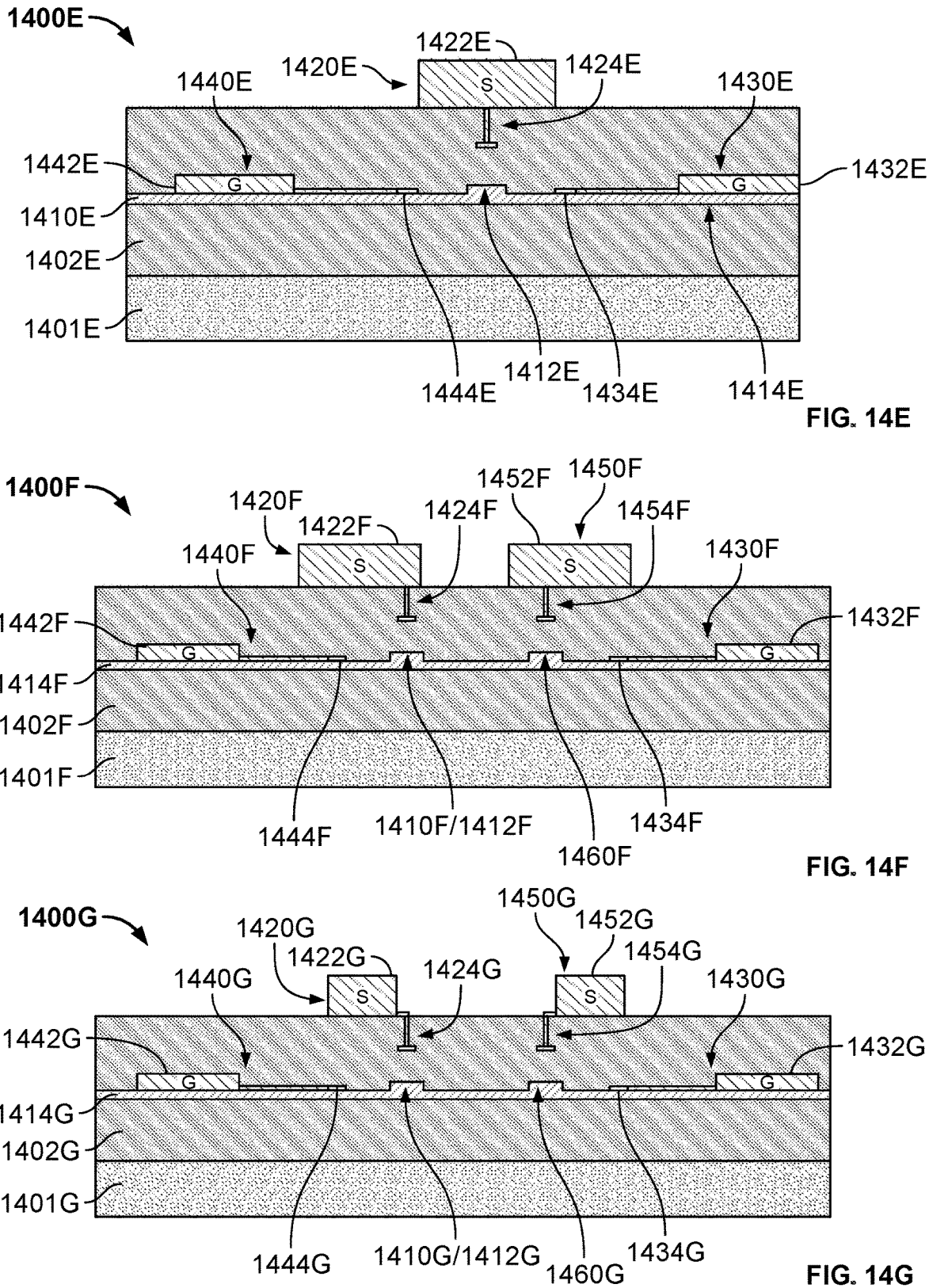

FIG. 14E depicts optical device 1400E including waveguide 1410E having ridge 1412E and thin film portion 1414E as well as electrodes 1420E and 1430E. Also shown are substrate 1401E and interlayer 1400E. Electrodes are desired to be proximate to the corresponding waveguide and to provide a vertical field in the region of structure 1412E. Thus, electrode 1420E is above structure 1412D, while electrodes 1430E and 1440E are to the sides of structure 1412E. In the embodiment shown, electrodes 1430E and 1440E are ground electrodes, while electrode 1420E carries the signal. The position of ground electrodes 1430E and 1440E are illustrative. As long as a vertical electric field is established in the waveguide 1412E, other ground electrodes may be used. Also shown are channel regions 1422E, 1432E and 1442E and extensions 1424E, 1434E and 1444E for electrodes 1420E, 1430E and 1440E, respectively. Channel regions 1422E, 1432E and 1442E and extensions 1424E, 1434E and 1444E are analogous to channel regions and extensions described above. Thus, optical device 1400E may share the benefits of optical devices 100, 100', 100", 100''' and/or 100'''' which utilize extensions.

FIG. 14F depicts differential optical device 1400F including waveguide 1410F having ridge 1412F and thin film portion 1414F as well as electrodes 1420F and 1430F. Also shown are substrate 1401F and interlayer 1400F. Electrodes are desired to be proximate to the corresponding waveguide and to provide a vertical field in the region of structure 1412F. Thus, electrode 1420F is above structure 1412F, while electrodes 1430F and 1440F are to the sides of structure 1412F. Because optical device 1400F is a differential modulator, an additional waveguide 1460F (e.g. an additional ridge) and an additional electrode 1450F are present. In the embodiment shown, electrodes 1430F and 1440F are ground electrodes, while electrodes 1420F and 1450F carry the signals. The position of ground electrodes 1430F and 1440F are illustrative. As long as a vertical electric field is established in the waveguide 1412F and 1460F, other ground locations may be used. Also shown are channel regions 1422F, 1432F, 1442F and 1452F and extensions 1424F, 1434F, 1444F and 1454F for electrodes 1420F, 1430F, 1440F and 1450F, respectively. Channel regions 1422F, 1432F, 1442F and 1452F and extensions 1424F, 1434F, 1444F and 1454F are analogous to channel regions and extensions described above. Thus, optical device 1400F may share the benefits of optical devices 100, 100' and/or 150 which utilize extensions.

FIG. 14G depicts differential optical device 1400G including waveguide 1410G having ridge 1412G and thin film portion 1414G as well as electrodes 1420G and 1430G. Also shown are substrate 1401G and interlayer 1400G. Electrodes are desired to be proximate to the corresponding waveguide and to provide a vertical field in the region of structure 1412G. Thus, electrode 1420G is above structure 1412G, while electrodes 1430G and 1440G are to the sides of structure 1412G. Because optical device 1400G is a differential modulator, an additional waveguide 1460G (e.g.

an additional ridge) and an additional electrode 1450G are present. In the embodiment shown, electrodes 1430G and 1440G are ground electrodes, while electrodes 1420G and 1450G carry the signals. The position of ground electrodes 1430G and 1440G are illustrative. As long as a vertical electric field is established in the waveguide 1412G and 1460G, other ground locations may be used. Also shown are channel regions 1422G, 1432G, 1442G and 1452G and extensions 1424G, 1434G, 1444G and 1454G for electrodes 1420G, 1430G, 1440G and 1450G, respectively. Channel regions 1422G, 1432G, 1442G and 1452G and extensions 1424G, 1434G, 1444G and 1454G are analogous to channel regions and extensions described above. Optical device 1400G is analogous to optical device 1400F. However, extensions 1424G and 1454G are offset from channel regions 1422G and 1452G, respectively. As a result, interaction between channel regions 1422G and 1452G may be reduced. Thus, optical device 1400G may share the benefits of optical devices 100, 100', 100", 100'" and/or 100"" which utilize extensions.

Figure 14H:
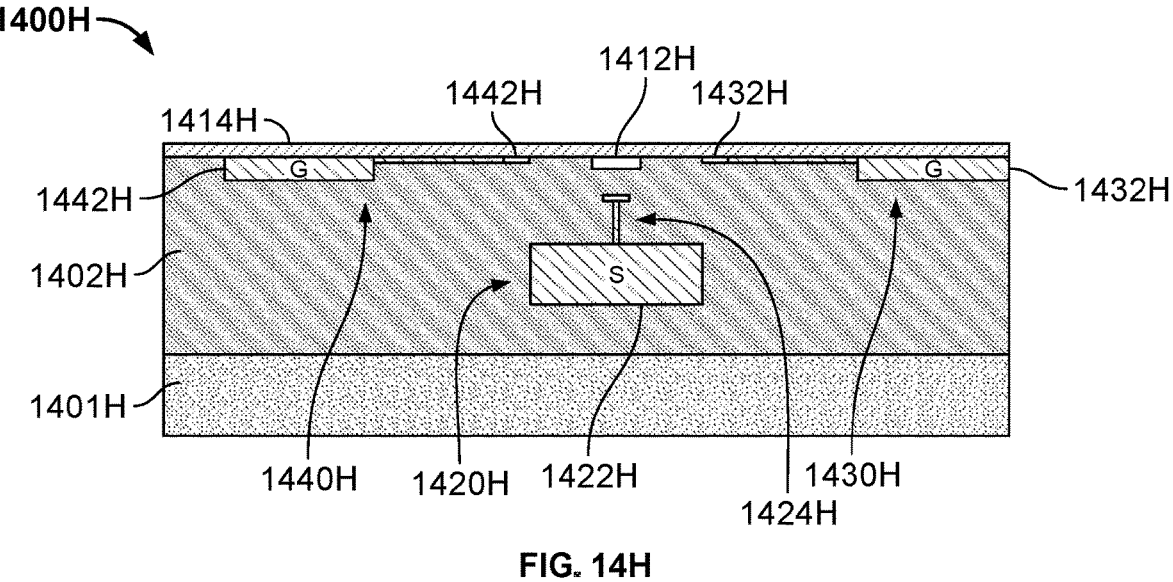

FIG. 14H depicts optical device 1400H including waveguide 1410H having structure 1412H and thin film portion 1414H as well as electrodes 1420H and 1430H. Also shown are substrate 1401H and interlayer 1400H. Electrodes are desired to be proximate to the corresponding waveguide and to provide a vertical field in the region of structure 1412H. Structure 1412H may be a material other than the nonlinear optical material, such as the passive materials or heaters described herein. An optional buffer layer may be between the thin film region 1414H, which includes the nonlinear optical material, and structure 1412H. In some embodiments, structure 1412H may simply be an embedded ridge including nonlinear optical material. Electrode 1420H is below structure 1412H, while electrodes 1430H and 1440H are to the sides of structure 1412H. In the embodiment shown, electrodes 1430H and 1440H are ground electrodes, while electrode 1420H carries the signal. The position of ground electrodes 1430H and 1440H are illustrative. As long as a vertical electric field is established in the waveguide 1412H, other ground locations may be used. Also shown are channel regions 1422H, 1432H and 1442H and extensions 1424H, 1434H and 1444H for electrodes 1420H, 1430H and 1440H, respectively. Channel regions 1422H, 1432H and 1442H and extensions 1424H, 1434H and 1444H are analogous to channel regions and extensions described above. Thus, optical device 1400H may share the benefits of optical devices 100, 100', 100", 100'" and/or 100"" which utilize extensions.

Figure 14I:
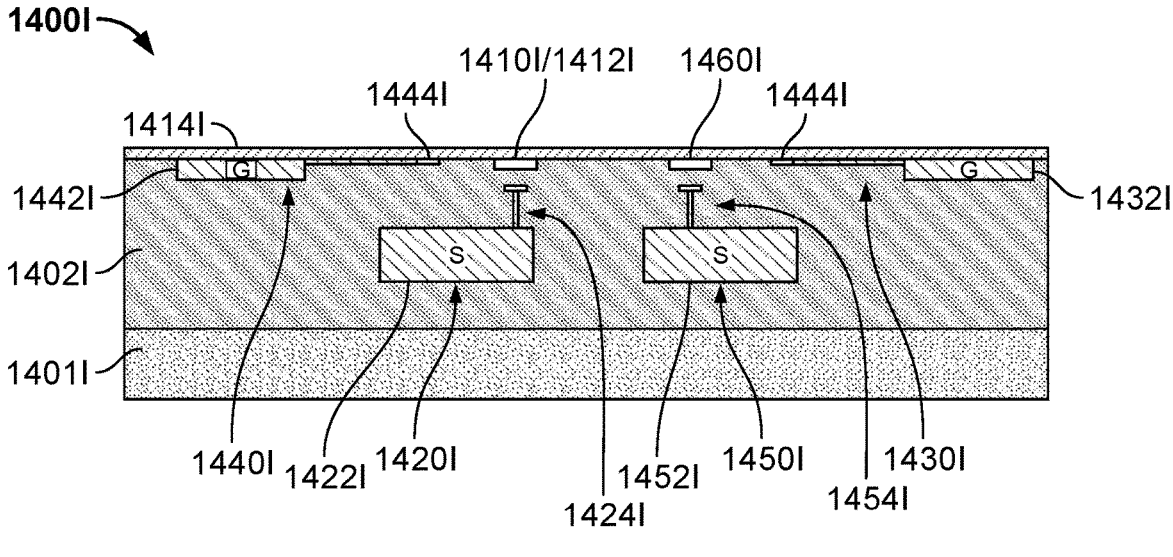

FIG. 14I depicts differential optical device 1400I including waveguide 1410I having structure 1412I and thin film portion 1414I as well as electrodes 1420I and 1430I. Also shown are substrate 1401I and interlayer 1400I. Electrodes are desired to be proximate to the corresponding waveguide and to provide a vertical field in the region of structure 1412I. Thus, electrode 1420I is below structure I, while electrodes 1430I and 1440I are to the sides of structure 1412I. Structure 1412I may be a material other than the nonlinear optical material, such as the passive materials or heaters described herein. In some embodiments, structure 1412I may simply be an embedded ridge including nonlinear optical material. Because optical device 1400I is a differential modulator, an additional waveguide/structure 1460I (e.g. an additional ridge, passive material or heater) and an additional electrode 1450I are present. In the embodiment shown, electrodes 1430I and 1440I are ground electrodes, while electrodes 1420I and 1450I carry the signals. The position of ground electrodes 1430I and 1440I are illustrative. As long as a vertical electric field is established in the waveguide 1412I and 1460I, other ground locations may be used. An optional buffer layer may be between the thin film region 1414I, which includes the nonlinear optical material, and structures 1412I and 1460I. Also shown are channel regions 1422I, 1432I, 1442F and 1452I and extensions 1424I, 1434I, 1444I and 1454I for electrodes 1420I, 1430I, 1440I and 1450I, respectively. Channel regions 1422I, 1432I, 1442I and 1452I and extensions 1424I, 1434I, 1444I and 1454I are analogous to channel regions and extensions described above. Thus, optical device 1400I may share the benefits of optical devices 100, 100', 100", 100'" and/or 100"" which utilize extensions.

Figure 14J:
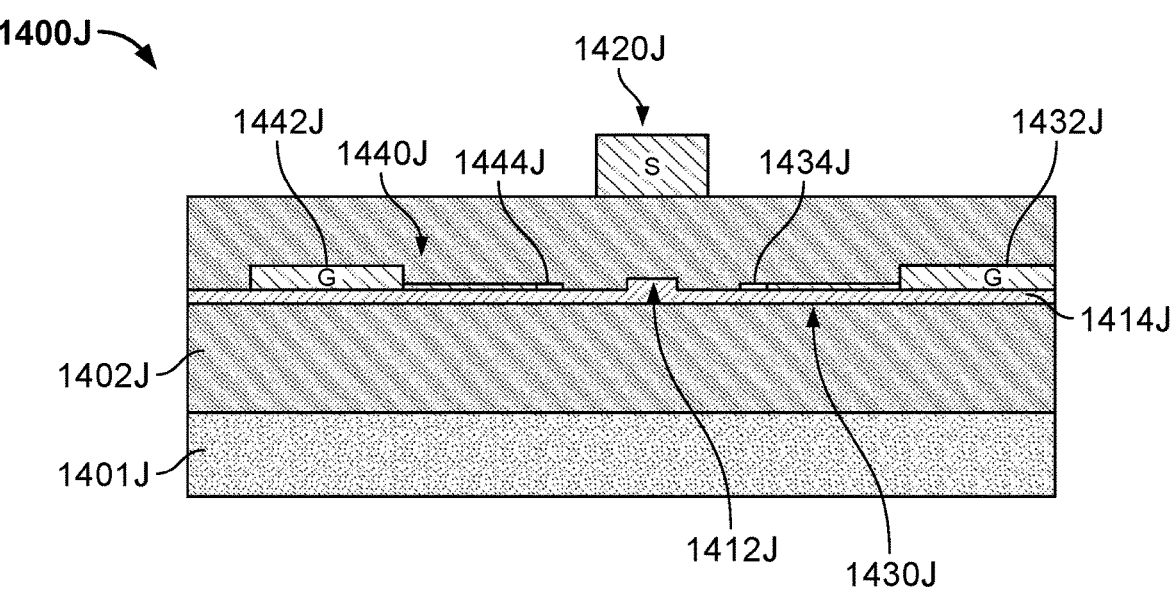

FIG. 14J depicts optical device 1400J including waveguide 1410J having ridge 1412J and thin film portion 1414J as well as electrodes 1420J and 1430J. Also shown are substrate 1401J and interlayer 1400J. Electrodes are desired to be proximate to the corresponding waveguide and to provide a vertical field in the region of structure 1412J. Thus, electrode 1420J is above structure 1412J, while electrodes 1430J and 1440J are to the sides of structure 1412J. In the embodiment shown, electrodes 1430J and 1440J are ground electrodes, while electrode 1420J carries the signal. The position of ground electrodes 1430J and 1440J are illustrative. As long as a vertical electric field is established in the waveguide 1412J, other ground locations may be used. Also shown are channel regions 1432J and 1442J and extensions 1434J and 1444J for electrodes 1430J and 1440J, respectively. Thus, signal electrode 1420J does not include extensions in this embodiment. Channel regions 1432J and 1442J and extensions 1434J and 1444J are analogous to channel regions and extensions described above. Thus, optical device 1400J may share the benefits of optical devices 100, 100', 100", 100'" and/or 100"" which utilize extensions. Further, not all electrodes need to include extensions in order to provide improved performance.

Figure 14K:
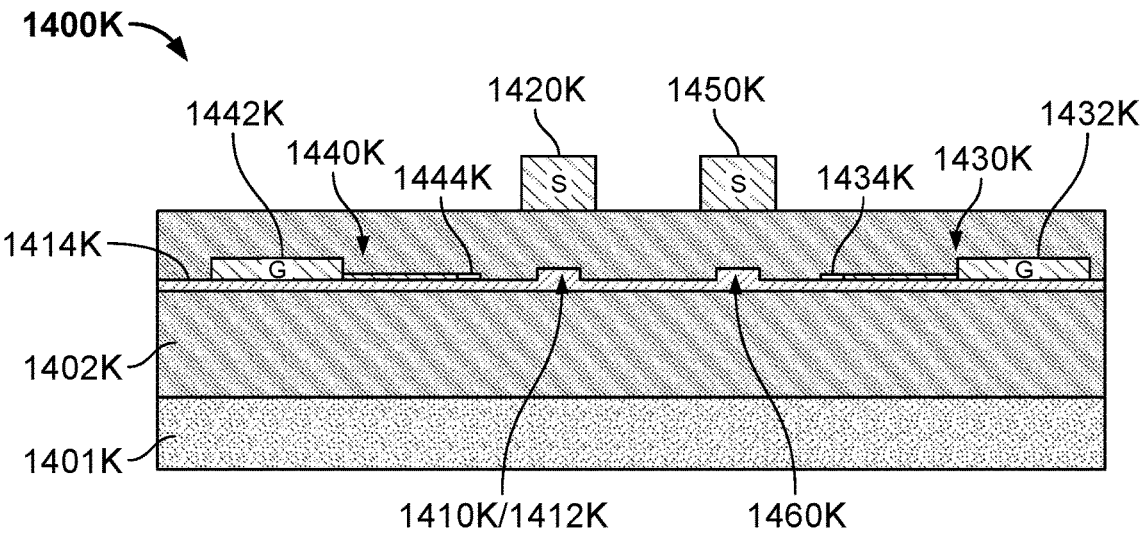

FIG. 14K depicts differential optical device 1400F including waveguide 1410K having ridge 1412K and thin film portion 1414K as well as electrodes 1420K and 1430K. Also shown are substrate 1401K and interlayer 1400K. Electrodes are desired to be proximate to the corresponding waveguide and to provide a vertical field in the region of structure 1412K. Thus, electrode 1420K is above structure 1412K, while electrodes 1430K and 1440K are to the sides of structure 1412K. Because optical device 1400K is a differential modulator, an additional waveguide 1460K (e.g. an additional ridge) and an additional electrode 1450K are present. In the embodiment shown, electrodes 1430FK and 1440K are ground electrodes, while electrodes 1420K and 1450K carry the signals. The position of ground electrodes 1430K and 1440K are illustrative. As long as a vertical electric field is established in the waveguide 1412K and 1460K, other ground locations may be used. Also shown are channel regions 1432K and 1442K and extensions 1434K and 1444K for electrodes 1430K and 1440K, respectively. Channel regions 1432K and 1442K and extensions 1434K and 1444K are analogous to channel regions and extensions described above. However, signal electrodes 1420K and 1450K do not include extensions. Optical device 1400K may share the benefits of optical devices 100, 100', 100", 100' and/or 100"" which utilize extensions. Further, not all electrodes need to include extensions in order to provide improved performance.

Thus, despite varying electrode and waveguide configurations, optical devices 1400A, 1400B, 1400C, 1400D, 1400E, 1400F, 1400G, 1400H, 1400I, 1400J, and 1400K are analogous to optical device 100, 100', 100", 100'" and/or

100""". Consequently, optical devices 1400A, 1400B, 1400C, 1400D, 1400E, 1400F, 1400G, 1400H, 1400J, and 1400K may share the benefits of optical device(s) 100, 100', 100", 100"' and/or 100"".

Figure 15A:
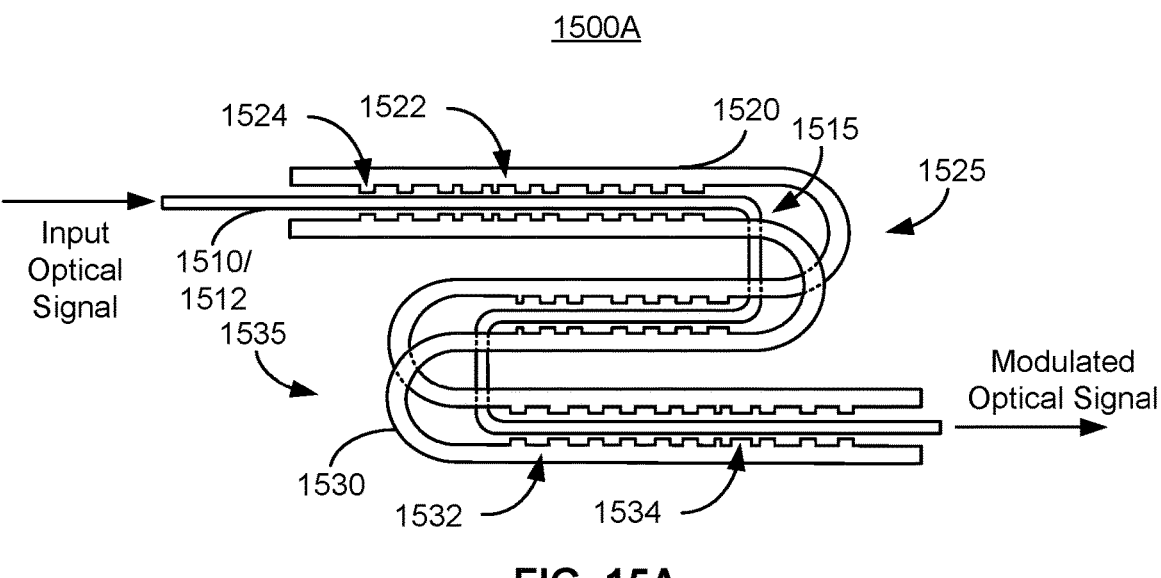
FIGS. 15A-15B depict portions of embodiments of opti-cal devices capable of having improved performance.
Figure 15B:
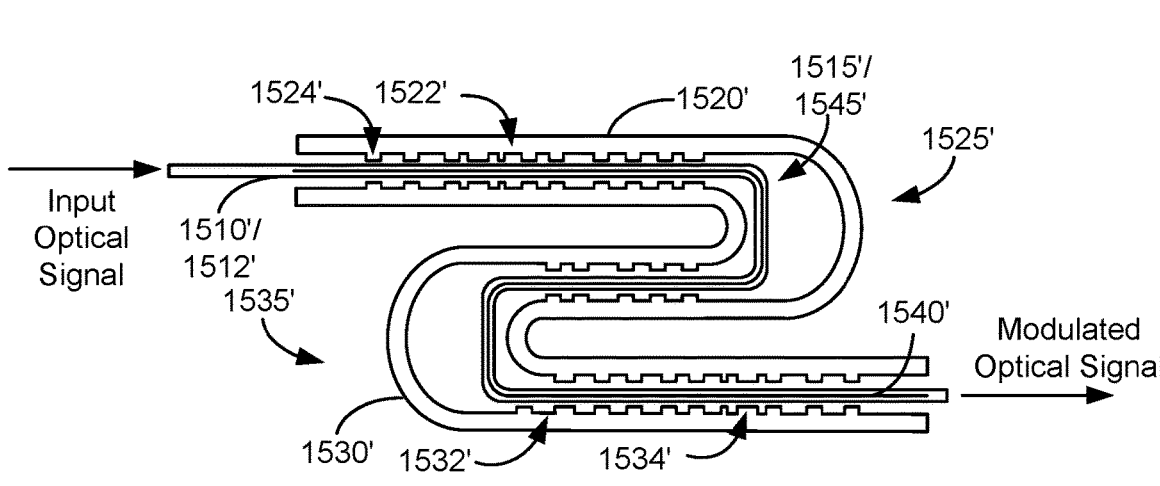

FIGS. 15A and 15B depict portions of embodiments of optical devices 1500A and 1500B, respectively. Optical devices 1500A and 1500B are analogous to optical device(s) 100, 100', 100", 100"' and/or 100"". FIGS. 15A and 15B are not to scale and only a portion of optical devices 1500A and 1500B are shown. Optical devices 1500A and 1500B are analogous to optical device(s) 100, 100', 100" and/or 100"". Thus, analogous components have similar labels. Optical device 1500A includes waveguide 1510 having ridge 1512 and electrodes 1520 and 1530 that are analogous to waveguide 110/110' having ridge 112 and electrodes 120, 120', 120", 130, 130' and 130". Electrodes 1520 and 1530 include channel regions 1522 and 1532, respectively, that are analogous to channel regions 122, 122', 122" and 132, 132', 132" for electrodes 120, 120' and 120" and 130, 130', and 130", respectively. Electrodes 1520 and 1530 include extensions 1524 and 1534, respectively, that are analogous to extensions 124, 124', 124" and 134, 134', 134" for electrodes 120, 120', 120" and 130, 130', 130", respectively. Extensions 1524 and 1534 include connecting portions 1524A and 1534A and retrograde portions 1524B and 1534B that are analogous to connecting portions 124A, 124A', 124A" and 134A, 134A', 134A" and retrograde portions 124B, 124B', 124B" and 134B, 134B', 134B".

Waveguide 1510 also includes waveguide bending sections 1515. Although multiple waveguide bending sections are shown in FIG. 15A, only one waveguide bending section 1515 is labeled. Each waveguide bending section 1515 may have a bending radius of not more than 1 mm. In some embodiments, each waveguide bending section 1515 has a bending radius of not more than 500 μm. In some embodiments, each waveguide bending section 1515 has a bending section optical loss of not more than 0.5 dB. The waveguide (and electrode) bending sections may be utilized to provide a longer region in which electrodes 1520 and 1530 are proximate to waveguide 1510 while controlling the size of the device incorporating optical device 1500A. For example, waveguide 1510 and electrodes 1520 and 1530 may occupy an area of not more than fifty square millimeters. Waveguide 1510 and electrodes 1520 and 1530 occupy an area of not more than twenty square millimeters in some embodiments. In some embodiments, waveguide 1510 and electrodes 1520 and 1530 reside on an integrated circuit having a length of not more than 32 millimeters. In some such embodiments, waveguide 1510 and electrodes 1520 and 1530 reside on an integrated circuit having a length of not more than 22 millimeters. This is true despite the higher length of waveguide 1510. Thus, a larger optical signal modulation may be achieved in a smaller overall device.

Electrode 1520 may include electrode bending sections 1525 (of which only one is labeled in FIG. 15A). Similarly, electrode 1530 includes electrode bending sections 1535 (of which only one is labeled in FIG. 15A). Like waveguide bending sections 1515 of waveguide 1510, electrode bending sections 1525 and 1535 allow for a longer length of electrodes 1520 and 1530, respectively, in a smaller footprint. Thus, optical device 1500A may consume less space, in particular length, in a package.

In some embodiments, electrode bending sections 1525 and 1535 and waveguide bending sections 1515 may also be utilized to improve performance. More specifically, electrode bending sections 1525 and 1535 and waveguide bending sections 1515 can be configured to provide a path difference between an optical signal for waveguide 1510 and electrode signal(s) for electrode(s) 1520 and/or 1530. Such a path difference may be utilized to compensate for differences in the speed(s) of transmission between the microwave signal in electrode(s) 1520 and/or 1530 and the speed of transmission of the optical signal in waveguide 1510. The speed of the optical signal through waveguide 1510 is affected by the index of refraction of waveguide 1510. The speed(s) of the microwave signal(s) in electrode(s) 1520 and/or 1530 are affected by the presence of extensions 1524 and/or 1534. Extensions 1524 and/or 1534 tend to slow the propagation of a microwave signal through electrode(s) 1520 and/or 1530. Surrounding materials, such as substrate/ underlayers (not shown in FIGS. 15A-15B) can also affect the velocity of the electrode signal. The materials used for waveguide 1510 and electrodes 1520 and/or 1530, fabrication techniques used for waveguide 1510 and electrodes 1520 and/or 1530, the cladding and substrate/underlayers, and the configuration of extensions 1524 and/or 1534 may be selected to reduce the difference in velocities of the optical signal in waveguide 1510 and the electrode signal in electrodes 1520 and/or 1530.

Further, additional extensions that may be relatively far from ridge 1512 (e.g. farther from ridge 152 than channels 1522 and/or 1532) may be added. Such extensions (not shown in FIGS. 15A-15B) might improve the matching between the velocities of the optical signal in waveguide 1510 and the electrode signal in electrodes 1520 and/or 1530. However, there may still be some mismatch in optical and electrode signal velocities. Bending sections 1515, 1525 and 1535 may compensate for these mismatches. For example, in some embodiments, waveguide bending sections 1515 may be configured such that the optical signal traverses a longer path in waveguide 1510 than the path the microwave signal traverses in electrode(s) 1520 and/or 1530. This path difference may compensate for the optical signal traveling faster in waveguide 1510 than the microwave signal travels in electrode(s) 1520 and/or 1530. In some embodiments, waveguide bending sections 1515 may be configured such that the optical signal traverses a shorter path in waveguide 1510 than the path that the microwave signal traverses in electrode(s) 1520 and/or 1530. This path difference may compensate for the optical signal traveling slower in waveguide 1510 than the microwave signal travels in electrode(s) 1520 and/or 1530. Such path differences may be used in addition to or instead of a meandering path for the waveguide (discussed below). Thus, for a given velocity mismatch between the microwave (electrode) and optical (waveguide) signals, the lengths of bending sections 1515, 1525 and 1535 can be calculated to mitigate the differences introduced by the electrode and optical signals traveling at different velocities in the straight sections. By configuring the straight segments and the bending sections, velocity mismatches can be mitigated and the desired performance obtained. Thus waveguide bending sections 1515 and electrode bending sections 1525 and 1535 can be utilized to account for mismatches in the velocities of the electrode (microwave) signal and the optical signal. Consequently, in addition to the benefits described herein with respect to optical devices, such as optical devices 100, 100', 100", 100"' and/or 100"", optical device 1500A may have improved velocity matching and, therefore, improved performance.

Optical device 1500B is analogous to optical device 1500A. Consequently, similar structures have analogous labels. Optical device 1500B thus includes waveguide 1510' having ridge 1512' and electrodes 1520' and 1530' that are analogous to waveguide 1510 having ridge 1512 and electrodes 1520, and 1530. Electrodes 1520' and 1530' include extensions 1524' and 1534', respectively, that are analogous to extensions 1524 and 1534. Extensions 1524 and 1534 include connecting portions 1524A and 1534A and retrograde portions 1524B and 1534B that are analogous to connecting portions 1524A and 1534A and retrograde portions 1524B and 1534B. Bending portions 115', 125' and 135' of waveguide 110' and electrodes 120' and 130' are analogous to bending portions 115, 125 and 135, respectively. In some embodiments, bending portions may be omitted such that waveguide 1510' and electrodes 1520' and 1530' are straight.

Optical device 1500B has an electro-optic effect out of the plane of thin film region (e.g. is a z-cut optical device). Consequently, a vertical electrical field is desired to be applied to waveguide 1510'. Thus, electrode 1540 is also shown. Although not shown, electrode 1540 may have extensions. Electrode bending sections 1525', 1535' and 1545 and waveguide bending sections 1515' and 1545 are also shown. Thus, in addition to the benefits in addition to the benefits described herein with respect to optical devices, such as optical devices 100, 100', 100", 100''', 100'''' and/or 1500B, optical device 1500B may have improved velocity matching and, therefore, improved performance.

Figure 16:
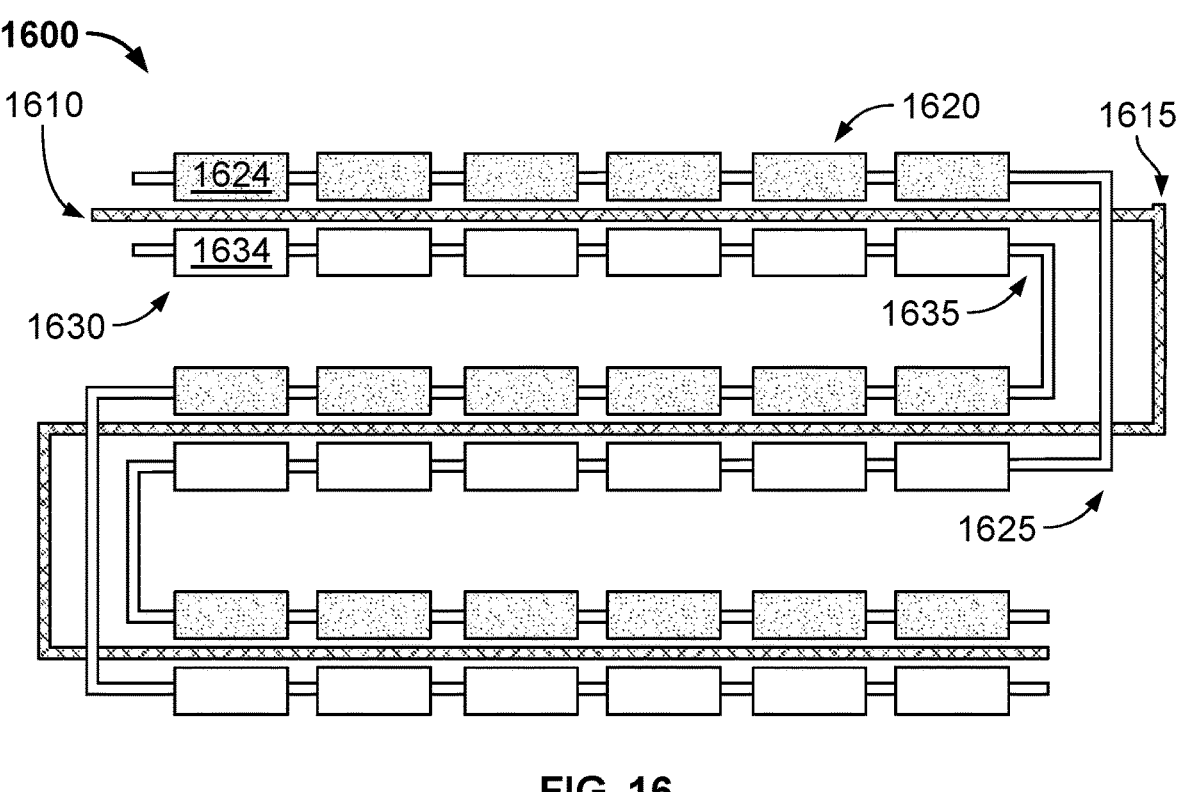
FIG. 16 depicts a portion of an embodiment of an optical device capable of having improved performance.

FIG. 16 depicts a portion of optical device 1600 including waveguide 1610 and electrodes 1620 and 1630. Electrodes 1620 and 1630 include extensions 1624 and 1634, respectively. Only one extension 1624 and one extension 1634 are labeled. Channel regions for electrodes 1620 and 1630 are not labeled. Waveguide 1610 includes bending sections 1615, of which only one is labeled. Similarly, electrodes 1620 and 1630 include bending sections 1625 and 1635, of which only one per electrode is labeled. Bending sections 1615, 1625 and 1635 allow for a long waveguide 1610 and long electrodes 1620 and 1630 to occupy a smaller area. Further, as described below, bending sections 1615, 1625 and 1635 may be used to mitigate velocity and, therefore, phase mismatches between the microwave signal carried by electrode(s) 1620 and/or 1630 and the optical signal carried by waveguide 1610. The location of 1624 and 1634 shown in the figure may not correspond to the physical locations. For example, in a z-cut modulator device, 1624 or 1634 may be positioned on top of waveguide 1610, and additional electrode may be introduced to provide the necessary electric field profile.

Figure 17:
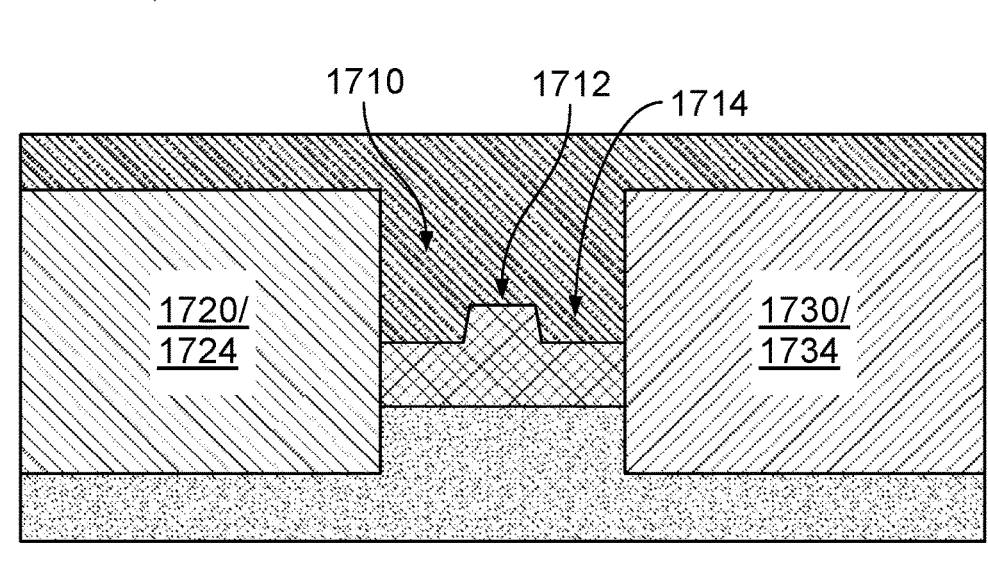
FIG. 17 depicts a portion of an embodiment of an optical device capable of having improved performance.

FIG. 17 depicts a portion of optical device 1700 including waveguide 1710 and electrodes 1720 and 1730. Optical device 1700 is analogous to optical device(s) 100, 100', 100", 100''' and/or 100''''. Consequently, similar structures have analogous labels. Optical device 1700 thus includes waveguide 1710 having ridge 1712 and thin film portion 1714, electrode 1720 and electrode 1730 that are analogous to waveguide 110' having ridge 112 and thin film portion 114, electrode 120 and electrode 130, respectively. Electrodes 1720 and 1730 include extensions 1724 and 1734, respectively, that are analogous to extensions 124, 124', 124" and 134, 134', 134". Extensions 1724 and 1734 may be etched onto, partially into, completely into, or through the thin-film portion 1714 of waveguide 1712. Optical device 1700 may share the benefits of optical device(s) 100, 100', 100", and 100''''.

Figure 18:
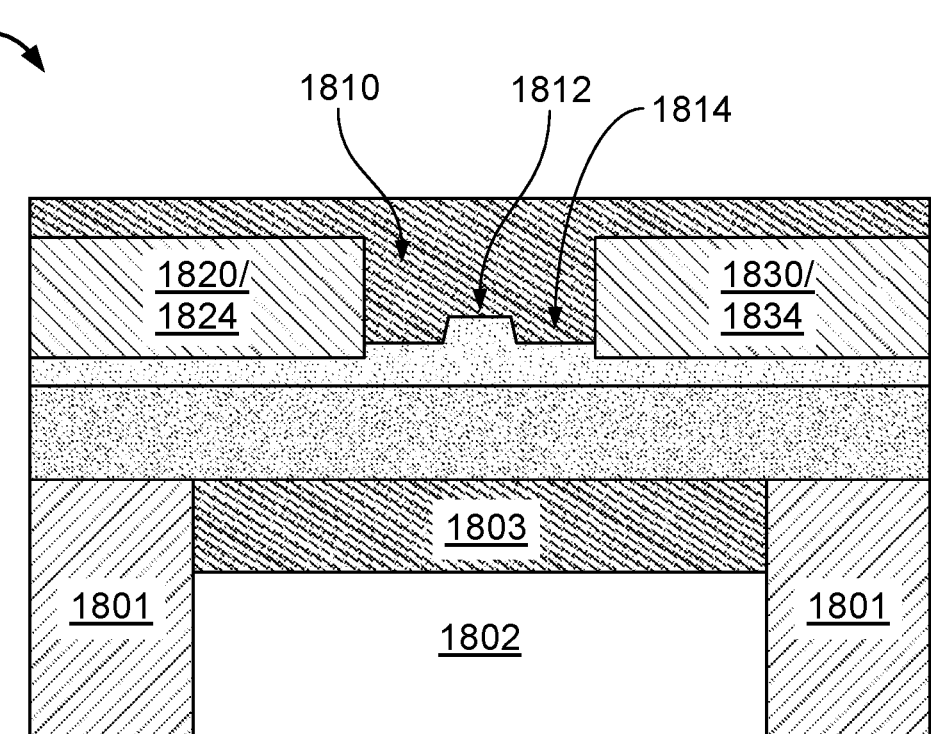
FIG. 18 depicts a portion of an embodiment of an optical device capable of having improved performance.

FIG. 18 depicts a portion of optical device 1800 including waveguide 1810 and electrodes 1820 and 1830. Optical device 1800 is analogous to optical device(s) 100, 100', 100", 100''' and/or 100''''. Consequently, similar structures have analogous labels. Optical device 1800 thus includes waveguide 1810 having ridge 1812 and thin film portion 1814, electrode 1820 and electrode 1830 that are analogous to waveguide 110' having ridge 112 and thin film portion 114, electrode 120 and electrode 130, respectively. Electrodes 1820 and 1830 include extensions 1824 and 1834, respectively, that are analogous to extensions 124, 124', 124" and 134, 134', 134". Substrate 1801 is analogous to substrate 101. Also indicated are void 1802 in substrate 1801 as well as additional layer 1803. Void 1801 is at least partially filled with layer 1803. Layer 1803 may be a dielectric in some embodiments. In some embodiments, layer 1803 may be a metal or other layer. Layer 1803 may be used to engineer the mechanical integrity or microwave properties of optical device 1800. In some embodiments, substrate 1802 might be completely removed. In such embodiments, layer 1803, if present, may extend across optical device 1800. In some embodiments, void 1802 may have a different shape, for example hemi-cylindrical, multiple voids 1802 may be formed and/or layer 1803 omitted. Further, void(s) 1802 may not extend the full height of the substrate. In some embodiments, void(s) 1802 are formed from the front side of substrate 1801, for example by etching substrate 1801 from the same side as waveguide 1810. Void(s) 1802 may also extend across multiple waveguides and/or electrodes in some embodiments. Optical device 1800 may share the benefits of optical device(s) 100, 100', 100", and 100'''.

Figure 19:
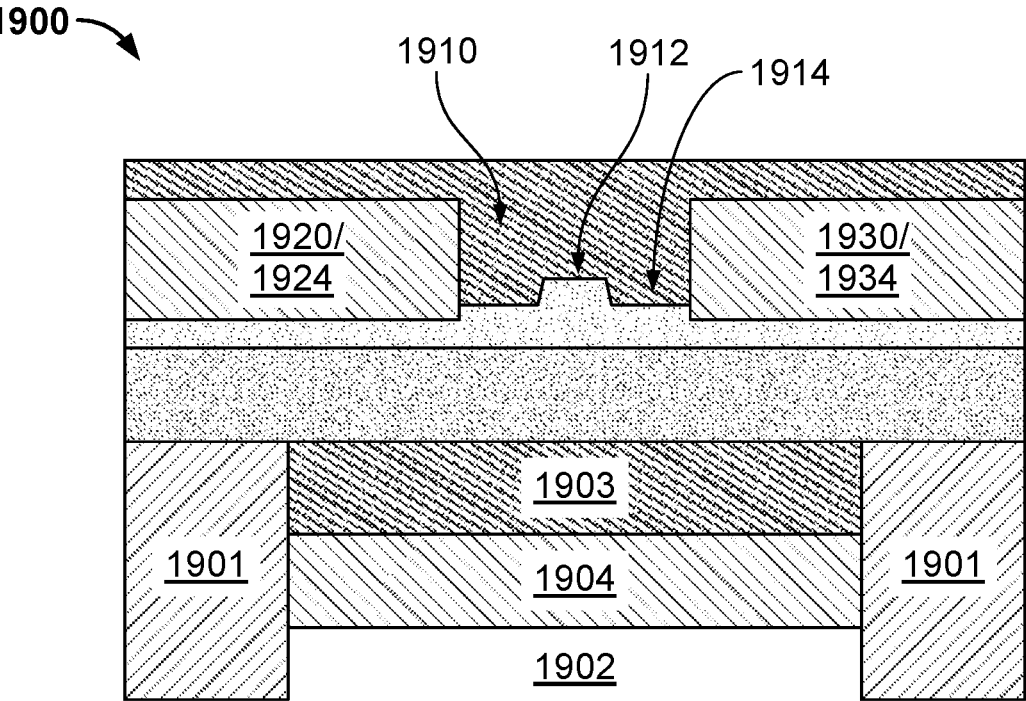
FIG. 19 depicts a portion of an embodiment of an optical device capable of having improved performance.

FIG. 19 depicts a portion of optical device 1900 including waveguide 1910 and electrodes 1920 and 1930. Optical device 1900 is analogous to optical device(s) 100, 100', 100", 100''' and/or 100''''. Consequently, similar structures have analogous labels. Optical device 1900 thus includes waveguide 1910 having ridge 1912 and thin film portion 1914, electrode 1920 and electrode 1930 that are analogous to waveguide 110' having ridge 112 and thin film portion 114, electrode 120 and electrode 130, respectively. Electrodes 1920 and 1930 include extensions 1924 and 1934, respectively, that are analogous to extensions 124, 124', 124" and 134, 134', 134". Substrate 1901 is analogous to substrate 101. Also indicated are void 1902 in substrate 1901 as well as additional layer 1903 that are analogous to void 1802 in substrate 1801 and additional layer 1803. A second layer 1904 has also been provided, which may be a metal support or other layer. Layers 1903 and 1904 may be used to engineer the mechanical integrity or microwave properties of optical device 1900. Optical device 1900 may share the benefits of optical device(s) 100, 100', 100", and 100'''.

Figure 20:
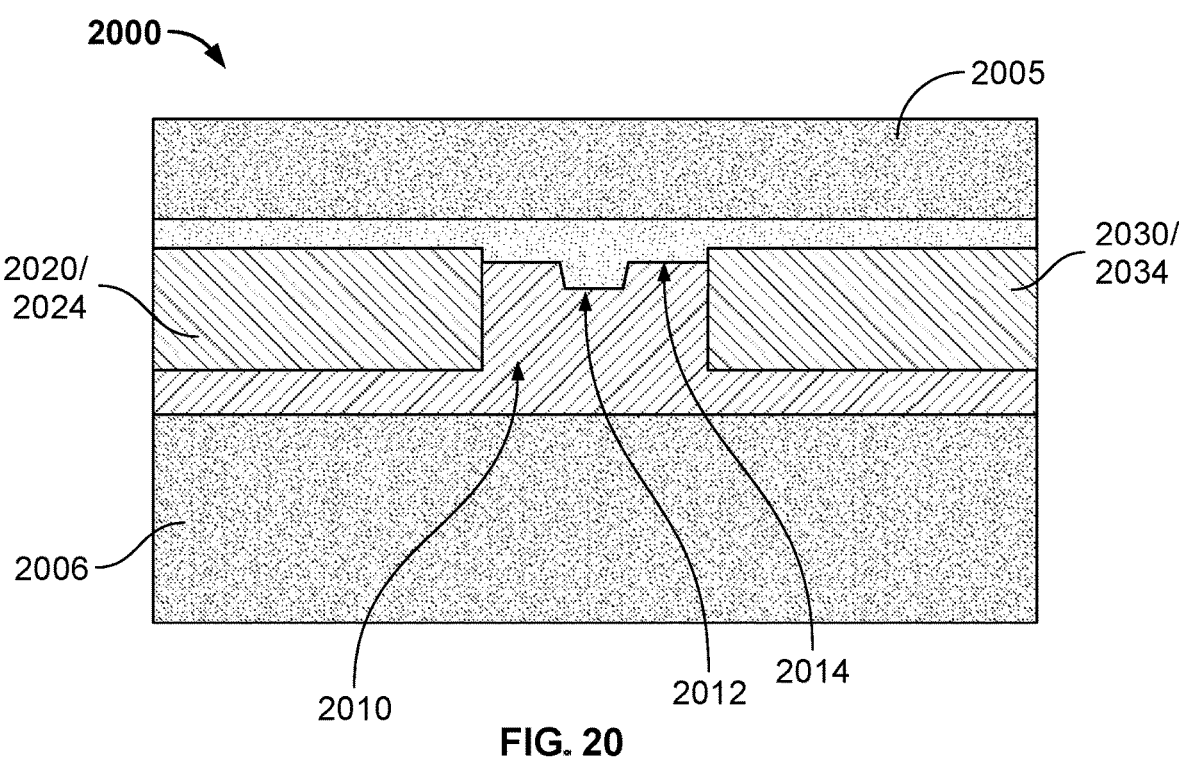
FIG. 20 depicts a portion of an embodiment of an optical device capable of having improved performance.

FIG. 20 depicts a portion of optical device 2000 including waveguide 2010 and electrodes 2020 and 2030. Optical device 2000 is analogous to optical device(s) 100, 100', 100", 100''' and/or 100''''. Consequently, similar structures have analogous labels. Optical device 2000 thus includes waveguide 2010 having ridge 2012 and thin film portion 2014, electrode 2020 and electrode 2030 that are analogous to waveguide 110' having ridge 112 and thin film portion 114, electrode 120 and electrode 130, respectively. Electrodes 2020 and 2030 include extensions 2024 and 2034, respectively, that are analogous to extensions 124, 124', 124" and 134, 134', 134". Substrate 2005 may be analogous to substrate 101 and/or may be an underlayer such as silicon dioxide. Optical device has is transferred on to a different substrate 2006 for large scale processing on another material platform, such as Si. In this case the original optical device is flipped over and mounted on second substrate 206. Further, second substrate 2006 may undergo additional processing. For example, a void analogous to void 1802 may be formed and fully or partially refilled. Further, underlayer/Substrate 2005 may be removed in some embodiments.

Optical device 2000 may share the benefits of optical device(s) 100, 100', 100", and 100'''.

Figure 21:
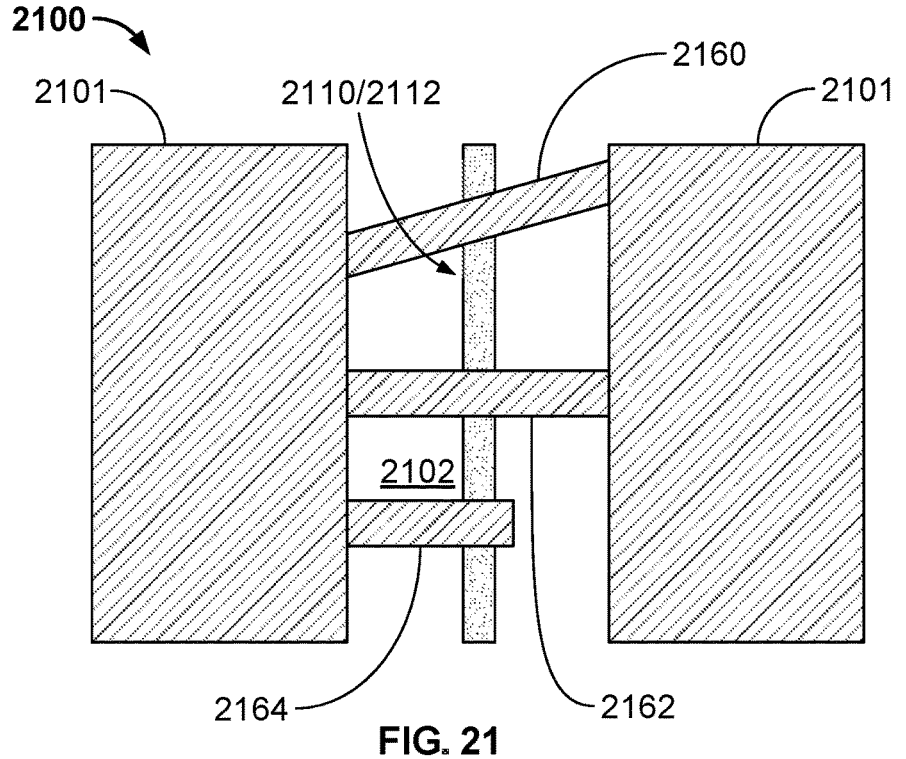
FIG. 21 depicts a portion of an embodiment of an optical device capable of having improved performance.

FIG. 21 depicts a back view of a portion of optical device 2100 including waveguide 2110 and electrodes (not shown). Optical device 2100 is analogous to optical device(s) 100, 100', 100", 100''' and/or 100''''. Consequently, similar structures have analogous labels. Optical device 2100 thus includes waveguide 2110 having ridge 2112 and thin film portion (not shown) and electrodes (not shown) that are analogous to waveguide 110' having ridge 112 and thin film portion 114, electrode 120 and electrode 130, respectively. Substrate 2001 is analogous to substrate 101. Also indicated are void 2002 in substrate 2001. Also shown are structural features 2160, 2162, and 2164. As indicated in FIG. 21, such structural features may extend completely or partially across void 2002, may be parallel to some or all of the other structural features, may be arranged in a pattern, and/or may be perpendicular to the direction of transmission of the optical signal or at another angle. For example, structural features 2160, 2162, and 2164 may extend at least ten percent and not more than ninety percent across void 2002. In some such embodiments, structural features 2160, 2162, and 2164 may extend at least thirty percent and not more than eighty percent across void 2002. Support structures 2160, 2162 and 2164 may be formed by partially removing substrate 2101 when forming void 2102. Thus, structural features 2160, 2162, and/or 2164 may remain after formation of void 2106. In some embodiments, structural features 2160, 2162 and 2164 can be formed of other materials. Optical device 2100 may share the benefits of optical device(s) 100, 100', 100", and 100'''.

Figures 22, 23:
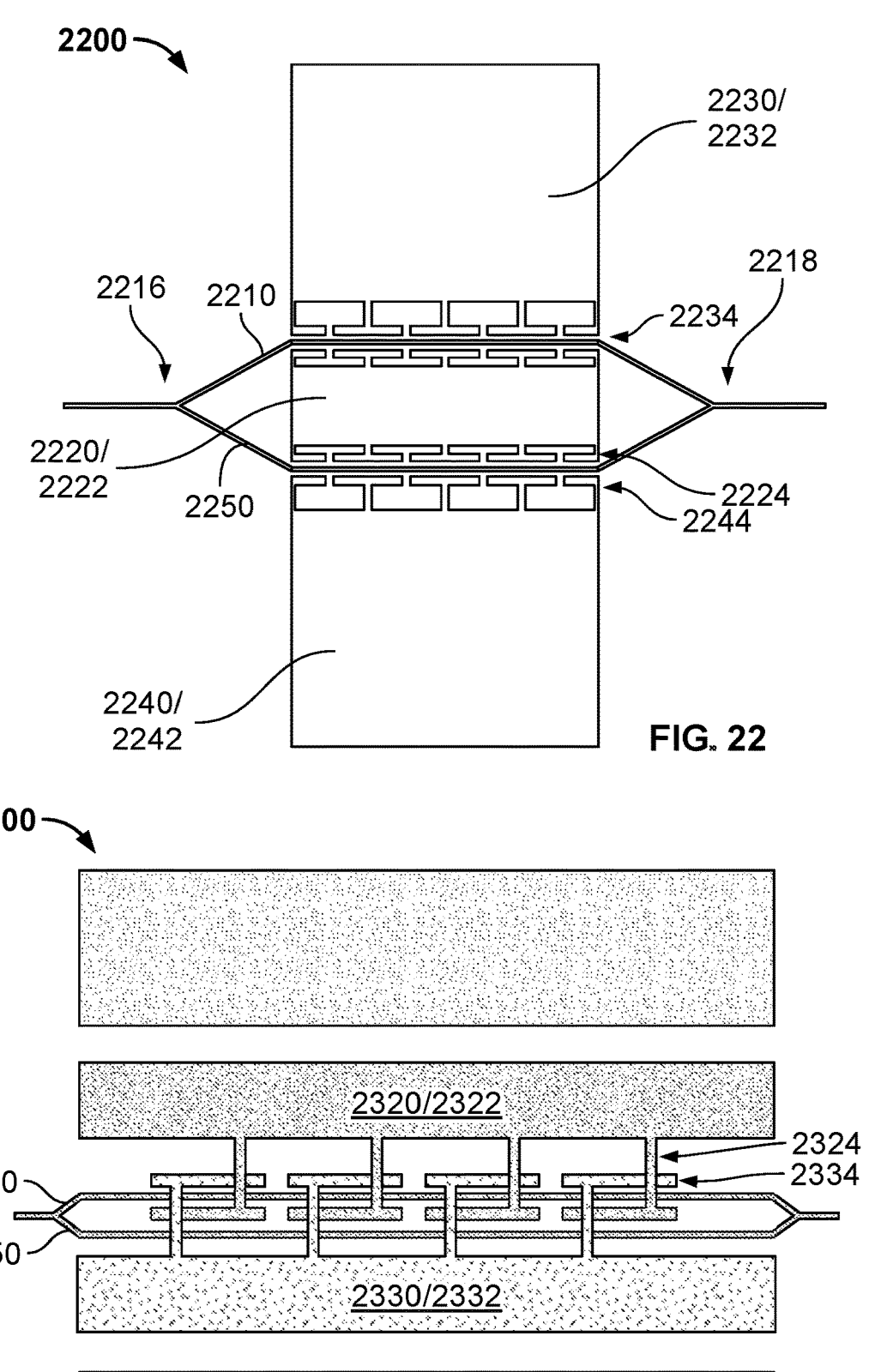
FIG. 22 depicts a portion of an embodiment of an optical device capable of having improved performance.
FIG. 23 depicts a portion of an embodiment of an optical device capable of having improved performance.

FIG. 22 depicts a plan view of a portion of optical device 2200. Optical device 2100 is analogous to optical device(s) 100, 100', 100", 100''' and/or 100''''. Consequently, similar structures have analogous labels. Optical device 2200 including waveguides 2210 and 2250 as well as electrodes 2220, 2230 and 2240 that are analogous to waveguides 110' and 150 and electrodes 120, 130 and electrode 150, respectively. Electrodes 2220, 2230 and 2240 include channel portions 2222, 2232, and 2242, respectively, as well as extensions 2224, 2234, 2244 that are analogous to channel portions 122, 132 and 142 and extensions 224, 234 and 244. Also shown are splitter 2216 and combiner 2218. Thus, optical device 2200 may be considered to be configured as an interferometer. Thus, optical devices described herein can be incorporated into a variety of devices. Such devices, such as optical device 2200, may share the benefits of optical device(s) 100, 100', 100", and 100'''.

FIG. 23 depicts a plan view of a portion of optical device 2300. Optical device 2300 is analogous to optical device(s) 100, 100', 100", 100''' and/or 100''''. Consequently, similar structures have analogous labels. Optical device 2300 including waveguides 2310 and 2350 (e.g. arms of a waveguide) as well as electrodes 2320 and 2330 that are analogous to waveguides 110' and 150 and electrodes 120 and 130, respectively. Electrodes 2320 and 2330 include channel portions 2322 and 2332, respectively, as well as extensions 2324 and 2334 that are analogous to channel portions 122, 132 and 142 and extensions 224, 234 and 244. As can be seen in FIG. 23, extensions 2334 and 2324 include metal bridges extending over the top of waveguides 2310 and 2350 to locate extensions 2324 and 2334 such that the field on waveguide 2310 and 2350 is more symmetric. Optical device 2300 may share the benefits of optical device(s) 100, 100', 100", and 100'''.

Figure 24:
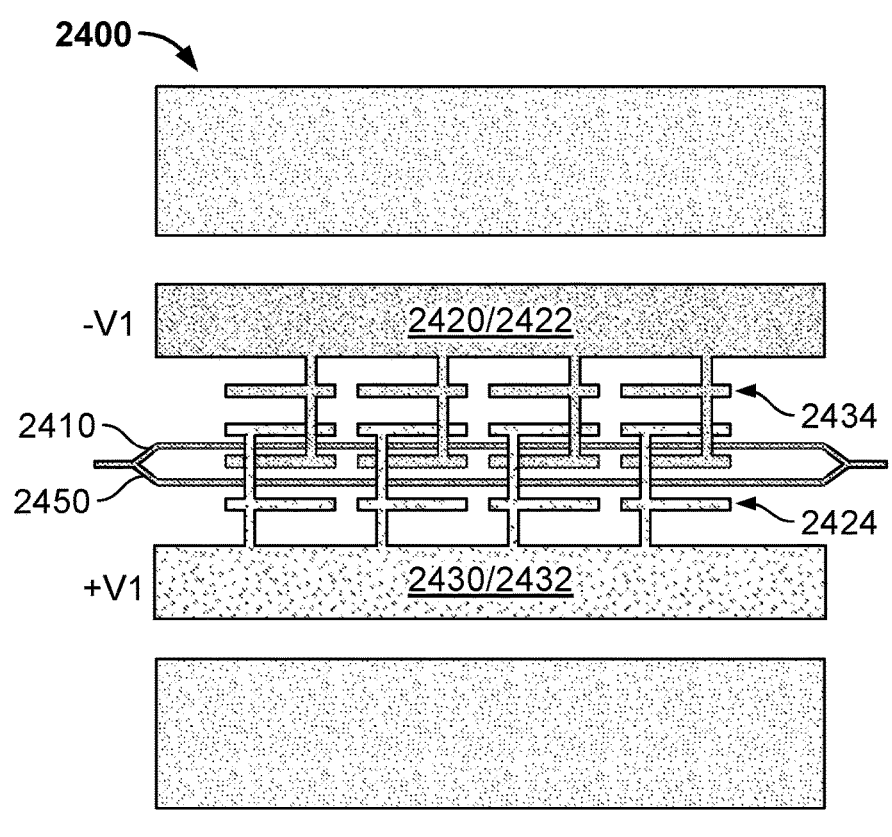
FIG. 24 depicts a portion of an embodiment of an optical device capable of having improved performance.

FIG. 24 depicts a plan view of a portion of optical device 2400. Optical device 2400 is analogous to optical device(s)

100, 100', 100", 100''' and/or 100''''. Consequently, similar structures have analogous labels. Optical device 2400 including waveguides 2410 and 2450 as well as electrodes 2420 and 2430 that are analogous to waveguides 110' and 150 and electrodes 120 and 130, respectively. Electrodes 2420 and 2430 include channel portions 2422 and 2432, respectively, as well as extensions 2424 and 2434 that are analogous to channel portions 122 and 132 and extensions 224 and 234. As can be seen in FIG. 24, extensions 2434 and 2424 include metal bridges extending over the top of waveguides 2410 and 2550 as well as additional retrograde features to locate and configure extensions 2424 and 2434 such that the field on waveguides 2410 and 2450 is more symmetric.

More specifically, in order to induce opposite shifts on the waveguides 2410 and 2450, the extensions 2424 and 2434 are connected with opposite polarity by first positive metal bridges extending over the top of waveguides 2450 and 2410, respectively. The metal bridges connect the retrograde portions of extensions 2424 and 2434 with channel regions 2422 and 2432, respectively, while inducing minimal optical losses in waveguides 2410 and 2450. In addition a second set of retrograde portions for the extensions 2424 and 2434 are provided on an opposite side of the waveguides 2410 and 2450 so that the geometry of optical device 2400 is symmetric. Optical device 2400 has less modulator chirp (difference in modulation strength in two waveguides 2410 and 2450) than optical device 2300, at the cost of increased design complexity and possibly reduced microwave bandwidth. Optical device 2400 may share the benefits of optical device(s) 100, 100', 100", and 100'''.

Figure 25:
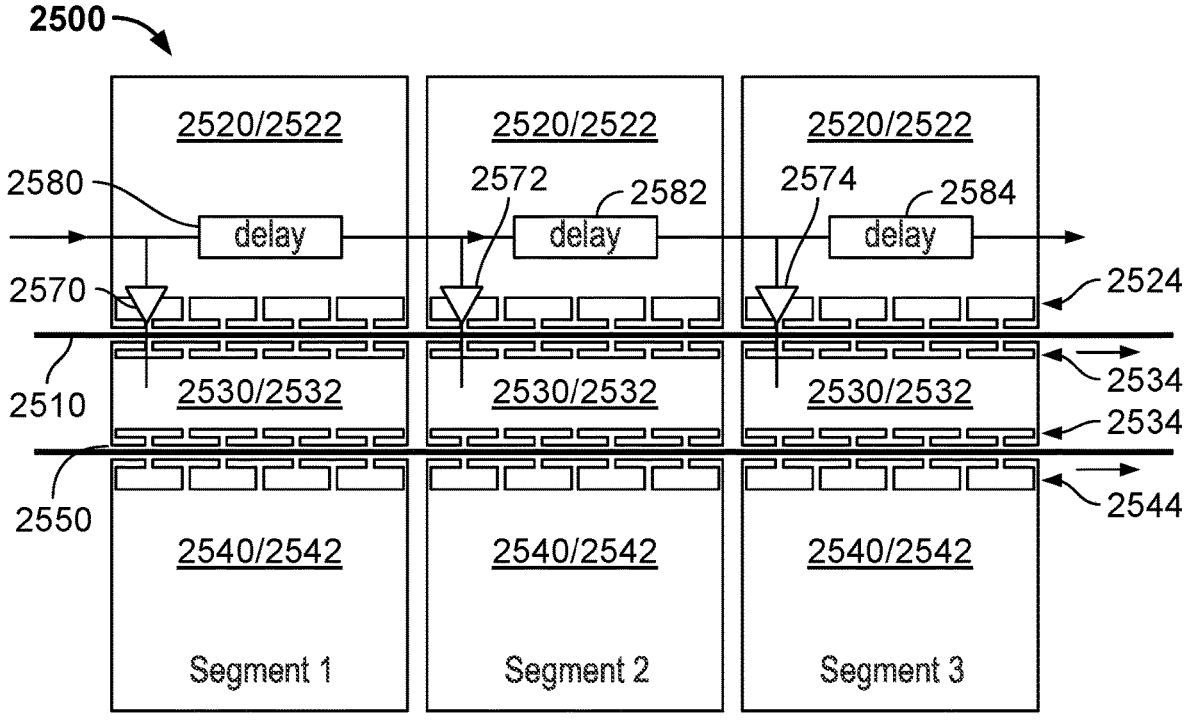
FIG. 25 depicts a portion of an embodiment of an optical device capable of having improved performance.

FIG. 25 depicts a plan view of a portion of optical device 2500. Optical device 2500 is analogous to optical device(s) 100, 100', 100", 100''' and/or 100''''. Consequently, similar structures have analogous labels. Optical device 2500 including waveguides 2510 and 2550 as well as electrodes 2520, 2530 and 2254 that are analogous to waveguides 110' and 150 and electrodes 120, 130 and 140, respectively. Electrodes 2520, 2530 and 2540 include channel portions 2522, 2532, and 2542, respectively, as well as extensions 2524, 2534, and 2544 that are analogous to channel portions 122, 132 and 142 and extensions 224, 234 and 244. Further, electrodes 2520, 2530 and 2540 are separated into three segments along waveguides 2510 and 2550. Segmented electrodes 2520, 2530 and 2540 may also be used with a distributed driver scheme, in which each electrode pair (2520 and 2530 or 2530 and 2540) includes multiple electrode sections. Each set of segments are driven with a separate driver amplifier 2570, 2572, and 2574 that are connected between a common source and signal electrode 2530. An electrical delay 2580, 2582, and 2584, either physical or electronic 110a to 110c may be introduced between each separate driver, 2570, 2572, and 2574 to mitigate velocity mismatches between the optical signal in waveguides 2510 and 2550 and the electrode signal in electrodes 2520, 2530 and 2540. Optical device 2500 may share the benefits of optical device(s) 100, 100', 100", and 100'''.

Figure 26A:
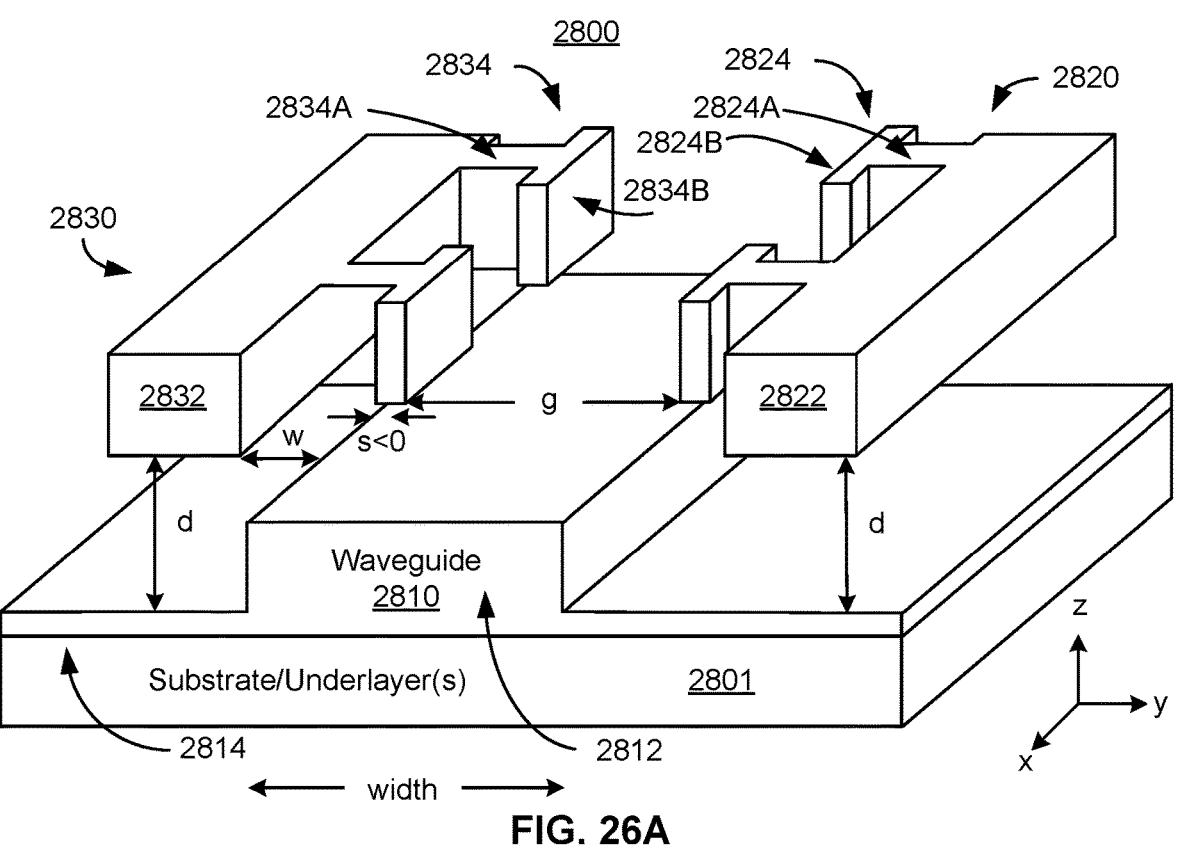
FIGS. 26A-26B depict a portion of an embodiment of an optical device capable of having improved performance.
Figure 26B:
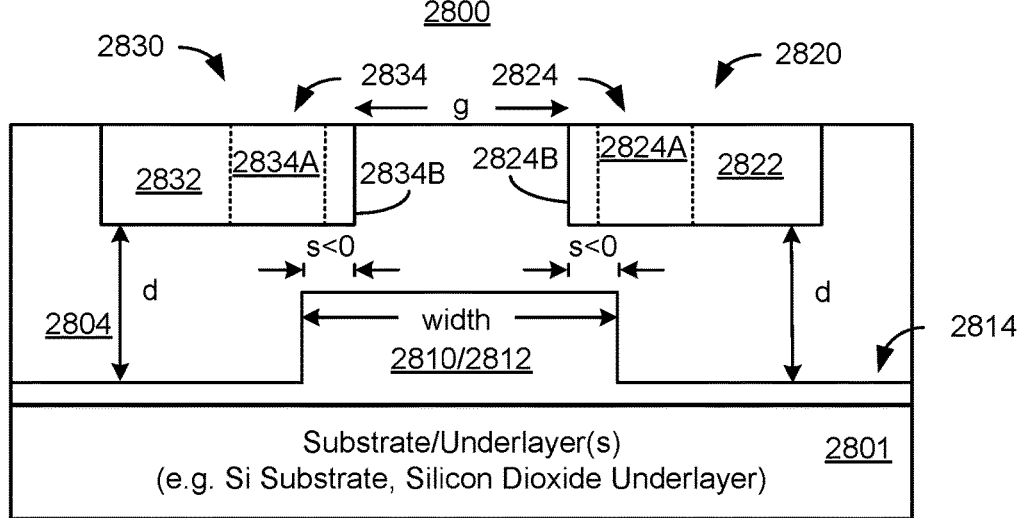

FIGS. 26A-26B depict a portion of an embodiment of optical device 2800 capable of having improved performance. FIGS. 26A and 26B are not to scale. FIG. 26A is a perspective view of optical device 2800, while FIG. 26B is a cross-sectional view of optical device 2800. Optical device 2800 is analogous to optical device(s) 100, 100', 100", 100''', and/or 100''''. Consequently, analogous portions of optical device 2800 are labeled similarly.

Optical device 2800 includes waveguide 2810 as well as electrodes 2820 and 2830 that are analogous to waveguide 110' and electrodes 120 and 130, respectively. Waveguide 2810 may be a thin film waveguide. For example, ridge 2812 and/or thin film region 2814 may each have a thickness not exceeding four hundred nanometers. In some embodiment, ridge 2812 and/or thin film region 2814 may have a thickness not exceeding two hundred nanometers. In some embodiments, waveguide 2810 has a thickness of not more than four hundred nanometers. in some embodiments, waveguide 2810 has a thickness not exceeding six hundred nanometers. Waveguide 2810 may have a thickness not more than eight hundred nanometers. In some embodiments, waveguide 2810 has a thickness of not more than one micrometer. Electrodes 2820 and 2830 include channel portions 2822 and 2832, respectively, as well as extensions 2824 and 2834 that are analogous to channel portions 122 and 132 and extensions 124' and 134'. In the embodiment shown, extensions 2824 include connecting portions 2824A and retrograde portions 2824B that are analogous to connecting portion 124A and retrograde portion 124B, respectively. Similarly, extensions 2834 include connecting portions 2834A and retrograde portions 2834B that are analogous to connecting portion 134A and retrograde portion 134B, respectively. In other embodiments, extensions may have a different shape. Also shown are substrate/underlying layers 2801 that are analogous to substrate/underlayers 101 and cladding 2804 that may be analogous to cladding 204, 304, 404, and/or 504.

Optical device 2800 operates in an analogous manner to optical device(s) 100, 100', 100", 100''', and/or 100''''. Thus, optical device 2800 may share the benefits of optical device(s) 100, 100', 100", 100''', and/or 100''''. Use of nonlinear optical materials in waveguide 2810 (e.g. LN and/or LT) and the configuration of waveguide 2810 (e.g. smoother sidewalls of ridge 2812) may not only increase the electro-optic effect (e.g. provide for larger modulations in index of refraction), but also reduce optical losses. Consequently, a longer waveguide 2810, larger total change in index of refraction and thus an enhanced modulation of the optical signal may be achieved. Use of electrodes 2820 and 2830 having extensions 2824 and 2834, respectively, may reduce microwave losses, allow for a large electric field at waveguide 2810/ridge 2812 and improve the propagation of the microwave signal through electrodes 2820 and 2830, respectively. Consequently, performance of optical device 2800 may be significantly enhanced.

Furthermore, the location of electrodes 2820 and 2830 with respect to waveguide 2810 has been changed. Electrodes 2820 and 2830 are further from thin film portion 2814 and, therefore, from substrate/underlayer(s) 2801. In the embodiment shown, therefore, d (the distance from the top of thin film portion 2814 to channel region 2820 and 2830) is greater than the height of ridge 2812. Channel regions 2822 and 2832 are separated from ridge 2812 in the y direction by a distance w. In some embodiments, w may be zero or negative (i.e. channel regions 2822 and/or 2832 may reside above ridge 2812). Extensions 2824 and 2834 extend above ridge 2812. More specifically, the gap, g, between extensions 2824 and extensions 2834 is less than the width ("width") of ridge 2812. Thus, in the embodiment shown, the distance between ridge 2812 and extensions 2824 and 2834 in the y direction, s, is less than zero. In some embodiments, electrodes 2820 and 2830 are symmetric with respect to the center of ridge 2812 parallel to the x-axis, as shown in FIGS. 26A and 26B. In other embodiments, electrodes 2820 and 2830 need not be symmetric. For example, an analogous optical device can have one electrode (e.g. analogous to electrode 2820) with long extensions analogous to 2824 (e.g. connecting portions longer than 2824A). Such extensions may extend further above the ridge, past the middle point of the ridge, while the other electrode (e.g. analogous to electrode 2830) may have short extensions analogous to 2834 (e.g. connecting portions shorter than 2834A). In another example, one electrode may have extensions having different dimensions, different shape, different pitch, and/or extend over the ridge a different amount than the extensions of the other electrode.

Although extensions 2824 and 2834 extend over ridge 2812 (g<width), electrodes 2820 and 2830 do not intersect the well-confined portion of the optical mode (not shown in FIGS. 26A and 26B) of the optical signal transmitted by waveguide 2810. Similarly, channel regions 2822 and 2832 do not intersect the well-confined portion of the optical mode. For example, in some embodiments, extensions 2824 and 2834 (and thus electrodes 2820 and 2830) are at least five hundred nanometers from ridge 2812. In some embodiments, extensions 2824 and 2834 (and thus electrodes 2820 and 2830) are at least six hundred nanometers from ridge 2812. Extensions 2824 and 2834 (and thus electrodes 2820 and 2830) may be at least eight hundred nanometers from ridge 2812. In some embodiments, extensions 2824 and 2834 (and thus electrodes 2820 and 2830) are at least one micrometer from ridge 2812. Consequently, location of electrodes 2820 and 2830 may not significantly adversely affect the optical performance of waveguide 2810. Stated differently, optical device 2800 is a low loss optical device. Consequently, preventing electrodes 2820 and 2830 from intersecting the well-confined portion of the optical mode may result in significant decreases in loss. Further, extensions 2924 are closer to extensions 2834. As a result, the electric field generated in the region of ridge 2812 may be enhanced for a given electrode signal carried by electrodes 2820 and/or 2830. For example, the electric field between the (closer) extensions 2824 and 2834 may be greater than the electric field between the (further apart) extensions 124' and 134' of optical device 100'. Thus, the electro-optic effect generated in ridge 2812 may be enhanced. However, electrodes 2820 and 2830 are further from thin film portion 2814 of waveguide 2810. Thus, the ability of thin film portion 2814 to propagate the electric field generated by the electrode signal(s) carried by electrodes 2820 and 2830 may be reduced. However, the combination of the enhanced electric field between electrodes 2820 and 2830 and the reduced propagation of the electric field through thin film portion 2814 may enhance or not significantly adversely affect performance of optical device 2800 as compared to (for example) optical device 100'. Thus, the improved performance of optical device 2800 may be maintained. In addition, fabrication of optical device 2800 may be facilitated. For example, fabrication may be simplified due to the position of electrodes 2820 and 2830 above ridge 2812.

In some embodiments, cladding 2804 may be configured to improve performance of optical device 2800. Cladding 2804 generally has a lower optical index of refraction than ridge 2812. For example, cladding 2804 has a lower index of refraction than LN and/or LT in some embodiments. In such embodiments, cladding 2804 may include or consist of silicon oxide (e.g. $SiO_2$) or silicon oxynitride (e.g. SiON). In some embodiments, cladding 2804 may include a thin charge-bleed cladding layer. The charge-bleed cladding layer is a slightly conductive dielectric. The charge-bleed cladding layer allows for charge recombination, thereby mitigating the accumulation of charge as a result of photorefraction. Materials used for such a charge-bleed cladding layer may include doped oxides and/or transparent conductive oxides (TCOs). Other embodiments may use other material(s) for cladding 2804 and/or differently configure cladding 2804.

Because electrodes 2820 and 2830 are further from substrate/underlayer(s) 2801 than the top of ridge 2812, a portion of cladding 2804 can be provided on waveguide 2810. Electrodes 2820 and 2830 may simply be formed on this portion of cladding 2804. For example, a layer of metallization may be deposited and patterned to form electrodes 2820 and 2830. Electrodes 2820 and 2830 may then be insulated with an additional portion of cladding 2804 and/or another insulator. In other embodiments, trenches for electrodes 2820 and 2830 may be formed in the portion of cladding 2804, a layer of metallization provided, and the portion of the metallization outside of the trenches removed. Other processes may also be used. Consequently, not only may optical device 2800 have improved performance, but may also be simpler to fabricate.

Figure 27A:
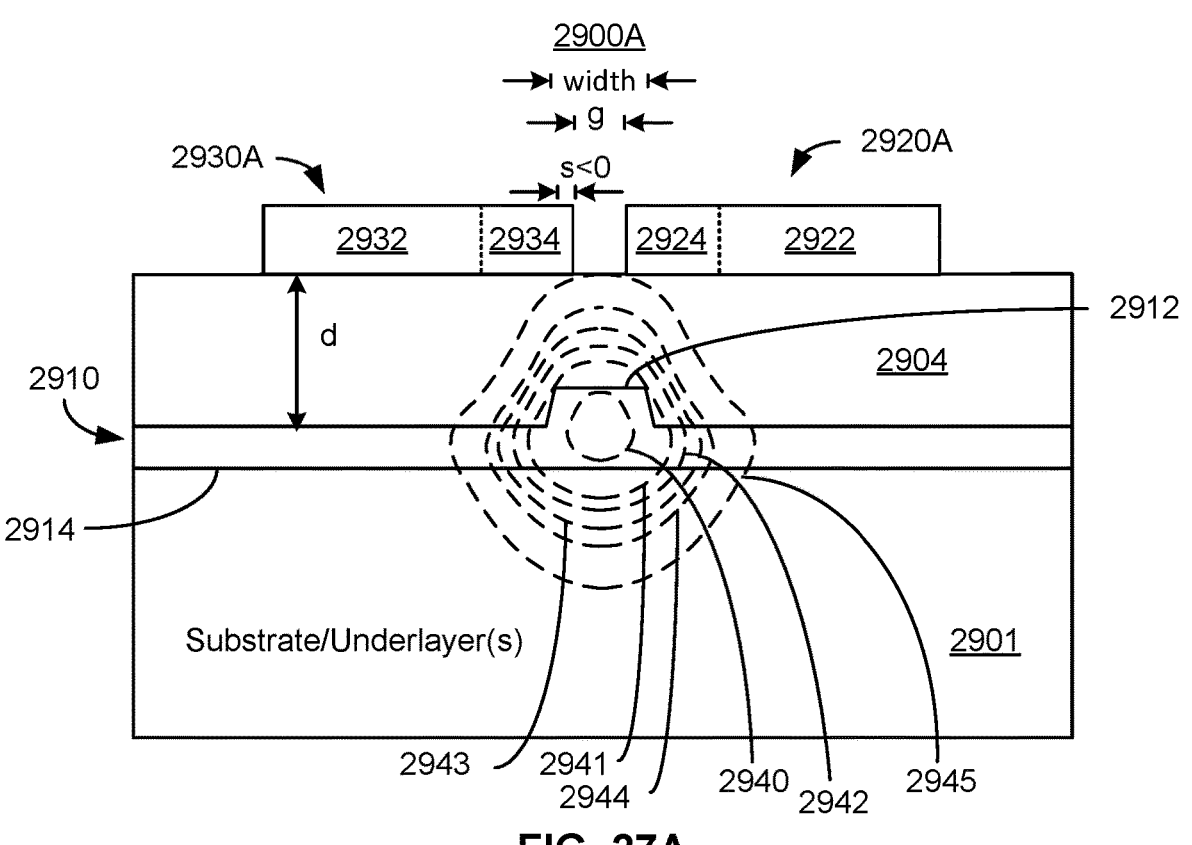
FIGS. 27A-27B depict portions of embodiments of opti-cal devices capable of having improved performance.
Figure 27B:
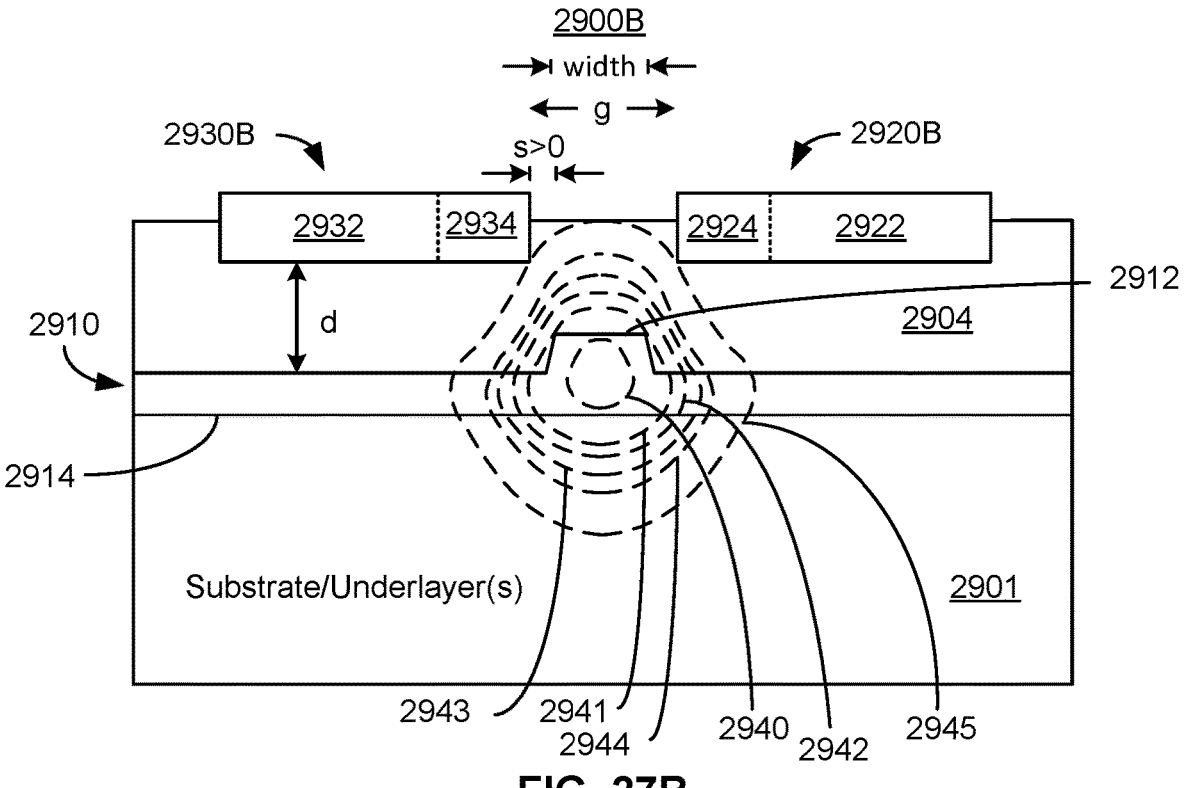

FIGS. 27A-27B depict a portion of embodiments of optical devices 2900A and 2900B capable of having improved performance. FIGS. 27A and 27B are not to scale. Optical devices 2900A and 2900B are analogous to optical device 2800 and thus to optical device(s) 100, 100', 100", 100''', 100''''. Analogous portions of optical devices 2900A and 2900B are labeled similarly. Optical devices 2900A and 2900B each includes waveguide 2910, cladding 2904, as well as electrodes 2920A and 2930A and electrodes 2920B and 2930B that are analogous to waveguide 2810, cladding 2804, and electrodes 2820 and 2830, respectively. Electrodes 2920A and 2930A include channel portions 2922 and 2932, respectively, as well as extensions 2924 and 2934 that are analogous to channel portions 2822 and 2832 and extensions 2824 and 2834. Similarly, electrodes 2920B and 2930B include channel portions 2922 and 2932, respectively, as well as extensions 2924 and 2934 that are analogous to channel portions 2822 and 2832 and extensions 2824 and 2834. Extensions 2924 may include connecting portions and retrograde portions that are analogous to connecting portion 2824A and retrograde portion 2824B, respectively. Similarly, extensions 2934 may include connecting portions and retrograde portions that are analogous to connecting portion 2834A and retrograde portion 2834B, respectively. In other embodiments, extensions may have a different shape. Also shown are substrate/underlying layers 2901 that are analogous to substrate/underlayers 2801.

Optical device 2900 operates in an analogous manner to optical device(s) 2800 and thus to optical device(s) 100, 100', 100", 100''', and 100''''. Thus, optical device 2900 may share the benefits of optical device 2800. In optical device 2900A the gap, g, between extensions 2934 and 2924 is less than the width of ridge 2912. In addition, electrodes 2920A, 2930A, 2920B, and 2930B are further from substrate/underlayer(s) 2901 than the top of waveguide 2910. Stated differently, electrodes 2920A, 2930A, 2920B, and 2930B are a distance, d, from the top of thin film portion 2914 that is than the height of ridge 2912.

Electrodes 2920A and 2930A do not intersect the well-confined portion of the optical mode of the optical signal carried by waveguide 2910. The optical mode of the optical signal is indicated by dashed lines 2940, 2941, 2942, 2943, 2944, and 2945 for optical devices 2900A and 2900B. Further, the dashed lines indicate the intensity of the optical mode on a log scale. The well-confined optical mode (i.e. the highest intensity) is indicated by dashed lines 2940. This highest intensity portions of the optical mode are generally confined to within (2940) and very close (2941) to ridge 2912. Stated differently, the intensity of the well-confined portion includes or consists of the highest intensity of the optical mode. In some embodiments, the lowest intensity portion of the optical mode shown 2945 may have an intensity attenuated by at least 10 dB from the intensity of well-confined optical mode 2940. The lowest intensity portion of the optical mode shown 2945 may have an intensity attenuated by at least 20 dB from the intensity of well-confined optical mode 2940 and, in some embodiments, 2941. In some embodiments, the lowest intensity portion of the optical mode shown 2945 may have an intensity attenuated by at least 30 dB from the intensity of well-confined optical mode 2940/2940 and 2941. Thus, as used herein, the "lowest intensity portion" of the optical mode has an intensity that is attenuated from the intensity of the well-confined portion (e.g. 2940 and/or 2940 combined with 2941) by 10 dB, 20 dB, or 30 dB. Even lower intensity portions of the optical mode (e.g. with intensity attenuated by 50 dB, 60 dB, or 70 dB) are present but not explicitly depicted. Intersection of electrodes 2920 and/or 2930 with such ultra-low intensity portions of the optical mode is possible without adversely affecting optical device 2900. Consequently, such portions of the optical mode are not discussed. Thus, electrodes 2920A and 2930A are positioned such that the electrodes do not intersect the lowest intensity portion of optical mode 2945 shown. Stated differently, electrodes 2920A and 2930A do not intersect portion of the optical mode 2945 that is attenuated by at least 10 dB, 20 dB, or 30 dB from the intensity of well-confined optical mode 2940. As a result, despite being separated by a gap that is less than the width of ridge 2912, electrodes 2920A and 2930A do not significantly adversely affect the optical signal propagating through waveguide 2910. Performance of optical device 2900A may be improved. Further, because electrodes 2920A and 2930A above the top of ridge 2912, fabrication of electrodes 2920A and 2930A may be facilitated in a manner analogous to electrodes 2820 and 2830. Thus, formation of optical device 2900A may be improved.

For example, in some embodiments the lowest intensity optical mode 2945 has an intensity at its perimeter/outer surface that is the average or median intensity of well-confined modes 2940 or 2940 and 2941 attenuated by at least 10 dB, at least 20 dB, or at least 30 dB. In some embodiments the lowest intensity optical mode 2945 has an intensity at its perimeter/outer surface that is the peak intensity of well-confined modes 2940 or 2940 and 2941 attenuated by at least 10 dB, at least 20 dB, or at least 30 dB. The well-confined optical modes 2940 or 2940 and 2941 may be defined by the fraction of the mode confined to ridge 2912. In some embodiments, well-confined optical modes 2940 or 2940 and 2941 have at least sixty percent of their area within ridge 2912. In some embodiments, well-confined modes 2940 or 2940 and 2941 have at least seventy percent of their area within ridge 2912. In some such embodiments, well-confined modes 2940 or 2940 and 2941 have at least ninety percent of their area within ridge 2912. Thus, extensions 2924 and 2934 may not be closer to ridge 2912 than the outer perimeter/surface of optical mode 2945.

Optical device 2900B is analogous to optical device 2900A. However, electrodes 2920B and 2930B have been moved closer to substrate/underlayer(s) 2901. Further, electrodes 2920B and 2930B are spaced further apart. Thus, the width of ridge 2912 is less than the gap, g, between electrodes 2920B and 2930B. For electrodes 2920B and 2930B, the distance in the y direction between the edge of extensions 2924 and 2934 and ridge 2912 (s) is greater than zero.

Electrodes 2920B and 2930B are further spaced apart such that electrodes 2920B and 2930B do not intersect the lowest intensity portion of the optical mode 2945 shown. Thus, electrodes 2920B and 2930B are still positioned such that the electrodes do not intersect the lowest intensity portion of optical mode 2945 shown. Stated differently, electrodes 2920B and 2930B do not intersect portion of the optical mode 2945 that is attenuated by at least 10 dB, 20 dB, or 30 dB from the intensity of well-confined optical mode 2940. As a result, despite being closer to thin film portion 2912 of waveguide 2910, electrodes 2920B and 2930B do not significantly adversely affect the optical signal propagating through waveguide 2910. Performance of optical device 2900B may be improved. Further, because electrodes 2920A and 2930A above the top of ridge 2912, fabrication of electrodes 2920B and 2930B may be facilitated in a manner analogous to electrodes 2820 and 2830. Thus, formation of optical device 2900B may be improved.

Figure 28:
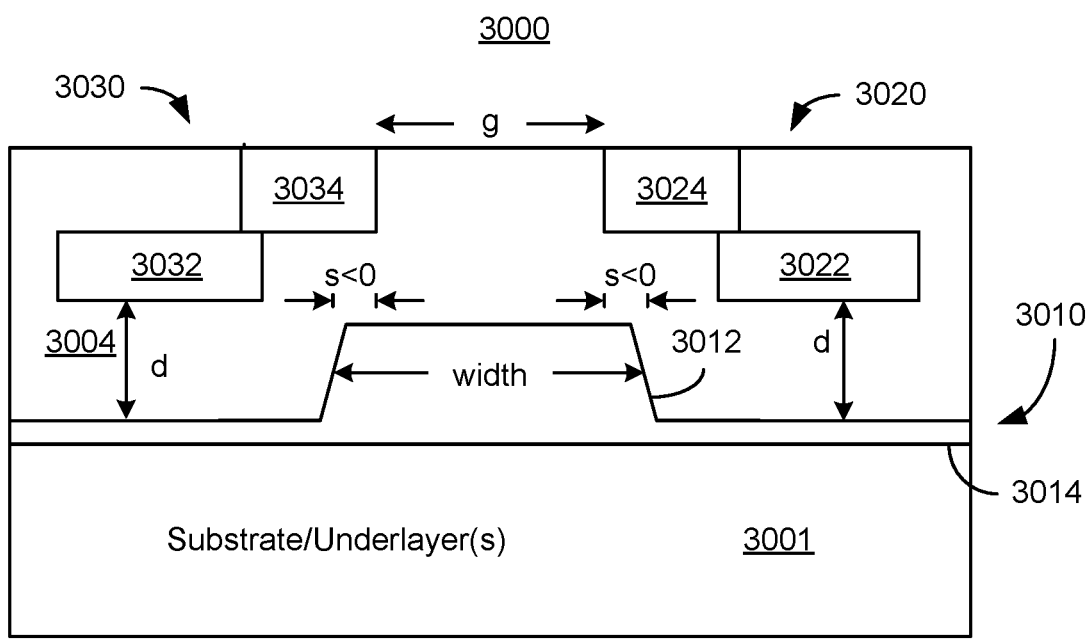
FIG. 28 depicts a portion of an embodiment of an optical device capable of having improved performance.

FIG. 28 depicts a portion of an embodiment of optical device 3000 capable of having improved performance. FIG. 28 is not to scale. Optical device 3000 is analogous to optical device(s) 2800, 2900A, and/or 2900B and thus to optical device(s) 100, 100', 100", 100''', 100''''. Analogous portions of optical device 3000 are labeled similarly. Optical device 3000 includes waveguide 3010, cladding 3004, as well as electrodes 3020 and 3030 that are analogous to waveguide 2810, cladding 2804, and electrodes 2820 and 2830, respectively. Electrodes 3020 and 3030 include channel portions 3022 and 3032, respectively, as well as extensions 3024 and 3034 that are analogous to channel portions 2822 and 2832 and extensions 2824 and 2834. Extensions 3024 may include connecting portions and retrograde portions that are analogous to connecting portion 2824A and retrograde portion 2824B, respectively. Similarly, extensions 3034 may include connecting portions and retrograde portions that are analogous to connecting portion 2834A and retrograde portion 2834B, respectively. In other embodiments, extensions may have a different shape. Also shown are substrate/underlying layers 3001 that are analogous to substrate/underlayers 2801.

Optical device 3000 operates in an analogous manner to optical device(s) 2800 and thus to optical device(s) 100, 100', 100", 100''', and 100''''. Thus, optical device 3000 may share the benefits of optical device 2800. In optical device 3000 the gap, g, between extensions 3034 and 3024 is less than the width of ridge 3012. In addition, electrodes 3020 and 3030 are further from substrate/underlayer(s) 3001 than the top of waveguide 3010. Stated differently, electrodes 3020 and 3030 are a distance, d, from the top of thin film portion 3014 higher than the height of ridge 3012. In some embodiments, however, d may be the same as or less than the height of ridge 3012. For example, d may be zero (electrodes 3020 and/or 3030 in contact with the top of thin film portion 3014) or negative (electrodes 3020 and/or 3030 recessed in thin film portion 3014 or below). Although channel regions 3022 and 3032 are shown as spaced apart from the edges of ridge 3012 (w>0), in other embodiments, channel regions 3022 may be closer (e.g. w≤0).

Extensions 3024 and 3034 extend over ridge 3012 (g<width). However, electrodes 3020 and 3030 do not intersect the well-confined portion of the optical mode (not shown in FIG. 28) of the optical signal transmitted by waveguide 3010. Thus, extensions 3024 and 3034 (and thus electrodes 3020 and 3030) are spaced apart from ridge 3012 in an analogous manner to shown in optical device(s) 2800, 2900A, and/or 2900B. Thus, optical device 3000 may have improved performance analogous to that of optical device 2800. Extensions 3024 and 3024 are also formed on channel regions 3022 and 3032, respectively. Thus, extensions 3024 and 3034 may be formed in a separate layer than channel regions 3022 and 3032. For example, a layer of metallization may be deposited and patterned to form channel regions 3022 and 3032. A layer of insulation may be provided, channel regions 3022 and 3032 exposed, and extensions 3024 and 3034 formed. In some embodiments, a portion of cladding 3004 is removed from above electrodes 3020 and/or 3030, for example via etching. Removal of this portion of the cladding may reduce the velocity of the microwave mode and improve the matching between the velocities of the optical mode transmitted by waveguide 3010 and the microwave mode carried by electrodes 3020 and/or 3030. This thinning or removal of cladding may be carried out in embodiments in which the electrode is below the top surface of the cladding. In some such embodiments, this portion of the cladding may only or primarily be used for passivation of ethe electrodes. Thus, the cladding may be thinned to lower the microwave mode velocity. Consequently, not only may optical device 3000 have improved performance, but may also be simpler to fabricate.

Figure 29:
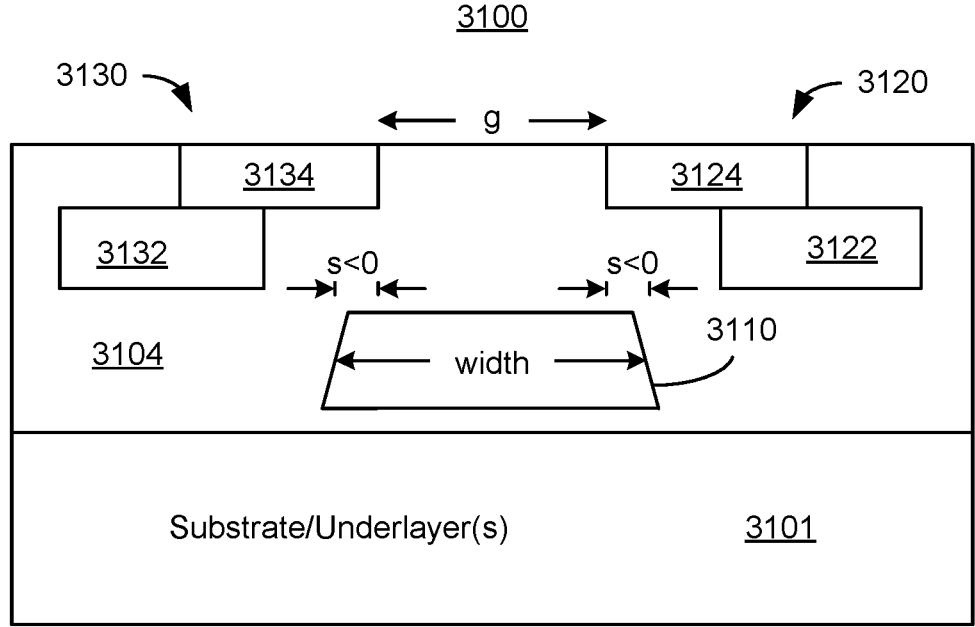
FIG. 29 depicts a portion of an embodiment of an optical device capable of having improved performance.

FIG. 29 depicts a portion of an embodiment of optical device 3100 capable of having improved performance. FIG. 29 is not to scale. Optical device 3100 is analogous to optical device(s) 2800, 2900A, 2900B, and/or 3000 and thus to optical device(s) 100, 100', 100", 100''', 100''''. Optical device 3100 is most analogous to optical device 3000. Analogous portions of optical device 3100 are labeled similarly. Optical device 3100 includes waveguide 3110, cladding 3104, as well as electrodes 3120 and 3130 that are analogous to waveguide 3010, cladding 3004, and electrodes 31020 and 3030, respectively. Electrodes 3120 and 3130 include channel portions 3122 and 3132, respectively, as well as extensions 3124 and 3134 that are analogous to channel portions 3022 and 3032 and extensions 3024 and 3034. Extensions 3124 may include connecting portions and retrograde portions that are analogous to connecting portion 2824A and retrograde portion 2824B, respectively. Similarly, extensions 3134 may include connecting portions and retrograde portions that are analogous to connecting portion 2834A and retrograde portion 2834B, respectively. In other embodiments, extensions may have a different shape. Also shown are substrate/underlying layers 3101 that are analogous to substrate/underlayers 3001.

Optical device 3100 operates in an analogous manner to optical device(s) 2800, 2900A, 2900B, and 3000 and thus to optical device(s) 100, 100', 100", 100''', and 100''''. Thus, optical device 3100 may share the benefits of optical device 3000. However, in the embodiment shown, waveguide 3110 is a channel waveguide. Thus, thin film portion of waveguide 3110 has been omitted. In other embodiments, waveguide 3110 may have a thin film portion that is simply thinner than that of other embodiments. In some embodiments, waveguide 3110 may have a discontinuous thin film portion (e.g. with apertures or other cutouts). Electrodes 3120 and 3130 may still be located with respect to waveguide 3110 in a manner that is analogous to electrodes 2820, 2830, 2920A, 2930A, 2920B, and 2930B. Thus, performance may still be improved. Further, because of the positions of channel portions 3122 and 3132 and extensions 3124 and 3134, optical device 3100 may be simpler to fabricate.

Figure 30A:
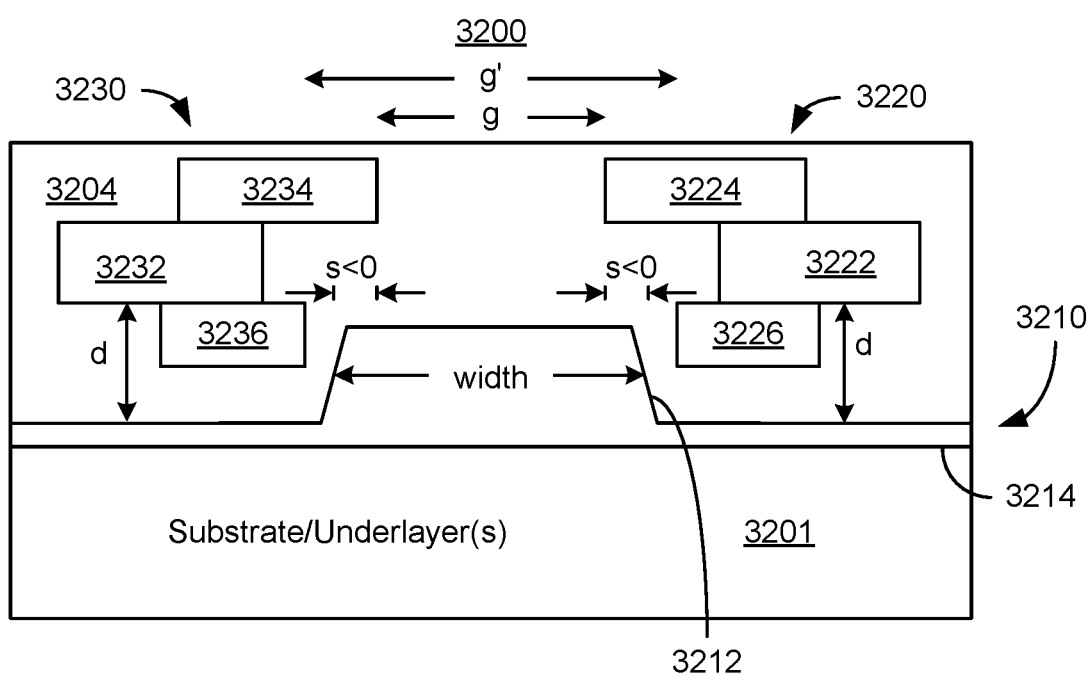
FIGS. 30A-30B depict a portion of an embodiment of an optical device capable of having improved performance.
Figure 30B:
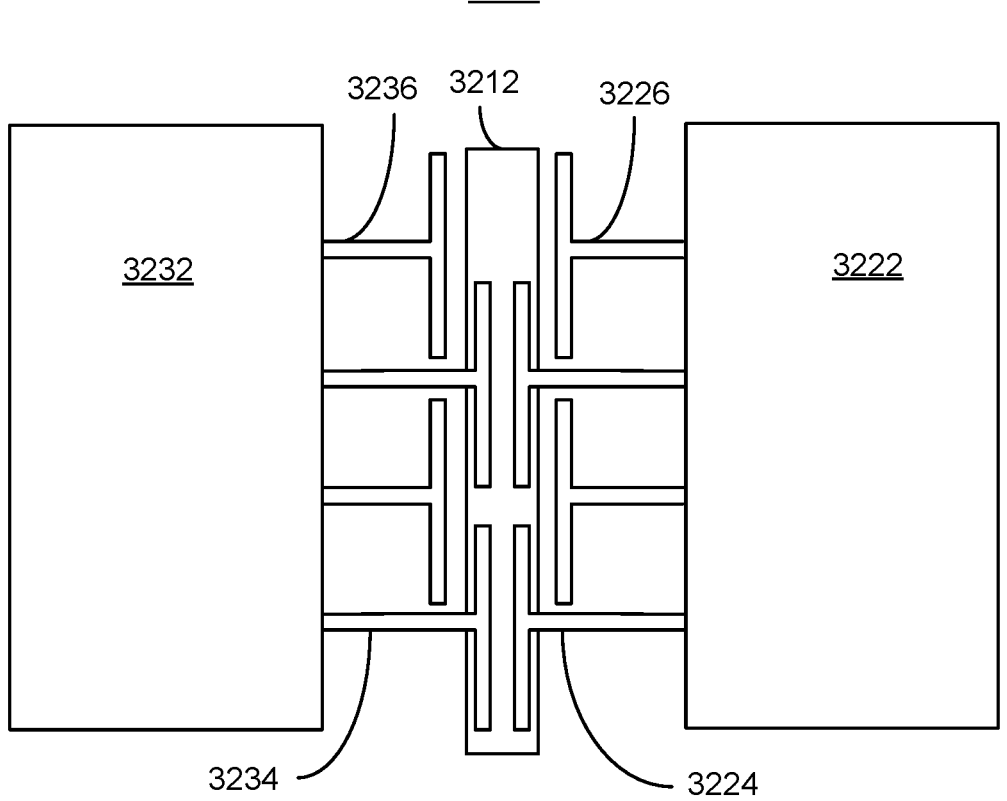

FIGS. 30A and 30B depict cross-sectional and plan views of a portion of an embodiment of optical device 3200 capable of having improved performance. FIGS. 30A and 30B are not to scale. Optical device 3200 is analogous to optical device(s) 2800, 2900A, 2900B, 3000, and/or 3100 and thus to optical device(s) 100, 100', 100", 100'", 100"". Analogous portions of optical device 3200 are labeled similarly. Optical device 3200 includes waveguide 3210, cladding 3204, as well as electrodes 3220 and 3230 that are analogous to waveguide 3010, cladding 3004, and electrodes 3020 and 3030, respectively. Electrodes 3220 and 3230 include channel portions 3222 and 3232, respectively, as well as extensions 3224 and 3234 that are analogous to channel portions 3022 and 3032 and extensions 3024 and 3034. Extensions 3224 includes connecting portions and retrograde portions that are analogous to connecting portion 2824A and retrograde portion 2824B, respectively. Similarly, extensions 3234 include connecting portions and retrograde portions that are analogous to connecting portion 2834A and retrograde portion 2834B, respectively. In other embodiments, extensions may have a different shape. Also shown are substrate/underlying layers 3201 that are analogous to substrate/underlayers 2801.

Optical device 3200 operates in an analogous manner to optical device(s) 2800 and thus to optical device(s) 100, 100', 100", 100'", and 100"". Thus, optical device 3200 may share the benefits of optical device 2800. In optical device 3200 the gap, g, between extensions 3234 and 3224 is less than the width of ridge 3212. Channel regions 3222 and 3232 are a distance, d, from the top of thin film portion 3214 higher than the height of ridge 3212. In some embodiments, however, d may be the same as or less than the height of ridge 3212. Although channel regions 3222 and 3232 are shown as spaced apart from the edges of ridge 3212 (w>0), in other embodiments, channel regions 3222 may be closer (e.g. w≤0).

Electrodes 3220 and 3230 also include additional extensions 3226 and 3236, respectively. Extensions 3226 are between channel region 3222 and substrate/underlayer(s) 3201. Similarly, extensions 3236 are between channel region 3232 and substrate/underlayer(s) 3201. Extensions 3226 and 3236 are separated by gap g'. Extensions 3226 includes connecting portions and retrograde portions that are analogous to connecting portion 2824A and retrograde portion 2824B, respectively. Similarly, extensions 3236 include connecting portions and retrograde portions that are analogous to connecting portion 2834A and retrograde portion 2834B, respectively. In other embodiments, extensions may have a different shape. In the embodiment shown, extensions 3226 and 3236 are below channel regions 3222 and 3232 and at least partially below the top of ridge 3212. In some embodiments, extensions 3226 and 3236 may be above extensions 3224 and 3234. In other embodiments, extensions 3226 and 3236 may be below ridge 3214. In some embodiments, additional sets of extensions may be provided. Consequently, the height, gaps, location of, and numbers of sets of extensions may be tailored. Also shown are substrate/underlying layers 3201 that are analogous to substrate/underlayers 2801.

Optical device 3200 may have improved performance analogous to that of optical device(s) 2800. Use of extensions 3226 and 3236 may further increase the electric field between electrodes 3220 and 3230. The positions of channel regions 3222 and 3232 as well as extensions 3224, 3234, 3226, and 3236 may facilitate fabrication of optical device 3200. Further, use of extensions 3224, 3234, 3226, and 3236 at different distances from substrate 3201 may facilitate fabrication. Consequently, not only may optical device 3200 have improved performance, but may also be simpler to fabricate.

Figure 31A:
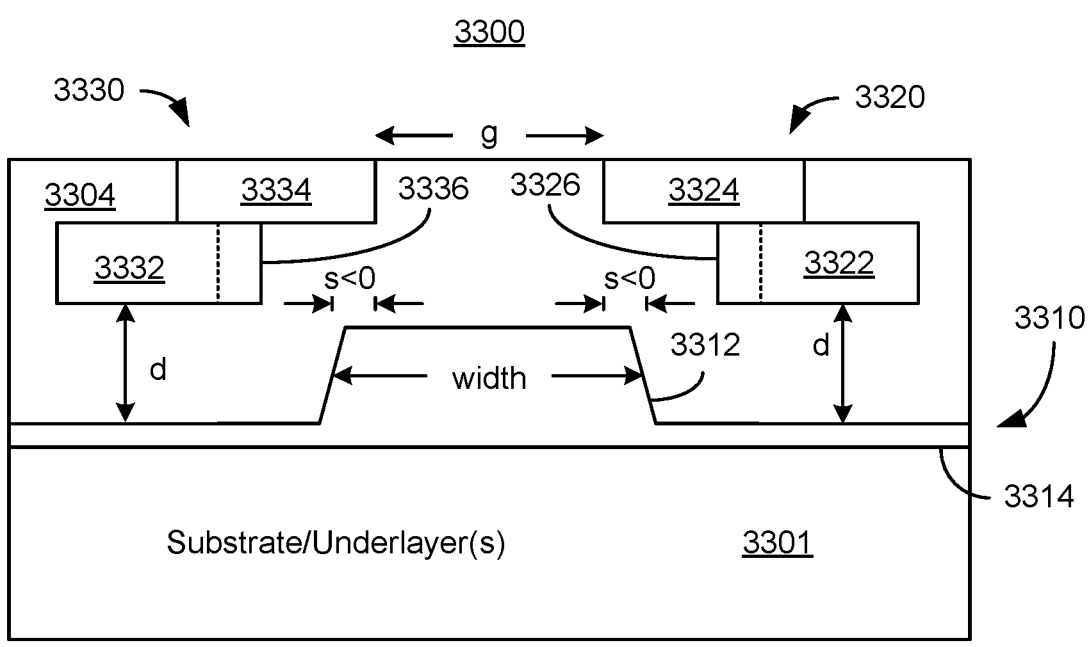
FIGS. 31A-31B depict a portion of an embodiment of an optical device capable of having improved performance.
Figure 31B:
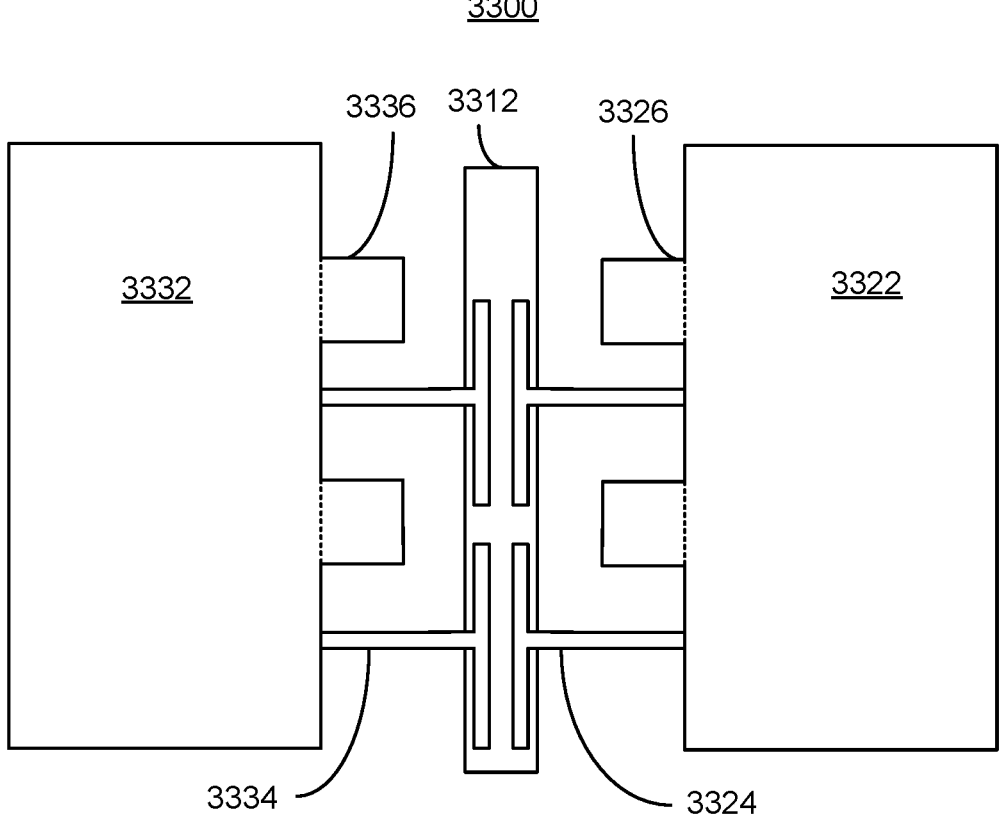

FIGS. 31A and 31B depict cross-sectional and plan views of a portion of an embodiment of optical device 3300 capable of having improved performance. FIGS. 31A and 31B are not to scale. Optical device 3300 is analogous to optical device(s) 2800, 2900A, 2900B, 3000, 3100, and/or 3200 and thus to optical device(s) 100, 100', 100", 100'", 100"". Analogous portions of optical device 3300 are labeled similarly. Optical device 3300 includes waveguide 3310, cladding 3304, as well as electrodes 3320 and 3330 that are analogous to waveguide 3010, cladding 3004, and electrodes 3020 and 3030, respectively. Electrodes 3320 and 3330 include channel portions 3322 and 3332, respectively, as well as extensions 3324 and 3334 that are analogous to channel portions 3022 and 3032 and extensions 3024 and 3034. Extensions 3324 includes connecting portions and retrograde portions that are analogous to connecting portion 2824A and retrograde portion 2824B, respectively. Similarly, extensions 3334 include connecting portions and retrograde portions that are analogous to connecting portion 2834A and retrograde portion 2834B, respectively. In other embodiments, extensions may have a different shape. Also shown are substrate/underlying layers 3301 that are analogous to substrate/underlayers 2801.

Optical device 3300 operates in an analogous manner to optical device(s) 2800 and thus to optical device(s) 100, 100', 100", 100'", and 100"". Thus, optical device 3300 may share the benefits of optical device 2800. In optical device 3300 the gap, g, between extensions 3334 and 3324 is less than the width of ridge 3312. Channel regions 3322 and 3332 are a distance, d, from the top of thin film portion 3314 and higher than the height of ridge 3312. In some embodiments, however, d may be the same as or less than the height of ridge 3312. Although channel regions 3222 and 3232 are shown as spaced apart from the edges of ridge 3212 (w>0), in other embodiments, channel regions 3222 may be closer (e.g. w≤0).

Electrodes 3320 and 3330 also include additional extensions 3326 and 3336, respectively. Extensions 3326 and 3336 are on the same level as and extend from channel regions 3322 and 3332. Although shown as simply rectangular in shape, extensions 3326 and 3336 may have a different shape. For example, extensions 3326 and/or 3336 may have connecting and retrograde portions (e.g. be "T"-shaped or "L"-shaped). However, having two layers of "T"-shaped electrodes (e.g. one above ridge 3112 and closer to ridge 3112) can complicate velocity matching between the electrode (e.g. microwave) and optical signals. In some embodiments, using a mix of "T"-shaped extensions (e.g. 3324 and 3334) and simple, rectangular extensions (e.g. 3126 and 3136) from channels 3322 and 3332 may provide velocity matching while reducing current crowding. Also shown is substrate/underlying layers 3301 that are analogous to substrate/underlayers 2801.

Optical device 3300 may have improved performance analogous to that of optical device(s) 2800. Use of extensions 3326 and 3336 may further increase the electric field between electrodes 3320 and 3330. The positions of channel regions 3322 and 3332 as well as extensions 3324, 3334, 3326, and 3336 may facilitate fabrication of optical device 3300. Consequently, not only may optical device 3300 have improved performance, but may also be simpler to fabricate.

Figure 32A:
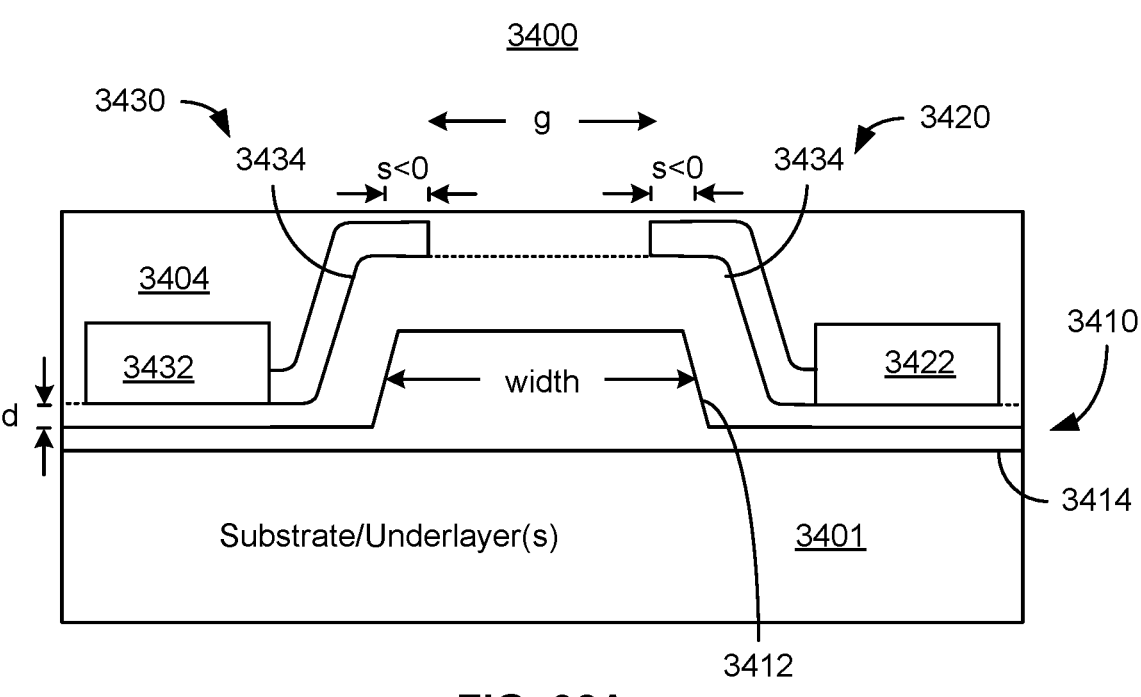
FIGS. 32A-32B depict a portion of an embodiment of an optical device capable of having improved performance.
Figure 32A:
Figure 32B:
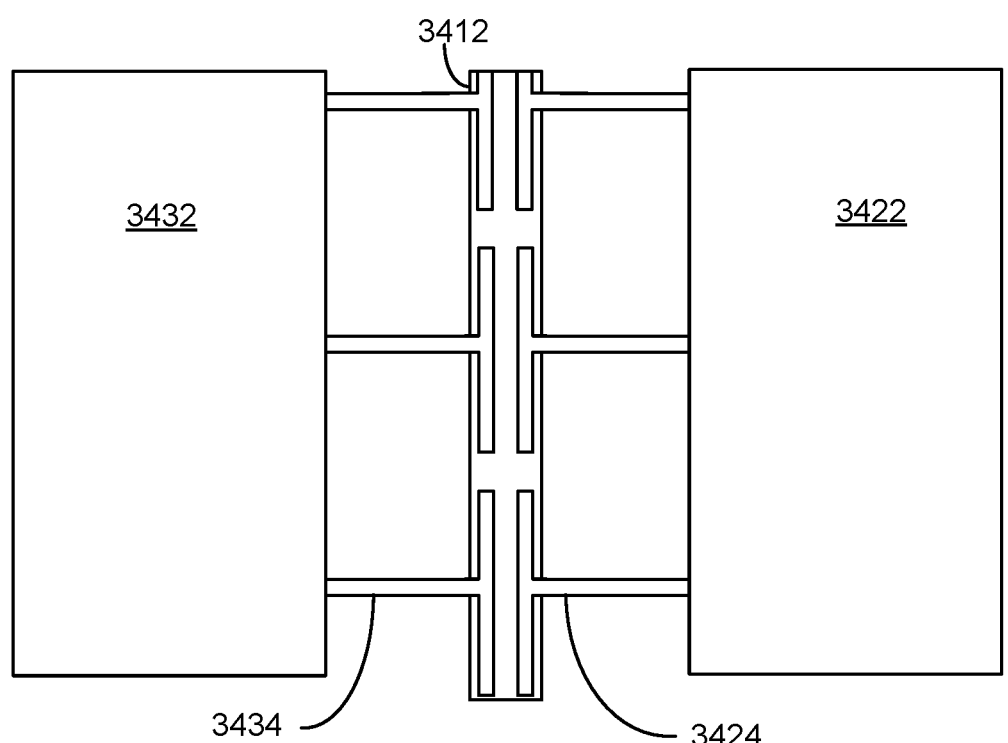

FIGS. 32A and 32B depict cross-sectional and plan views of a portion of an embodiment of optical device 3400 capable of having improved performance. FIGS. 32A and 32B are not to scale. Optical device 3400 is analogous to optical device(s) 2800, 2900A, 2900B, 3000, 3100, 3200 and/or 3300 and thus to optical device(s) 100, 100', 100", 100''', 100"". Analogous portions of optical device 3400 are labeled similarly. Optical device 3400 includes waveguide 3410, cladding 3404, as well as electrodes 3420 and 3430 that are analogous to waveguide 3010, cladding 3004, and electrodes 3020 and 3030, respectively. Electrodes 3420 and 3430 include channel portions 3422 and 3432, respectively, as well as extensions 3424 and 3434 that are analogous to channel portions 3022 and 3032 and extensions 3024 and 3034. Extensions 3424 includes connecting portions and retrograde portions that are analogous to connecting portion 2824A and retrograde portion 2824B, respectively. Similarly, extensions 3434 include connecting portions and retrograde portions that are analogous to connecting portion 2834A and retrograde portion 2834B, respectively. In other embodiments, extensions may have a different shape. Also shown are substrate/underlying layers 3401 that are analogous to substrate/underlayers 2801.

Optical device 3400 operates in an analogous manner to optical device(s) 2800 and thus to optical device(s) 100, 100', 100", 100''', and 100"". Thus, optical device 3400 may share the benefits of optical device 2800. In optical device 3400 the gap, g, between extensions 3434 and 3424 is less than the width of ridge 3412. Channel regions 3422 and 3432 are a distance, d, from the top of thin film portion 3414 and higher than (or approximately the same height as) the height of ridge 3412. In some embodiments, however, d may be the same as or less than the height of ridge 3312. Although channel regions 3422 and 3432 are shown as spaced apart from the edges of ridge 3412 (w>0), in other embodiments, channel regions 3222 may be closer (e.g. w≤0).

In addition, extensions 3424 and 3434 extend a varying distance from substrate/underlayers 3401. For example, electrodes 3420 and 3430 may be formed by removing some of cladding 3404 (the remaining portion indicated by the dashed line in FIG. 32A) or depositing a first layer of cladding (indicated by the dashed line), providing channel regions 3422 and 3422 on the portion of cladding above thin film portion 3414, then providing extensions 3424 and 3434. Additional cladding may then be deposited in order to passivate electrodes 3420 and 3430. In addition to having varying heights, portions of extensions 3424 and 3434 may be configured to extend at different angles from the plane of substrate/underlayer(s) 3401. For example, portions of extensions 3424 and 3434 are parallel to the top surface of substrate/underlayer(s) 3401, and portions of extensions 3424 and 3434 are at a nonzero acute angle from the top surface of substrate/underlayer(s) 3401. Other angles are possible. As a result, extensions 3424 and 3424 may be physically close to ridge 3412 while not extending closer than the lowest intensity optical mode (e.g. the portion of the optical mode having an intensity attenuated by at least 10 dB, 20 dB, or 30 dB from the well-confined, highest intensity portion of the optical mode). Stated differently, extensions 3424 and 3434 may skirt the well-confined optical mode for waveguide 3410.

Optical device 3400 may have improved performance analogous to that of optical device(s) 2800. Moreover, extensions 3424 and 3434 follow the contour of the portion of the cladding on which extensions 3424 and 3434 are formed. As a result, the electric field at ridge 3412 may be enhanced without adversely affecting the optical mode. The positions of channel regions 3322 and 3332 as well as extensions 3324, and 3334 may facilitate fabrication of optical device 3300. Consequently, not only may optical device 3300 have improved performance, but may also be simpler to fabricate.

Figure 33A:
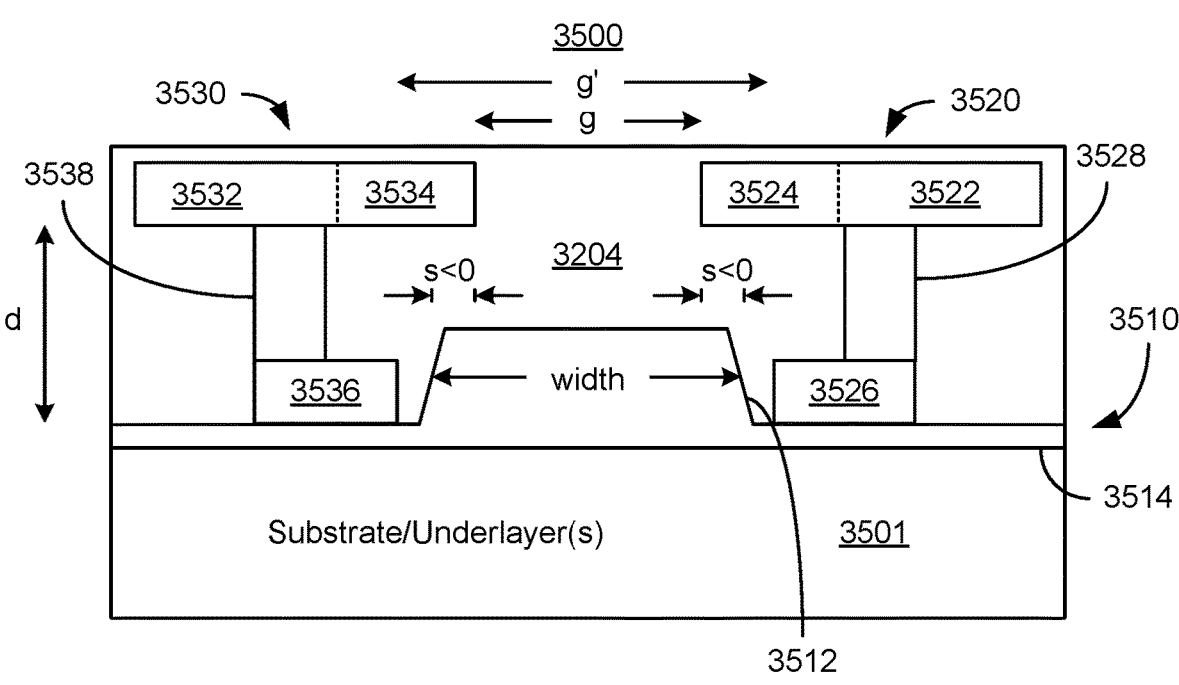
FIGS. 33A-33B depict a portion of an embodiment of an optical device capable of having improved performance.
Figure 33B:
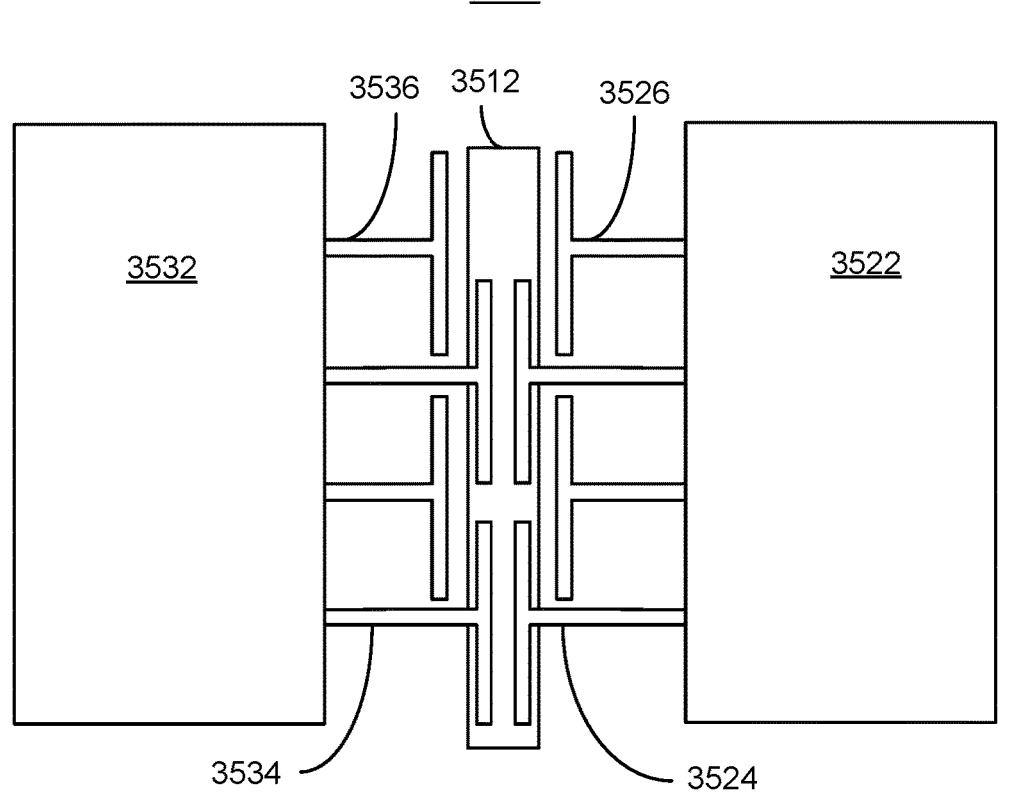

FIGS. 33A and 33B depict cross-sectional and plan views of a portion of an embodiment of optical device 3500 capable of having improved performance. FIGS. 33A and 33B are not to scale. Optical device 3500 is analogous to optical device(s) 2800, 2900A, 2900B, 3000, 3100, 3200, 3300, and/or 3400 and thus to optical device(s) 100, 100', 100", 100''', 100"". Analogous portions of optical device 3500 are labeled similarly. Optical device 3500 includes waveguide 3510, cladding 3504, as well as electrodes 3520 and 3530 that are analogous to waveguide 3010, cladding 3004, and electrodes 3020 and 3030, respectively. Electrodes 3520 and 3530 include channel portions 3522 and 3532, respectively, as well as extensions 3524 and 3534 that are analogous to channel portions 3022 and 3032 and extensions 3024 and 3034. Extensions 3524 includes connecting portions and retrograde portions that are analogous to connecting portion 2824A and retrograde portion 2824B, respectively. Similarly, extensions 3534 include connecting portions and retrograde portions that are analogous to connecting portion 2834A and retrograde portion 2834B, respectively. In other embodiments, extensions may have a different shape. Also shown are substrate/underlying layers 3501 that are analogous to substrate/underlayers 2801.

Optical device 3500 also includes extensions 3526 and 3536 that are analogous to extensions 3226 and 3236, respectively. However, extensions 3526 and 3536 are coupled with channel regions 3522 and 3532 by vias 3528 and 3538, respectively. In addition, channel regions 3522 and 3532 are at the same level as extensions 3524 and 3534, respectively. Thus, electrodes 3520 and 3530 each has two sets of extensions having individually engineered gaps at different distances from substrate/underlayer(s) 3501. Thus, the distance, d, between channel regions and thin film portion 3514, the gaps, the location and number of extensions may be tailored. Further, electrodes 3520 and 3530 may be simpler to fabricate than electrodes 3320 and 3330.

Optical device 3500 operates in an analogous manner to optical device(s) 2800 and thus to optical device(s) 100, 100', 100", 100''', and 100"". Thus, optical device 3500 may share the benefits of optical device 2800. In optical device 3500 the gaps, g and g', between extensions 3434 and 3424 and between 3526 and 3536 are tailored. For example, portions of extensions 3424 and 3434 are parallel to the top surface of substrate/underlayer(s) 3401, and portions of extensions 3424 and 3434 are at a nonzero acute angle from the top surface of substrate/underlayer(s) 3401. Other angles are possible. As a result, extensions 3424 and 3424 may be physically close to ridge 3412 while not extending closer than the lowest intensity optical mode (e.g. the portion of the optical mode having an intensity attenuated by at least 10 dB, 20 dB, or 30 dB from the well-confined, highest intensity portion of the optical mode). Stated differently, extensions 3424 and 3434 may skirt the well-confined optical mode for waveguide 3410.

Optical device 3400 may have improved performance analogous to that of optical device(s) 2800. Moreover, extensions 3424 and 3434 follow the contour of the portion of the cladding on which extensions 3424 and 3434 are formed. As a result, the electric field at ridge 3412 may be enhanced without adversely affecting the optical mode. The positions of channel regions 3322 and 3332 as well as extensions 3324, and 3334 may facilitate fabrication of optical device 3300. Consequently, not only may optical device 3300 have improved performance, but may also be simpler to fabricate.

Thus, various combinations of features for optical devices have been described in the context of FIGS. 1A-33B. These features may be combined in numerous ways. Thus, a low loss waveguide including of thin film nonlinear optical materials fabricated as described herein, electrodes having extensions and channel regions, waveguide and electrode bending sections that allow for velocity matching between microwave and optical signals, low microwave loss features, low voltage electrode signals, low optical losses, longer waveguides that occupy a smaller amount of area and/or other features described herein may be combined in manner(s) not explicitly shown. Consequently, high performance optical devices such as optical modulators may be provided.

Figure 34:
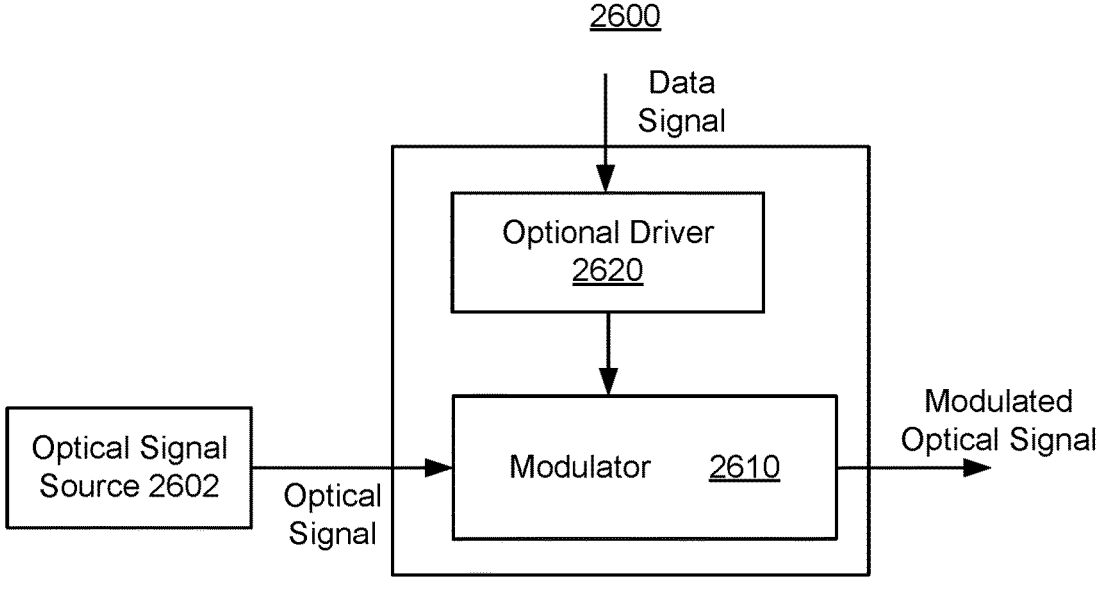
FIG. 34 depicts a portion of an embodiment of subassembly utilizing an optical modulator capable of having improved performance.

For example, FIG. 34 is a block diagram depicting an exemplary embodiment of device 2600 formed using an optical modulator 2610. In some embodiments, device 2600 is a transmission optical subassembly (TOSA). TOSA 2600 includes optical modulator 2610 and optional driver 2620. Also shown is optical signal source 2602, such as one or more lasers. Optical modulator 2610 is analogous to one or more of the optical devices depicted in FIGS. 1A-33B. Thus, an optical modulator 2610 having one or more of a low loss waveguide including of thin film nonlinear optical materials fabricated as described herein, electrodes having extensions and channel regions, waveguide and electrode bending sections that allow for velocity matching between microwave and optical signals, low microwave loss features, low voltage electrode signals, low optical losses, longer waveguides that occupy a smaller amount of area and/or other features described herein may be combined in manner(s) not explicitly shown. Consequently, high performance optical modulators 2610 may be used in device 2600.

Also shown is optional driver 2620 utilized to drive electrodes of optical modulator 2610. Driver 2620 may thus be a radio frequency driver. Because electrodes for optical modulator 2610 may be driven using a lower voltage, driver 2620 may be omitted. Thus, in some embodiments, optical modulator 2610 may be driven by the input data signal for TOSA 2600. In other embodiments, driver 2620 may be utilized. However, a lower voltage may be employed. Similarly, because optical modulator 2610 utilizes a low loss waveguide the input optical signal, for example from one or more lasers, may have a lower power. Thus, using optical modulators such as those described herein, devices having improved performance may be provided.

Figure 35:
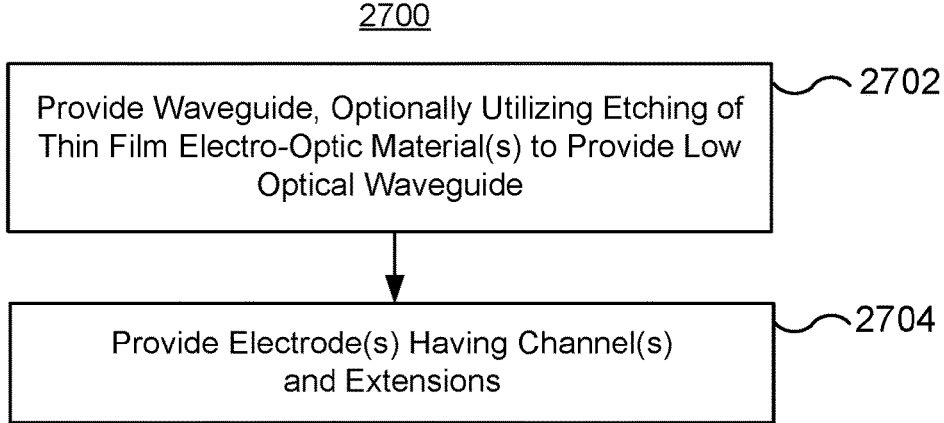
FIG. 35 is a flow-chart depicting an embodiment of a method for providing an optical modulator capable of having improved performance.

FIG. 35 is a flow chart depicting an embodiment of method 2700 for forming an optical modulator having improved performance. Method 2700 is described in the context of processes that may have sub-processes. Although described in a particular order, another order not inconsistent with the description herein may be utilized.

An optical waveguide is provided, at 2702. In some embodiments, a thin film of nonlinear optical material, such as LN and/or LT, is provided and patterned to form a low loss waveguide. In some embodiments, ultraviolet (UV) and/or deep ultraviolet (DUV) photolithography may be used to pattern masks for the nonlinear optical material. For example, a hard mask layer is provided on the nonlinear optical thin film. A UV or DUV mask layer is provided on the hard mask layer and patterned using UV or DUV photolithography. A hard mask is formed from the hard mask layer by transferring the pattern of the mask to the hard mask layer. For example, portions of the hard mask layer uncovered by apertures in the mask may be selectively etched. The hard mask may have depressions or apertures in regions in which the hard mask layer was etched. The pattern of the hard mask may be transferred to the nonlinear optical material thin film layer, for example using physical etch(es). In some cases, the fabrication is performed in stitched regions is at least ten millimeters by ten millimeters. In some embodiments, a stitched region may be at least fifteen millimeters by fifteen millimeters. In some embodiments, each stitched region is at least twenty millimeters by twenty millimeters. In some embodiments, bending sections are also provided. Thus, a low loss, high electro-optic effect waveguide that may have bending sections may be provided.

Electrodes having the desired configuration are provided, at 2704. For example, the electrodes may be evaporated or electroplated at 2704. In some embodiments, 2704 includes providing electrode(s) having channel regions and extensions. The extensions may be configured as described herein. In some embodiments, the electrode(s) are also configured to have bending sections. Fabrication of the optical modulator may then be completed.

For example, optical modulator 100' may be provided using method 2700. Waveguide 110' may be fabricated at 2702. A thin film of nonlinear optical material is provided and etched to form ridge 112. Further, the bending sections, such as bending sections 1515 are also provided via etching at 2202. Electrodes 120 and 130 are formed at 2704. Thus, channel regions 122 and 132 as well as extensions 124 and 134 are formed. Electrode bending sections, such as sections 1525, are also fabricated at 2704.

For example, using method 2700, optical modulators using electrodes having extensions and analogous to those in FIGS. 1A-33B may be fabricated. Examples of such modulators were fabricated on a 600 nm thick x-cut thin film LN on quartz wafer with a 300 nm etch depth. In some embodiments, the measured RF $V\pi$ at 1 GHz are 2.3V and 1.3V for ten and twenty millimeter long modulators, using a five micrometer electrode gap (e.g. distance between extensions 124 and 134), translating into a RF voltage-length product ($V\pi \cdot L$) of 2.3 and 2.6 V·cm respectively. The extinction of some embodiments of such a modulator is measured to be greater than 25 dB and on-chip loss is estimated to be less than 1 dB. In some embodiments, the optical devices provided using electrodes including extensions have a RF loss (microwave loss) of only two dB/cm at fifty GHz in comparison to seven dB/cm in a regular electrode design (e.g. with no extensions) having the same thickness (e.g. 800 nm) and material used (e.g. Au) for the electrodes. Ohmic loss in the electrode $\alpha_0$, is $\propto L^{-1}f^{1/2}$ as a result of the skin effect in metal, where L is the length of the electrode and f is microwave frequency. Conventional electrodes on thin-film LN have $\alpha_{0,reg}$=0.69 dBcm$^{-1}$GHz$^{-1/2}$ compared to $\alpha_{0,ext}$=0.26 dBcm$^{-1}$GHz$^{-1/2}$ for the fabricated electrodes having extensions. In some embodiments, the ultralow RF loss enabled measured EO responses of only 0.8 (1.7) dB attenuation for the 10 mm (20 mm) modulators at 50 GHz comparing to the reference $V\pi$ at 1 GHz. In other words, the RF $V\pi$ at 50 GHz is 2.5V (1.6V) for embodiments of the 10 mm (20 mm) optical modulator utilizing segmented electrodes. The electrical reflection from the electrode is maintained below −15 dB for all frequencies. In some embodiments, using a lower index substrate, such as fused silica or air, allows further separation of the extensions while maintaining velocity matching with the optical signal.

In addition, method 2700 may be simplified for optical devices 2800, 2900A, 2900B, 3000, 3100, 3200, 3300, and/or analogous devices. In such embodiments, at least a portion of the corresponding electrodes 2820 and 2830,

2920A and 2930A, 2920B and 2930B, 3020 and 3030, 3120 and 3130, 3220 and 3230, and 3320 and 3330 are formed above (further from the underlying substrate) than the corresponding waveguides 2810, 2910, 3010, 3110, 3210, and/or 3310. As a result, connection to the electrodes may be made without requiring apertures to be formed in the cladding. Instead, some or all portions of the electrodes fabricated in 2704 may be formed on top of a cladding layer. The electrodes may be later electrically insulated with additional insulating layer(s). Consequently, fabrication of optical devices may be facilitated.

Thus, using method 2700 an optical modulator having a low loss, thin film, nonlinear optical material waveguide including bends is provided. Further, electrodes including channel regions, extensions and bending sections are also fabricated. Consequently, an optical modulator having low optical signal losses, low electrode signal losses, consuming a controlled amount of area, and/or providing the desired optical modulation at lower voltages may be provided. Consequently, performance of the optical modulator may be improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An optical device, comprising:
a waveguide including at least one optical material having an electro-optic effect, the at least one optical material including lithium, a portion of the waveguide having a waveguide width, the portion of the waveguide configured to carry an optical signal and including a ridge waveguide; and
a first engineered electrode including a first channel region and a first plurality of extensions protruding from the first channel region; and
a second engineered electrode including a second channel region and a second plurality of extensions protruding from the second channel region, a first extension of the first plurality of extensions being a distance from a second extension of the second plurality of extensions along a direction transverse to an optical signal direction, the distance being less than the waveguide width and nonzero;
wherein at least one of the first engineered electrode and the second engineered electrode are configured to carry at least one electrode signal that generates an electric field that modulates the optical signal with a frequency dependent loss of not more than 0.8 dB per square root of an electrode signal frequency in GHz per centimeter in a frequency window of at least 10 GHz via the electro-optic effect, the frequency window in a frequency range to not more than five hundred GHz; and
wherein a functionality of the optical device is tailored by configuring compositions, shapes, dimensions, placements, and/or orientations of the first engineered electrode, the second engineered electrode, the first plurality of extensions, and the second plurality of extensions relative to a composition, cut, and/or cross-sectional profile of the ridge waveguide.

2. The optical device of claim 1, wherein the first plurality of extensions shares a layer with the first channel region.

3. The optical device of claim 1, wherein the waveguide, the first engineered electrode, and the second engineered electrode reside on a substrate, the first plurality of extensions being further from the substrate than the first channel region.

4. The optical device of claim 3, wherein the first engineered electrode further includes:
an additional plurality of extensions extending from the first channel region, the additional plurality of extensions being closer to the portion of the waveguide than the first channel region is.

5. The optical device of claim 4, wherein the additional plurality of extensions is closer to the substrate than the first channel region is.

6. The optical device of claim 1, wherein the waveguide further includes a thin film region.

7. The optical device of claim 1, wherein the waveguide, the first engineered electrode and the engineered second electrode reside on a substrate, at least one of the first plurality of extensions and the second plurality of extensions extending a varying distance from the substrate.

8. The optical device of claim 1, wherein the waveguide and the first engineered electrode reside on a substrate structure, the substrate structure being selected from a first substrate having a low substrate microwave dielectric constant less than eleven, the first substrate in combination with an underlayer between the first substrate and the waveguide, and a second substrate having a high microwave dielectric constant greater than eleven in combination with the underlayer, the underlayer having a low underlayer microwave dielectric constant of less than eleven.

9. The optical device of claim 1, wherein the waveguide and the first engineered electrode reside on a substrate having a void therein, the void being aligned with the portion of the waveguide and the first plurality of extensions.

10. The optical device of claim 1, wherein the portion of the waveguide confines an optical mode of the optical signal such that an intensity of the optical mode is attenuated by at least 20 dB from a well-confined portion intensity of the optical mode at a distance from the portion of the waveguide, the first engineered electrode and the second engineered electrode being not closer to the portion of the waveguide than the distance.

11. The optical device of claim 10, wherein the portion of the waveguide confines the optical mode such that the intensity of the optical mode is attenuated by at least 30 dB from the well-confined portion intensity of the optical mode at the distance from the portion of the waveguide.

12. A subassembly, comprising:
an optical modulator, the optical modulator including a waveguide, a first engineered electrode, and a second engineered electrode, the waveguide including lithium and having an electro-optic effect, a portion of the waveguide having a waveguide width and including a ridge waveguide, the first engineered electrode including a first channel region and a first plurality of extensions protruding from the first channel region, the second engineered electrode including a second channel region and a second plurality of extensions protruding from the second channel region, a first extension of the first plurality of extensions being a distance from a second extension of the second plurality of extensions along a direction transverse to an optical signal direction, the distance being less than the waveguide width and nonzero,
the waveguide carrying an optical signal, the portion of the waveguide confining an optical mode of the optical signal such that the optical mode is attenuated by at least 20 dB at an attenuation distance from the portion of the waveguide, the first engineered electrode and the second engineered electrode being not closer to the portion of the waveguide than the attenuation distance, wherein at least one of the first engineered electrode and the second engineered electrode are configured to carry at least one electrode signal that generates an electric field that modulates the optical signal with a frequency dependent loss of not more than 0.8 dB per square root of an electrode signal frequency in GHz per centimeter in a frequency window of at least 10 GHz via the electro-optic effect, the frequency window in a frequency range to not more than five hundred GHz; and a driver coupled to the optical modulator and configured to electrically drive the first engineered electrode and the second engineered electrode; and wherein a functionality of the optical modulator is tailored by configuring compositions, shapes, dimensions, placements, and/or orientations of the first engineered electrode, the second engineered electrode, the first plurality of extensions, and the second plurality of extensions relative to a composition, cut, and/or cross-sectional profile of the ridge waveguide.

13. A method, comprising:
providing a waveguide including at least one optical material having an electro-optic effect, the at least one optical material including lithium, a portion of the waveguide having a waveguide width and including a ridge waveguide, the waveguide being configured to carry an optical signal; and
providing a first engineered electrode including:
  providing a first channel region; and
  providing a first plurality of extensions protruding from the first channel region;
providing a second engineered electrode including:
  providing a second channel region; and
  providing a second plurality of extensions protruding from the second channel region, a first extension of the first plurality of extensions being a distance from a second extension of the second plurality of extensions along a direction transverse to an optical signal direction, the distance being less than the waveguide width and nonzero;
wherein at least one of the first engineered electrode and the second engineered electrode are configured to carry at least one electrode signal that generates an electric field that modulates the optical signal with a frequency dependent loss of not more than 0.8 dB per square root of an electrode signal frequency in GHz per centimeter in a frequency window of at least 10 GHz via the electro-optic effect, the frequency window in a frequency range to not more than five hundred GHz; and
wherein a functionality of an optical device including the waveguide, the first engineered electrode, and the second engineered electrode is tailored by configuring compositions, shapes, dimensions, placements, and/or orientations of the first engineered electrode, the second engineered electrode, the first plurality of extensions, and the second plurality of extensions relative to a composition, cut, and/or cross-sectional profile of the ridge waveguide.

14. The method of claim 13, wherein the waveguide, the first engineered electrode, and the second engineered electrode reside on a substrate and wherein the providing the first plurality of extensions further includes:
  providing the first plurality of extensions further from the substrate than the first channel region.

15. The method of claim 14, wherein the providing the first engineered electrode further includes:
  providing an additional plurality of extensions extending from the first channel region, the additional plurality of extensions being closer to the portion of the waveguide than the first channel region.

16. The method of claim 15, wherein the providing the additional plurality of extensions further includes:
  fabricating the additional plurality of extensions closer to the substrate than the first channel region.

17. The method of claim 13, wherein the providing the waveguide further includes:
  providing a layer including the at least one optical material,
  defining the portion of the waveguide from the layer, the portion of the waveguide including a ridge waveguide, the waveguide further including a thin film region.

18. The method of claim 17, wherein the waveguide has a thickness not exceeding six hundred nanometers.

19. The method of claim 13, wherein the waveguide and the first engineered electrode reside on a substrate structure, the substrate structure being selected from a first substrate having a low substrate microwave dielectric constant less than eleven, the first substrate in combination with an underlayer between the first substrate and the waveguide, and a second substrate having a high microwave dielectric constant greater than eleven in combination with the underlayer, the underlayer having a low underlayer microwave dielectric constant of less than eleven.

20. The method of claim 13, wherein the waveguide carries the optical signal, the portion of the waveguide confining an optical mode of the optical signal such that the optical mode is attenuated by at least 20 dB at a distance from the portion of the waveguide, the first engineered electrode and the second engineered electrode being not loser to the portion of the waveguide than the distance.

21. The optical device of claim 1, wherein the first channel region is separated from the second channel region by a channel spacing less than the waveguide width.

22. The optical device of claim 21, wherein the first channel region is separated from the second channel region by the channel spacing that is greater than the distance between the first extension and the second extension.

23. The optical device of claim 1, wherein the waveguide has a first surface and a second surface different from the first surface and wherein the first channel region is proximate to the first surface and the first plurality of extensions is proximate to the second surface.

24. The optical device of claim 1, wherein the electro-optic effect of the waveguide is in-plane.

* * * * *